US007349750B2

(12) United States Patent
Nishinohara et al.

(10) Patent No.: US 7,349,750 B2
(45) Date of Patent: Mar. 25, 2008

(54) METHOD FOR OPTIMIZING AN INDUSTRIAL PRODUCT, SYSTEM FOR OPTIMIZING AN INDUSTRIAL PRODUCT AND METHOD FOR MANUFACTURING AN INDUSTRIAL PRODUCT

(75) Inventors: Kazumi Nishinohara, Kanagawa (JP); Mitsutoshi Nakamura, Kanagawa (JP); Kyoichi Suguro, Kanagawa (JP); Koji Shirai, Kanagawa (JP); Ichiro Taguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/480,373

(22) Filed: Jul. 5, 2006

(65) Prior Publication Data
US 2007/0067056 A1    Mar. 22, 2007

(30) Foreign Application Priority Data
Jul. 6, 2005    (JP)    ............... P2005-197892

(51) Int. Cl.
*G06F 19/00*    (2006.01)
(52) U.S. Cl. .............. 700/95; 700/121; 700/108
(58) Field of Classification Search ........... 700/173, 700/108, 109, 97, 28–32, 121, 95; 705/27–29; 257/407; 438/689
See application file for complete search history.

(56) References Cited

U.S. PATENT DOCUMENTS 6,901,308 B1 *    5/2005    Hamada et al. ............. 700/173
7,219,068 B2 *    5/2007    Zelek et al. ................. 705/7
2003/0040954 A1 *    2/2003    Zelek et al. ................. 705/10

FOREIGN PATENT DOCUMENTS

| JP | 2002-064199 | 2/2002 |
|----|-------------|--------|
| JP | 2002-259463 | 9/2002 |

* cited by examiner

*Primary Examiner*—Kidest Bahta
(74) *Attorney, Agent, or Firm*—Finnegan, Henderson, Farabow, Garrett & Dunner, L.L.P.

(57) ABSTRACT

A method for optimizing a structure of an industrial product includes selecting control factors from among manufacturing parameters affecting a target characteristic, which is scheduled to be manufactured by a sequence of manufacturing processes; setting levels to the respective control factors; selecting a reference characteristic having a trade-off relation with the target characteristic from among characteristics of the structure; setting a reference value to the reference characteristic; selecting a prior adjustment factor affecting the reference characteristic; creating conditions for experiments assigning combinations of the levels to the respective control factors; determining an adjustment value of the prior adjustment factor so that each of characteristic values of the reference characteristic obtained by the experiments conforms substantially to the reference value; and determining experimental characteristic values of the target characteristic using the adjustment value.

19 Claims, 49 Drawing Sheets

| VARIABLE NAME | TOKEN VALUE |
|---|---|
|  |  |
|  |  |
|  |  |
|  |  |
| ⋮ | ⋮ |
|  |  |

FIG. 20

| EXPERIMENT NO. | CONTROL FACTOR | | | | | | | | | | | | | | | | | | | | | | |
|---|---|---|---|---|---|---|---|---|---|---|---|---|---|---|---|---|---|---|---|---|---|---|---|
| | A | B | C | D | E | F | G | H | I | J | K | L | M | N | O | P | Q | R | S | T | U | V | W |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 2 | 1 | 1 | 1 | 1 | 1 | 1 | 1 | 1 | 1 | 1 | 2 | 2 | 2 | 2 | 2 | 2 | 2 | 2 | 2 | 2 | 2 | 2 | 2 |
| 3 | 1 | 1 | 1 | 1 | 1 | 1 | 1 | 1 | 1 | 1 | 3 | 3 | 3 | 3 | 3 | 3 | 3 | 3 | 3 | 3 | 3 | 3 | 3 |
| 4 | 1 | 1 | 1 | 1 | 1 | 2 | 2 | 2 | 2 | 2 | 1 | 1 | 1 | 1 | 2 | 2 | 2 | 3 | 3 | 3 | 3 | 3 | 3 |
| 5 | 1 | 1 | 1 | 1 | 1 | 2 | 2 | 2 | 2 | 2 | 2 | 2 | 2 | 2 | 3 | 3 | 3 | 3 | 1 | 1 | 1 | 1 | 1 |
| 6 | 1 | 1 | 1 | 1 | 1 | 2 | 2 | 2 | 2 | 2 | 3 | 3 | 3 | 3 | 1 | 1 | 1 | 1 | 2 | 2 | 2 | 2 | 2 |
| 7 | 1 | 1 | 2 | 2 | 2 | 1 | 1 | 1 | 2 | 2 | 1 | 1 | 2 | 3 | 1 | 2 | 3 | 3 | 1 | 2 | 2 | 2 | 3 |
| 8 | 1 | 1 | 2 | 2 | 2 | 1 | 1 | 1 | 2 | 2 | 2 | 2 | 3 | 1 | 2 | 3 | 1 | 1 | 2 | 3 | 3 | 3 | 1 |
| 9 | 1 | 1 | 2 | 2 | 2 | 1 | 1 | 1 | 2 | 2 | 3 | 3 | 1 | 2 | 3 | 1 | 2 | 2 | 3 | 1 | 1 | 1 | 2 |
| 10 | 1 | 2 | 1 | 2 | 2 | 1 | 2 | 2 | 1 | 1 | 2 | 1 | 1 | 3 | 2 | 1 | 3 | 2 | 3 | 2 | 1 | 3 | 2 |
| 11 | 1 | 2 | 1 | 2 | 2 | 1 | 2 | 2 | 1 | 1 | 2 | 2 | 1 | 3 | 2 | 1 | 3 | 1 | 3 | 2 | 1 | 3 |
| 12 | 1 | 2 | 1 | 2 | 2 | 1 | 2 | 2 | 1 | 1 | 2 | 3 | 3 | 2 | 1 | 3 | 2 | 1 | 2 | 1 | 3 | 2 | 1 |
| 13 | 1 | 2 | 2 | 1 | 2 | 2 | 1 | 2 | 1 | 2 | 1 | 1 | 2 | 3 | 1 | 3 | 2 | 1 | 3 | 3 | 2 | 1 | 2 |
| 14 | 1 | 2 | 2 | 1 | 2 | 2 | 1 | 2 | 1 | 2 | 1 | 2 | 3 | 1 | 2 | 1 | 3 | 2 | 1 | 1 | 3 | 2 | 3 |
| 15 | 1 | 2 | 2 | 1 | 2 | 2 | 1 | 2 | 1 | 2 | 1 | 3 | 1 | 2 | 3 | 2 | 1 | 3 | 2 | 2 | 1 | 3 | 1 |
| 16 | 1 | 2 | 2 | 2 | 1 | 2 | 2 | 1 | 2 | 1 | 1 | 2 | 3 | 2 | 1 | 1 | 3 | 2 | 3 | 3 | 2 | 1 |
| 17 | 1 | 2 | 2 | 2 | 1 | 2 | 2 | 1 | 2 | 1 | 2 | 3 | 1 | 3 | 2 | 2 | 1 | 3 | 1 | 1 | 3 | 2 |
| 18 | 1 | 2 | 2 | 2 | 1 | 2 | 2 | 1 | 2 | 1 | 3 | 1 | 2 | 1 | 3 | 3 | 2 | 1 | 2 | 2 | 1 | 3 |
| 19 | 2 | 1 | 2 | 2 | 1 | 1 | 2 | 2 | 1 | 2 | 1 | 1 | 2 | 1 | 3 | 3 | 1 | 2 | 2 | 1 | 2 | 3 |
| 20 | 2 | 1 | 2 | 2 | 1 | 1 | 2 | 2 | 1 | 2 | 1 | 2 | 3 | 2 | 1 | 1 | 1 | 2 | 3 | 3 | 2 | 3 | 1 |
| 21 | 2 | 1 | 2 | 2 | 1 | 1 | 2 | 2 | 1 | 2 | 1 | 3 | 1 | 3 | 2 | 2 | 3 | 1 | 1 | 3 | 1 | 2 |
| 22 | 2 | 1 | 2 | 1 | 2 | 2 | 2 | 1 | 1 | 1 | 2 | 1 | 2 | 2 | 3 | 3 | 1 | 2 | 1 | 1 | 3 | 3 | 2 |
| 23 | 2 | 1 | 2 | 1 | 2 | 2 | 2 | 1 | 1 | 1 | 2 | 3 | 3 | 1 | 1 | 2 | 3 | 2 | 2 | 1 | 1 | 3 |
| 24 | 2 | 1 | 2 | 1 | 2 | 2 | 2 | 1 | 1 | 1 | 2 | 3 | 1 | 1 | 2 | 2 | 3 | 1 | 3 | 3 | 2 | 2 | 1 |
| 25 | 2 | 1 | 1 | 2 | 2 | 2 | 1 | 2 | 2 | 1 | 1 | 3 | 2 | 1 | 2 | 3 | 3 | 1 | 3 | 1 | 2 | 2 |
| 26 | 2 | 1 | 1 | 2 | 2 | 2 | 1 | 2 | 2 | 1 | 2 | 1 | 3 | 2 | 3 | 1 | 1 | 2 | 1 | 2 | 3 | 3 |
| 27 | 2 | 1 | 1 | 2 | 2 | 2 | 1 | 2 | 2 | 1 | 3 | 2 | 1 | 3 | 1 | 2 | 2 | 3 | 2 | 3 | 1 | 1 |
| 28 | 2 | 2 | 2 | 1 | 1 | 1 | 1 | 2 | 2 | 1 | 2 | 1 | 3 | 2 | 2 | 1 | 1 | 3 | 2 | 3 | 1 | 3 |
| 29 | 2 | 2 | 2 | 1 | 1 | 1 | 1 | 2 | 2 | 1 | 2 | 2 | 1 | 3 | 3 | 3 | 2 | 2 | 1 | 3 | 1 | 2 | 1 |
| 30 | 2 | 2 | 2 | 1 | 1 | 1 | 1 | 2 | 2 | 1 | 2 | 3 | 2 | 1 | 1 | 3 | 3 | 2 | 1 | 2 | 3 | 2 |
| 31 | 2 | 2 | 1 | 2 | 1 | 2 | 1 | 1 | 1 | 2 | 1 | 3 | 3 | 3 | 2 | 3 | 2 | 2 | 1 | 2 | 1 | 1 |
| 32 | 2 | 2 | 1 | 2 | 1 | 2 | 1 | 1 | 1 | 2 | 2 | 1 | 1 | 1 | 3 | 1 | 3 | 3 | 2 | 3 | 2 | 2 |
| 33 | 2 | 2 | 1 | 2 | 1 | 2 | 1 | 1 | 1 | 2 | 3 | 2 | 2 | 2 | 1 | 2 | 1 | 1 | 3 | 1 | 3 | 3 |
| 34 | 2 | 2 | 1 | 1 | 2 | 1 | 2 | 1 | 2 | 2 | 1 | 1 | 3 | 1 | 2 | 3 | 2 | 3 | 1 | 2 | 2 | 3 | 1 |
| 35 | 2 | 2 | 1 | 1 | 2 | 1 | 2 | 1 | 2 | 2 | 1 | 2 | 1 | 2 | 3 | 1 | 3 | 1 | 2 | 3 | 3 | 1 | 2 |
| 36 | 2 | 2 | 1 | 1 | 2 | 1 | 2 | 1 | 2 | 2 | 1 | 3 | 2 | 3 | 1 | 2 | 1 | 2 | 3 | 1 | 1 | 2 | 3 |

FIG. 21

| PROCESS PARAMETER | FACTOR NAME | LEVEL NUMBER | LEVEL1 | LEVEL2 | LEVEL3 |
|---|---|---|---|---|---|
| TIME | A | 2 | 23s | 0 | - |
| IMPLANT DOSE | B | 2 | 1.0E+13 | 5.0E+12 | - |
| TIME | C | 2 | 5 | 0 | - |
| TIME | D | 2 | 1.3nm | 1nm | - |
| TIME | E | 2 | 10 | 20 | - |
| IMPLANT ENERGY | F | 2 | 40 | 50 | - |
| IMPLANT ENERGY | G | 2 | 20 | 24 | - |
| TIME | H | 2 | 5 | 0 | - |
| TIME | I | 2 | 1 | 0. | - |
| ETCHED DEPTH | J | 2 | dummy | dummy | - |
| DUMMY | K | 3 | 40 | 55 | 70 |
| CHANNEL IMPLANT ENERGY | L | 3 | LOW | MIDDLE | HIGH |
| CHANNEL IMPLANT DOSE | M | 3 | 3 | 5 | 7 |
| SPACER THICKNESS | N | 3 | -1 | 0 | 1 |
| ETCHED DEPTH | O | 3 | 2.5 | 3 | 3.5 |
| IMPLANT ENERGY | P | 3 | 2.4 | 2.8 | 3.3 |
| IMPLANT DOSE | Q | 3 | 35 | 40 | 45 |
| HALO IMPLANT ENERGY | R | 3 | | | |
| HALO IMPLANT DOSE | PRIOR ADJUSTMENT FACTOR | 3 | | ADJUST | |
| HALO IMPLANT ANGLE | S | 3 | 10 | 20 | 30 |
| EXTENTION IMPLANT ENERGY | T | 3 | 1. | 2 | 2.5 |
| EXTENTION IMPLANT DOSE | U | 3 | 1.0E+1 | 1.5E+1 | 2.0E+1 |
| SPACER WIDTH | V | 3 | 40-spacer | 50-spacer | 60-spacer |
| ANGLE | W | 3 | 90 | 87 | 87 |

FIG. 22A

| NOISE FACTOR \ LEVEL | 1 | 2 |
|---|---|---|
| EA : GATE LENGTH | -15% : EA1 | +15% : EA2 |
| EB : TILT ANGLE | -2DEGREE : EB1 | +2DEGREE : EB2 |
| EC : TEMPERATURE | ROOM TEMPERATURE : EC1 | 65°C : EC2 |

FIG. 22B

| NOISE CONDITION | | | |
|---|---|---|---|
| Ni1 : Ion MAXIMUM | EA1 | EB1 | EC1 |
| Ni2 : Ion MINIMUN | EA2 | EB2 | EC2 |
| Ni3 : Ioff MAXIMUM | EA1 | EB1 | EC2 |
| Ni4 : Ioff MINIMUN | EA2 | EB2 | EC1 |

FIG. 23A

| PROCESS PARAMETER | FACTOR NAME | | LEVEL 1 | LEVEL 2 | LEVEL 3 |
|---|---|---|---|---|---|
| CHANNEL IMPLANT ENERGY | L | | LOW | MIDDLE | HIGH |
| CHANNEL IMPLANT DOSE | M | L1 : 40keV | 1.0E+13 | 1.5E+13 | 4.0E+13 |
| | | L2 : 55keV | 1.0E+13 | 2.0E+13 | 5.0E+13 |
| | | L3 : 70keV | 3.0E+13 | 4.0E+13 | 6.0E+13 |

FIG. 23B

| PROCESS PARAMETER | FACTOR NAME | | LEVEL 1 | LEVEL 2 | LEVEL 3 |
|---|---|---|---|---|---|
| SPACER THICKNESS | N | | 40-spacer | 50-spacer | 60-spacer |
| SPACER WIDTH | V | N1 : 3nm | 37 | 47 | 57 |
| | | N2 : 5nm | 35 | 45 | 55 |
| | | N3 : 7nm | 33 | 43 | 53 |

FIG. 24

| FACTOR | A | B | C | D | E | F | G | H | I | J | K | L | M | N | O | P | Q | R | S | T | U | V | W |
|--------|---|---|---|---|---|---|---|---|---|---|---|---|---|---|---|---|---|---|---|---|---|---|---|
| LEVEL | 1 | 2 | 1 | 2 | 2 | 1 | 2 | 2 | 1 | 1 | 2 | 1 | 1 | 3 | 2 | 1 | 3 | 2 | 3 | 2 | 1 | 3 | 2 |

FIG. 25

| FACTOR | A | B | C | D | E | F | G | H | I | J | K | L | M | N | O | P | Q | R | S | T | U | V | W |
|--------|---|---|---|---|---|---|---|---|---|---|---|---|---|---|---|---|---|---|---|---|---|---|---|
| LEVEL VALUE | A1 | B2 | C1 | D2 | E2 | F1 | G2 | H2 | I1 | J1 | K2 | L1 | M1 | N3 | O2 | P1 | Q3 | R2 | S3 | T2 | U1 | V3 | W2 |

FIG. 26

⋮
%time=23/60
⋮
%dose=5e12
⋮

```
              :
              :
*** MOS PARAMETERS ***********************
   Vth(max.gm)␣=␣0.13219276␣V␣
   Idr(max.gm) ␣=␣0.00087725054 ␣A␣
   Vth(current) ␣=␣0.11675091␣V␣
   Idr(current)  ␣=␣0.000860132 ␣A␣
   S-facor   ␣ = ␣false ␣mV/dec␣
 ⎧ Ioff␣ = ␣1.0e+05 ␣pA␣
 ⎩ Ion ␣ = ␣258e-06 ␣ μA␣
**************************************
```

→ DIVIDING TO TOKEN:

TOKEN (1) : Ioff  ⎫
                  ⎬ COMPARISON STRING
TOKEN (2) : =     ⎭

TOKEN (3) : 1.0e+05  ⎫
                     ⎬ VARIABLE
TOKEN (4) : pA       ⎭

TOKEN (5) : Ion   ⎫
                  ⎬ COMPARISON STRING
TOKEN (6) : =     ⎭

TOKEN (7) : 258e-06  ⎫
                     ⎬ VARIABLE
TOKEN (8) : μA       ⎭

| VARIABLE NAME | TOKEN VALUE |
|---|---|
| Val1 | 1.0e+05 |
| Unit1 | pA |
| Val2 | 258e-06 |
| Unit2 | $\mu$A |

FIG. 35

| EXPERIMENT No. | Ion(μA/μm) | | | | Ioff(pA/μm) | | | | HALO IMPLANT DOSE |
|---|---|---|---|---|---|---|---|---|---|
| | Ni1 (Ion MAXIMUM) | Ni2 (Ion MINIMUM) | Ni3 | Ni4 | Ni1 | Ni2 | Ni3 (Ioff MAXIMUM) | Ni4 (Ioff MINIMUM) | |
| run1 | 258 | 5.64 | 233 | 3.16 | 1.E+05 | 5.9 | 46610 | 0.13 | 5.55E+13 |
| run2 | 210 | 2.04 | 178 | 0.9 | 1.E+05 | 1.4 | 43103 | 0.03 | 4.49E+13 |
| run3 | 227 | 10.8 | 237 | 8.43 | 1.E+05 | 11.9 | 45100 | 0.35 | 3.05E+13 |
| run4 | 210 | 2.34 | 184 | 1.04 | 1.E+05 | 1.8 | 47750 | 0.03 | 4.20E+13 |
| run5 | 298 | 1.79 | 292 | 0.768 | 1.E+05 | 2.6 | 54173 | 0.02 | 3.23E+12 |
| run6 | 310 | 125 | 301 | 125 | 1.E+05 | 3020.2 | 55524 | 202.74 | 1.55E+12 |
| run7 | 310 | 114 | 293 | 118 | 1.E+05 | 1573.1 | 52216 | 102.7 | 9.60E+12 |
| run8 | 321 | 165 | 314 | 166 | 1.E+05 | 7604.7 | 53577 | 585.8 | 2.79E+12 |
| run9 | 265 | 24.4 | 236 | 21.7 | 1.E+05 | 48.5 | 48595 | 1.73 | 3.98E+13 |
| run10 | 278 | 47.8 | 248 | 49.5 | 1.E+05 | 103.7 | 50382 | 4.15 | 2.96E+13 |
| run11 | 178 | 0.144 | 150 | 0.03 | 1.E+05 | 30.7 | 5400 | 0.33 | 1.73E+14 |
| run12 | 283 | 52.4 | 197 | 53.8 | 1.E+05 | 130.5 | 13609 | 5.78 | 3.85E+13 |
| run13 | 249 | 27.2 | 219 | 26.1 | 1.E+05 | 13553 | 47140 | 1009.6 | 3.28E+13 |
| run14 | 210 | 0.101 | 184 | 0.019 | 1.E+05 | 0.1 | 49146 | 4.72E-04 | 1.08E+14 |
| run15 | 231 | 16.1 | 208 | 13.3 | 1.E+05 | 25.4 | 51275 | 0.78 | 6.73E+13 |
| run16 | 331 | 148 | 319 | 149 | 1.E+05 | 2996.9 | 51761 | 194.9 | 1.50E+13 |
| run17 | 297 | 1.34E-04 | 0.11 | 5.93E-06 | 1.E+05 | 4.32E-03 | 2.44E-01 | 3.10E-09 | 7.00E+13 |
| run18 | 317 | 81.7 | 301 | 85.5 | 1.E+05 | 501.1 | 56076 | 28.51 | 2.45E+13 |
| run19 | 199 | 0.066 | 164 | 0.012 | 1.E+05 | 0.1 | 45898 | 3.36E-04 | 8.00E+13 |
| run20 | 223 | 11.6 | 202 | 9.1 | 1.E+05 | 10.5 | 44227 | 0.31 | 3.88E+13 |
| run21 | 293 | 32.8 | 262 | 32.2 | 1.E+05 | 33.6 | 43974 | 1.19 | 4.25E+13 |
| run22 | 218 | 8.01 | 200 | 5.35 | 1.E+05 | 12.4 | 521530 | 0.29 | 9.80E+13 |
| run23 | 256 | 32.2 | 232 | 31.9 | 1.E+05 | 75.5 | 493820 | 3.09 | 4.65E+13 |
| run24 | 168 | 0.057 | 127 | 0.01 | 1.E+05 | 0.1 | 410920 | 3.98E-04 | 9.01E+13 |
| run25 | 306 | 66.2 | 290 | 68.8 | 1.E+05 | 278.4 | 535420 | 14.56 | 4.14E+13 |
| run26 | 290 | 122 | 276 | 129 | 1.E+05 | 5794.3 | 542930 | 470.31 | 2.05E+13 |
| run27 | 270 | 67 | 243 | 70.2 | 1.E+05 | 510.8 | 509140 | 29.92 | 3.00E+13 |
| run28 | 285 | 87.2 | 271 | 89.9 | 1.E+05 | 1033.7 | 549890 | 60.15 | 1.00E+13 |
| run29 | 283 | 87.3 | 272 | 90.1 | 1.E+05 | 875.2 | 519700 | 50.02 | 2.83E+13 |
| run30 | 259 | 48.1 | 243 | 48.2 | 1.E+05 | 165.1 | 558770 | 7.49 | 2.31E+13 |
| run31 | 303 | 80.7 | 284 | 84.6 | 1.E+05 | 360.2 | 508980 | 19.59 | 2.03E+13 |
| run32 | 184 | 0.068 | 150 | 0.012 | 1.E+05 | 0.3 | 413970 | 7.71E-04 | 5.79E+13 |
| run33 | 241 | 1.32 | 200 | 0.512 | 1.E+05 | 0.7 | 517130 | 0.01 | 8.24E+13 |
| run34 | 266 | 41.9 | 254 | 39.9 | 1.E+05 | 178.2 | 515970 | 7.66 | 5.84E+13 |
| run35 | 253 | 30.5 | 223 | 29.5 | 1.E+05 | 95.8 | 479200 | 4.15 | 4.45E+13 |
| run36 | 278 | 113 | 267 | 118 | 1.E+05 | 4684.6 | 549150 | 358.5 | 1.00E+13 |

FIG. 40

| FACTOR | B | C | D | E | G | I | L | N | O | P | R | S | T | U | W |
|---|---|---|---|---|---|---|---|---|---|---|---|---|---|---|---|
| LEVEL | B1 | C2 | D3 | E2 | G1 | I2 | L2 | N3 | O1 | P2 | R1 | S1 | T2 | U3 | W1 |

FIG. 48

| FACTOR NAME | | CONTROL FACTOR | UNIT | LEVEL 1 (REFERENCE VALUE 1) | LEVEL 2 (REFERENCE VALUE 2) | LEVEL 3 |
|---|---|---|---|---|---|---|
| CONTROL FACTOR | A | JUNCTION DEPTH | nm | 100 | 80 | - |
| | B | ION SPECIES | - | As | P | As+P |
| | C | IRRADIATION ENERGY | J/cm² | 22 | 24 | 26 |
| | D | PREHEATING TEMPERATURE | °C | 450 | 500 | 550 |
| | E | IRRADIATION NUMBER | - | 1 | 2 | 3 |
| | F | PREHEATING TIME | sec | 30 | 60 | 120 |
| | G | PRE-ANNEAL CONDITION | - | なし | 600°C/120sec | 600°C/480sec |
| | H | THICKNESS | nm | 10 | 12 | 14 |
| PRIOR ADJUSTMENT FACTOR | | ACCELERATION ENERGY | eV | | | |
| | | IMPLANT DOSE | cm⁻² | | | |

FIG. 49

L18 ORTHOGONAL ARRAY

| FACTOR NAME | A | B | C | D | E | F | G | H |
|---|---|---|---|---|---|---|---|---|
| EXPERIMENT NO. | JUNCTION DEPTH (nm) | ION SPECIES | IRRADIATION ENERGY (J/cm²) | PREHEATING TEMPERATURE (°C) | IRRADIATION NUMBER | PREHEATING TIME (sec) | PRE-ANNEAL CONDITION | SILICIDE THICKNESS (nm) |
| 1 | 100 | As | 22 | 450 | 1 | 30 | W/O | 10 |
| 2 | 100 | As | 24 | 500 | 2 | 60 | 600°C/120s | 12 |
| 3 | 100 | As | 26 | 550 | 3 | 120 | 600°C/240s | 14 |
| 4 | 100 | P | 22 | 450 | 2 | 60 | 600°C/240s | 14 |
| 5 | 100 | P | 24 | 500 | 3 | 120 | W/O | 10 |
| 6 | 100 | P | 26 | 550 | 1 | 30 | 600°C/120s | 12 |
| 7 | 100 | As+P | 22 | 500 | 1 | 120 | 600°C/120s | 14 |
| 8 | 100 | As+P | 24 | 550 | 2 | 30 | 600°C/240s | 10 |
| 9 | 100 | As+P | 26 | 450 | 3 | 60 | W/O | 12 |
| 10 | 80 | As | 22 | 550 | 3 | 60 | 600°C/120s | 10 |
| 11 | 80 | As | 24 | 450 | 1 | 120 | 600°C/240s | 12 |
| 12 | 80 | As | 26 | 500 | 2 | 30 | W/O | 14 |
| 13 | 80 | P | 22 | 500 | 3 | 30 | 600°C/240s | 12 |
| 14 | 80 | P | 24 | 550 | 1 | 60 | W/O | 14 |
| 15 | 80 | P | 26 | 450 | 2 | 120 | 600°C/120s | 10 |
| 16 | 80 | As+P | 22 | 550 | 2 | 120 | W/O | 12 |
| 17 | 80 | As+P | 24 | 450 | 3 | 30 | 600°C/120s | 14 |
| 18 | 80 | As+P | 26 | 500 | 1 | 60 | 600°C/240s | 10 |

FIG. 51

```
            •
            •
*** MOS PARAMETERS ***********************
    Vth (max.gm)  =   0.13219276   V
    Idr (max.gm)  =  0.00087725054   A
    Vth (voltage)  =   0.11675091   V
    Idr (current)  =   0.000860132  A
    S-facor   = false  mV/dec
    Ion   =  false  A
    Ion   =  0.0009524203   A
********************************************
```

→ DIVIDING TO TOKEN:

FIRST TOKEN : Vth  
SECOND TOKEN : (voltage)   } COMPARISON STRING  
THIRD TOKEN : =

FOURTH TOKEN : 0.11675091   } VARIABLE  
FIFTH TOKEN : V

| VARIABLE NAME | TOKEN VALUE |
|---|---|
| Val | 0.116 |
| Unit | V |

```
            .
            .
#CAPACITANCE
CALCULATION#    ␣
  ELECTRODE ␣  VOLTAGE(V)␣ CAPACITANCE(F) ␣
  NAME
  DRAIN     ␣   1.20000e+000 ␣  -7.17989e-015 ␣
  GATE      ␣   8.50000e+001 ␣   1.20505e-015 ␣
  SOURCE    ␣   0.00000e+000 ␣   3.29778e-015 ␣
  SUB       ␣   0.00000e+000 ␣   2.67706e-015 ␣

            .
            .
```

FIG. 60

```
#Id-Vg CHARACTERISTIC# ⏎
GATE VOLTAGE(V) ␣    DRAIN CURRENT(A) ⏎
   0.00E+00 ␣ 6.05E-09 ⏎
   1.00E-01 ␣ 8.63E-08 ⏎
   2.00E-01 ␣ 9.35E-07 ⏎
   3.00E-01 ␣ 5.01E-06 ⏎
   4.00E-01 ␣ 1.35E-05 ⏎
   5.00E-01 ␣ 2.54E-05 ⏎
   6.00E-01 ␣ 3.96E-05 ⏎
   7.00E-01 ␣ 5.53E-05 ⏎
   8.00E-01 ␣ 7.22E-05 ⏎
   9.00E-01 ␣ 9.01E-05 ⏎
   1.00E+00 ␣ 1.09E-04 ⏎
   1.10E+00 ␣ 1.28E-04 ⏎
   1.20E+00 ␣ 1.47E-04 ⏎

```

METHOD FOR OPTIMIZING AN INDUSTRIAL PRODUCT, SYSTEM FOR OPTIMIZING AN INDUSTRIAL PRODUCT AND METHOD FOR MANUFACTURING AN INDUSTRIAL PRODUCT

CROSS REFERENCE TO RELATED APPLICATIONS AND INCORPORATION BY REFERENCE

This application is based upon and claims the benefit of priority from prior Japanese Patent Application P2005-197892 filed on Jul. 6, 2005; the entire contents of which are incorporated by reference herein.

BACKGROUND OF THE INVENTION

1. Field of the Invention

The present invention relates to a method and a system for optimizing a plurality of structural parameters using a computer, and further relates to a method for manufacturing an industrial product with optimized manufacturing conditions, processing through a sequence of manufacturing processes.

2. Description of the Related Art

Recently, optimization design for a semiconductor device by simulating manufacturing processes and electrical characteristics of the semiconductor device using technology computer aided design (Acad) has come into frequent use.

In order to achieve excellent functional characteristics of a minute semiconductor device, such as a metal-oxide semiconductor field effect transistor (MOSFET), so as to optimize a structure of the semiconductor device, various experiments and simulations, based on a response surface method or an orthogonal array experiment, are executed. Because it is possible to examine optimization without actually performing a trial manufacture, it is particularly suitable to use simulation in such an optimization method.

For example, a system for attaining a desired calculation result by automatically changing input data of the simulation based on a previously specified condition using an optimal value search method such as a quasi Newton method, or a design of experiment (DOE) method using an orthogonal array, has been proposed (refer to Japanese Patent Laid Open No. 2002-259463).

Although input data used in a simulation of the semiconductor device normally includes several hundred to several thousand of variable manufacturing parameters, it is very rare to change all values of the manufacturing parameters in a series of simulations for optimizing a structure of the semiconductor device. Only the manufacturing parameters assumed to have a large or strong influence on target characteristics may be changed. This is because, dimensions of an optimum solution search domain excessively increase when dealing with significantly numerous parameters, and thus an enormous number of operations will be required with an optimal value search method such as the quasi Newton method, or the DOE method using an orthogonal array. However, in the optimal solution search methods or the DOE method, in an absence of interactions and singularities assuming only a main effect affecting a strong effect on each parameter, in theory it is possible to greatly reduce the number of operations.

However, when designing parameters to optimize quality performance of a MOSFET, such as a driving current (Ion) and a standby leak current (hereinafter called "off leak current", Ioff), which greatly vary in response to a threshold voltage Vth, by the DOE method using an orthogonal array, average values and variances of the characteristics are estimated by an average value calculation of the orthogonal array.

Because there is a trade-off between the Ion and Ioff characteristics due to interaction, errors in estimation of the characteristics are increased. Therefore, it is impossible to estimate the optimum solution from the main effect, when dealing with numerous parameters.

In optimization of a complicated structure, such as a MOSFET, it is understood that the structure to be optimized may include many characteristics and many manufacturing parameters. A plurality of characteristics may depend on common manufacturing parameters. Additionally, a trade-off relation in which, when attaining a specification of a specific target characteristic by changing values of manufacturing parameters, other target characteristic may not be attained. Such a situation may easily occur in an optimization examination. Thus, in an optimization design of a structure having target characteristics which are in a trade-off relation, it is necessary to search for a manufacturing parameter which will not commonly affect target characteristics, or a manufacturing parameter having no trade-off effect on target characteristics. Therefore, if level values of many manufacturing parameters are not inevitably dealt with, it is impossible to eliminate the trade-off relation between the target characteristics.

By advances in the operation performance of an engineering work station (EWS), simulation processing, such as changes to input data, activation of a simulator, and arrangement of calculation results, which have been handled by human resources, is automated to improve the efficiency of optimization design of a semiconductor device and the like. It has become easier to run the simulation by allocating input values to a plurality of manufacturing parameters based on an orthogonal array. By conducting a total optimization design in which a plurality of target characteristics can be simultaneously satisfied by dealing with many parameters in a simulation, the efficiency of optimization design will be remarkably increased. However, the possibility of the presence of interactions and singularities makes it difficult to achieve optimization design using multiple parameters.

SUMMARY OF THE INVENTION

A first aspect of the present invention inheres in a computer implemented method for optimizing a structure of an industrial product including selecting a plurality of control factors from among a plurality of manufacturing parameters affecting a target characteristic of the industrial product, which is scheduled to be manufactured by a sequence of manufacturing processes, the control factors being related to a plurality of manufacturing conditions; setting a plurality of levels to the respective control factors; selecting a reference characteristic having a trade-off relation with the target characteristic from among a plurality of characteristics of the structure; setting a reference value to the reference characteristic; selecting a prior adjustment factor affecting the reference characteristic from among the manufacturing parameters; creating conditions for a plurality of experiments assigning a plurality of combinations of the levels to the respective control factors so that, with respect to each level of a specific control factor among the control factors, all levels of other control factors are evenly combined; determining an adjustment value of the prior adjustment factor so that each of characteristic values of the reference characteristic obtained by the experiments conforms substantially to the reference value; and determining experimental characteristic values of the target characteristic corresponding to each of the experiments using the adjustment value.

A second aspect of the present invention inheres in a system for optimizing a structure of an industrial product including an array editor configured to select a plurality of control factors from among a plurality of manufacturing parameters affecting a target characteristic of the industrial product, which is scheduled to be manufactured by a sequence of manufacturing processes, and to set a plurality of levels to the respective control factors, the control factors being related to a plurality of manufacturing conditions; an array creation unit configured to create conditions for a plurality of experiments assigning a plurality of combinations of the levels to the respective control factors so that, with respect to each level of a specific control factor among the control factors, all levels of other control factors are evenly combined; an input data editor configured to select a reference characteristic having a trade-off relation with the target characteristic from among a plurality of characteristics of the structure, to set a reference value to the reference characteristic, and to select a prior adjustment factor affecting the reference characteristic from among the manufacturing parameters; an adjustment unit configured to determine an adjustment value of the prior adjustment factor so that each of characteristic values of the reference characteristic obtained by the experiments conforms substantially to the reference value; and an orthogonal array experiment control unit configured to determine experimental characteristic values of the target characteristic corresponding to each of the experiments using the adjustment value.

A third aspect of the present invention inheres in a method for manufacturing an industrial product including selecting a plurality of control factors from among a plurality of manufacturing parameters affecting a target characteristic of the industrial product, which is scheduled to be manufactured by a sequence of manufacturing processes, the control factors being related to a plurality of manufacturing conditions; setting a plurality of levels to the respective control factors; selecting a reference characteristic having a trade-off relation with the target characteristic from among a plurality of characteristics of the structure; setting a reference value to the reference characteristic; selecting a prior adjustment factor affecting the reference characteristic from among the manufacturing parameters; creating conditions for a plurality of experiments assigning a plurality of combinations of the levels to the respective control factors so that, with respect to each level of a specific control factor among the control factors, all levels of other control factors are evenly combined; executing the experiments with the created conditions; determining an adjustment value of the prior adjustment factor so that each of characteristic values of the reference characteristic obtained by the experiments conforms substantially to the reference value; determining experimental characteristic values of the target characteristic corresponding to each of the experiments using the adjustment value; determining an optimal value of the target characteristic and an optimal combination of the levels based on the experimental characteristic values of the experiments, the optimal combination providing the optimal value, and executing the sequence of the manufacturing processes with the manufacturing conditions prescribed by the determined optimal combination so as to manufacture the industrial product.

BRIEF DESCRIPTION OF DRAWINGS

FIG. 20 is a diagram showing an example of an orthogonal array used in the description of a first example of the embodiment of the present invention;

FIG. 21 is a diagram showing an example of a list of control factor levels for orthogonal array experiments used in the description of the first example of the embodiment of the present invention;

FIGS. 22A and 22B are diagrams showing an example of a list of noise factor levels and noise conditions used in the description of the first example of the embodiment of the present invention;

FIGS. 23A and 23B are diagrams showing an example of a list of slide levels used in the description of the first example of the embodiment of the present invention;

FIG. 24 is a diagram showing an example of a data array of control factor levels the orthogonal array experiment used in the description of to the first example of the embodiment of the present invention;

FIG. 25 is a diagram showing an example of a data array of control factor level values of the orthogonal array experiment used in the description of the first example of the embodiment of the present invention;

FIG. 26 is a diagram showing an example of an input value format for a simulation of the orthogonal array experiment used in the description of the first example of the embodiment of the present invention;

FIG. 27 is a diagram showing an example of noise factor level values used in the description of the first example of the embodiment of the present invention;

FIG. 30 is a diagram showing an example of an output value of the simulation used in the description of the first example of the embodiment of the present invention.

FIG. 35 is a diagram showing an example of a list of characteristic values of the reference characteristic and the target characteristic used in the description of the first example of the embodiment of the present invention.

FIG. 40 is a diagram showing an example of a data array of optimized level values of control factors according to the optimization method of the first example of the embodiment of the present invention.

FIG. 48 is a diagram showing an example of a list of control factor levels for orthogonal array experiments used in the description of the second example of the embodiment of the present invention.

FIG. 49 is a diagram showing an example of an orthogonal array used in description of the second example of the embodiment of the present invention.

FIG. 51 is a diagram showing an example of an output value of the simulation used in the description of a fourth example of the embodiment of the present invention.

FIG. 60 is a diagram showing an example of an output value of a simulation used in the description of a sixth example of the embodiment of the present invention.

DETAILED DESCRIPTION OF THE INVENTION

Figure 1:
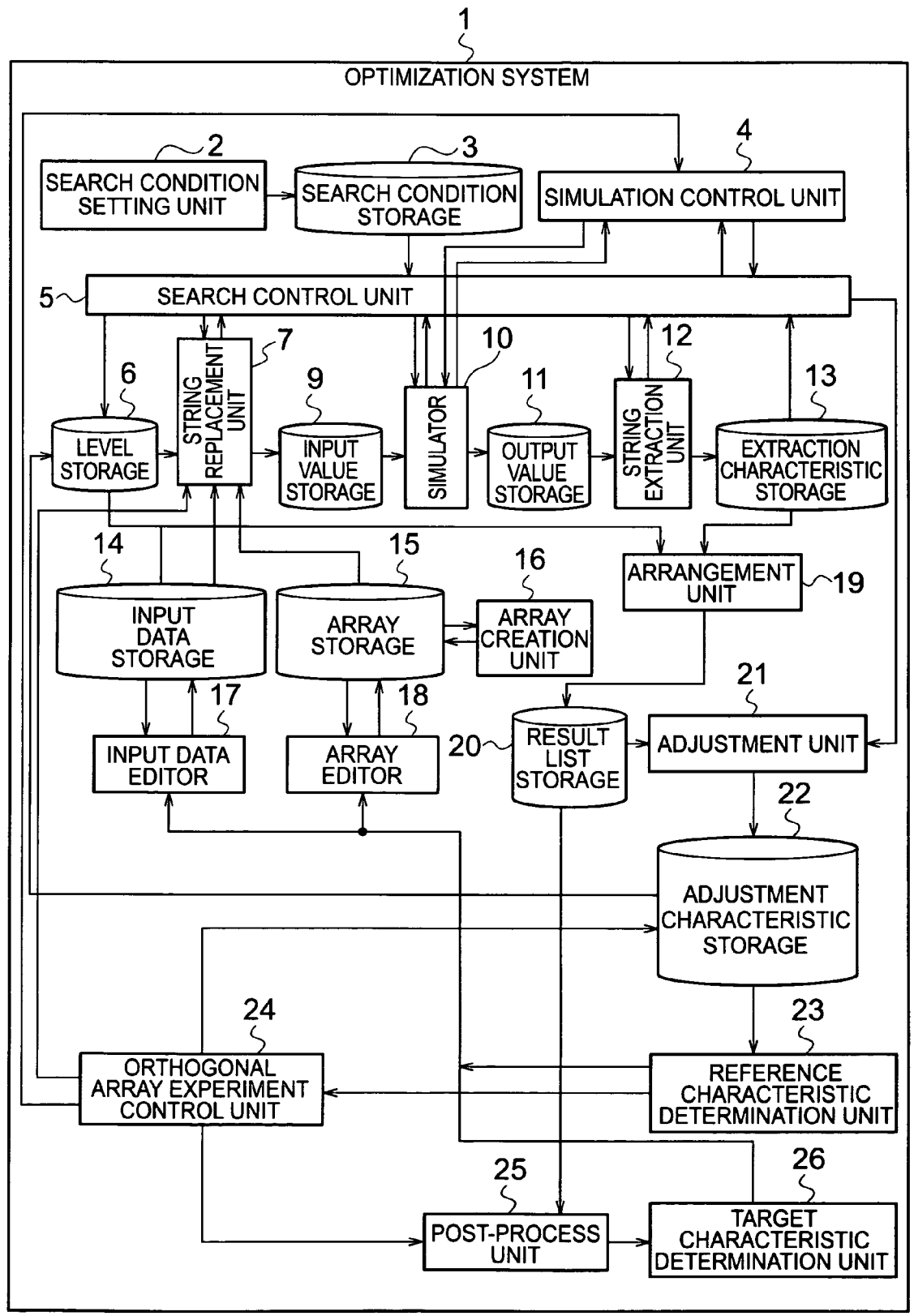
FIG. 1 is a block diagram showing an example of an optimization system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Optimization System)

As shown in FIG. 1, an optimization system 1 according to an embodiment of the present invention includes a search condition setting unit 2, a search condition storage 3, a simulation control unit 4, a search control unit 5, a level storage 6, a string replacement unit 7, an input value storage 9, a simulator 10, an output value storage 11, a string extraction unit 12, an extraction characteristic storage 13, an input data storage 14, an array storage 15, an array creation unit 16, an input data editor 17, a array editor 18, an arrangement unit 19, a result list storage 20, an adjustment unit 21, an adjustment characteristic storage 22, a reference characteristic determination unit 23, an orthogonal array experiment control unit 24, a post-process unit 25, a target characteristic determination unit 26, and the like.

For example, a structure of an industrial product such as a semiconductor device, which is manufactured by a sequence of manufacturing processes, is defined by a plurality of manufacturing parameters which are related to a plurality of manufacturing conditions of the manufacturing processes. The manufacturing parameters which have an influence on a plurality of quality characteristics of the industrial product are referred to as "factors". With respect to a target characteristic selected from among a plurality of quality characteristics of the industrial product, a target value and a tolerance of the target value is defined by a design specification of the industrial product.

The array editor 18 selects a plurality of "control factors", which control the target characteristic, from among a plurality of factors and sets a plurality of levels to the respective control factors. As used herein, the term "level" refers to a condition to qualitatively or quantitatively change a factor in order to search for an influence of the factor on a quality characteristic.

The array creation unit 16 creates an orthogonal array prescibing a plurality of experiments in which a plurality of combinations of level values are selected so as to orthogonalize the respective levels. As used herein, the term "orthogonal array" refers to an allocation table designed in such a manner so that with respect to each level of a specific factor, all levels of other factors occur the same number of times. The array storage 15 stores the plurality of control factors, the plurality of level of the control factors, and the plurality of experiments.

The input data editor 17 selects one of a plurality of target characteristics as a reference characteristic which is in a trade-off relation with another target characteristic, and sets a required reference value to the reference characteristic. Further, the input data editor 17 selects a prior adjustment factor having an influence on the reference characteristic from among the factors. The "prior adjustment factor" is a different factor from the control factors. In addition, the prior adjustment factor is selected so as to have the smallest possible interaction with the prepared control factors for fitting in target values of other target characteristics. Furthermore, the input data editor 17 selects a noise factor, and sets level values of the noise factor and a noise condition compounded from the level values of the noise factor. The term "noise factor" refers to a factor that causes a function to fluctuate due to a variance in member components, an environmental fluctuation, or a change over time.

The input data storage 14 stores input data, such as the reference characteristic, the reference value, the prior adjustment factor, the noise factor, the levels of the noise factor, the noise condition compounded from the level values of the noise factor, and the like.

For selecting the reference characteristic, the input data editor 17 sets a tolerance of a characteristic value for each of the quality characteristics, which has a trade-off relation with the target characteristic, to select the reference characteristic which does not satisfy the tolerance from among the quality characteristics. Alternatively, for selecting the reference characteristic, the input data editor 17 sets a tolerance of a variance of a characteristic value for each of the quality characteristics, which has a trade-off relation with the target characteristic, and selects the reference characteristic which does not satisfy the tolerance from among the quality characteristics. For selecting the prior adjustment factor, the input data editor 17 calculates a sensitivity of each of the manufacturing parameters with respect to the reference characteristic, and selects the prior adjustment factor from among the manufacturing parameters that have a high sensitivity to the reference characteristic.

The search condition setting unit 2 provides a condition for searching a level value of the prior adjustment factor to provide the characteristic value of the reference characteristic to be substantially equal to the reference value, for each of the experiments providing the combinations of the levels of the control factors. One of a quasi-Newton method, a bisection method, an iteration method, an interpolation method, and an extrapolation method is selected as a search method for the prior adjustment factor, and provides a search condition of each of the experiments for implementing each of the search methods. The search condition storage 3 stores the search condition of each of the experiments for implementing the selected search method.

In the search control unit 5, the simulator 10 is controlled to implement each of the experiments based on the search condition, and to search for the level of the prior adjustment factor. The level storage 6 updates and stores the level value whenever search level values of the search levels of the prior adjustment factor is changed.

The string replacement unit 7 replaces the search level values of the prior adjustment factor stored in the level storage 6, the level of the control factor stored in the array storage 15, the level value of the noise factor stored in the input data storage 14, and the like, by formatted data which is input to the simulator 10.

The input value storage 9 stores the formatted data of the level values of the prior adjustment factor, the levels of the control factors, the level values of the noise factor, and the like. The simulator 10 calculates the characteristic value of the target characteristic and a search characteristic value of the reference characteristic based on the search level values of the prior adjustment factor, the experiments providing the combinations of the levels of the control factor, and the level values of the noise factor. The output value storage 11 stores output data including the characteristic value of the target characteristic and the search characteristic value of the reference characteristic, which have been calculated in the simulation. Further, the simulation control unit 4 adjusts the timing to input the input values, and the timing to transmit the output value of the simulator 10 and enables continuous operation of the simulator 10.

The string extraction unit 12 converts the characteristic value of the target characteristic and the reference characteristic value of the reference characteristic to formatted data which can be processed by the optimization system. More specifically, the characteristic value of the target characteristic and the reference characteristic value of the reference characteristic are transmitted from the simulator 10 as strings in ASCII character format. The string extraction unit 12 extracts the characteristic value of the target characteristic and the reference characteristic value of the reference characteristic from the output strings. The extraction characteristic storage 13 stores the extracted characteristic value of the target characteristic, and the extracted reference characteristic value of the reference characteristic.

The arrangement unit 19 creates a result list in which the input values of the simulator 10 and the output values of the simulator 10, corresponding to the input values, have a relation with each other so that either one may be extracted from the other.

The adjustment unit 21 determines an adjustment value which is a level value of the prior adjustment factor used in each experiment based on the search level value and the search characteristic value of the result list, so that each of characteristic values of the reference characteristic obtained by each experiment conforms substantially to the reference value of the reference characteristic. Further, the adjustment unit 21 transmits the characteristic value of the reference characteristic at the adjustment value. For example, a tolerance of variation from the reference value of the reference characteristic is provided, and the level value of the prior adjustment factor, which provides the variation of the reference characteristic to be less than the tolerance, is provided as the adjustment value. The adjustment characteristic storage 22 stores the characteristic value of the reference characteristic at the adjustment value.

The reference characteristic determination unit 23 determines whether the reference characteristic at the adjustment value is substantially equal to the reference value of the reference characteristic. When the reference characteristic at the adjustment value is determined not to be substantially equal to the reference value, the input data editor 17 and the array editor 18 change the input values of the input data and the control factors. When the reference characteristic at the adjustment value is substantially equal to the reference value, processing is carried out at the orthogonal array experiment control unit 24.

The orthogonal array experiment control unit 24 searches for experimental characteristic values of the target characteristic of the structure corresponding to the experiments using the adjustment value. The orthogonal array experiment control unit 24 changes the value of the prior adjustment factor of the level storage 6 to the adjustment value. The simulator 10 calculates the experimental characteristic value of the target characteristic using the adjustment value.

The post-process unit 25 determines an optimal value of the target characteristic and an optimal combination of the levels of the control factors, which provides the optimal value of the target characteristic, by a process average value calculation of the orthogonal array based on the experimental characteristic values of the target characteristic of the respective experiments.

The reference characteristic determination unit 23 determines whether the optimal value of the target characteristic achieves the desired target value. When the optimal value of the target characteristic is determined not to achieve the desired target value, the input data editor 17 and the array editor 18 change the input values of the input data and the control factors. When the optimal value of the target characteristic is determined to achieve the desired target value, optimization is finished.

Figure 2:
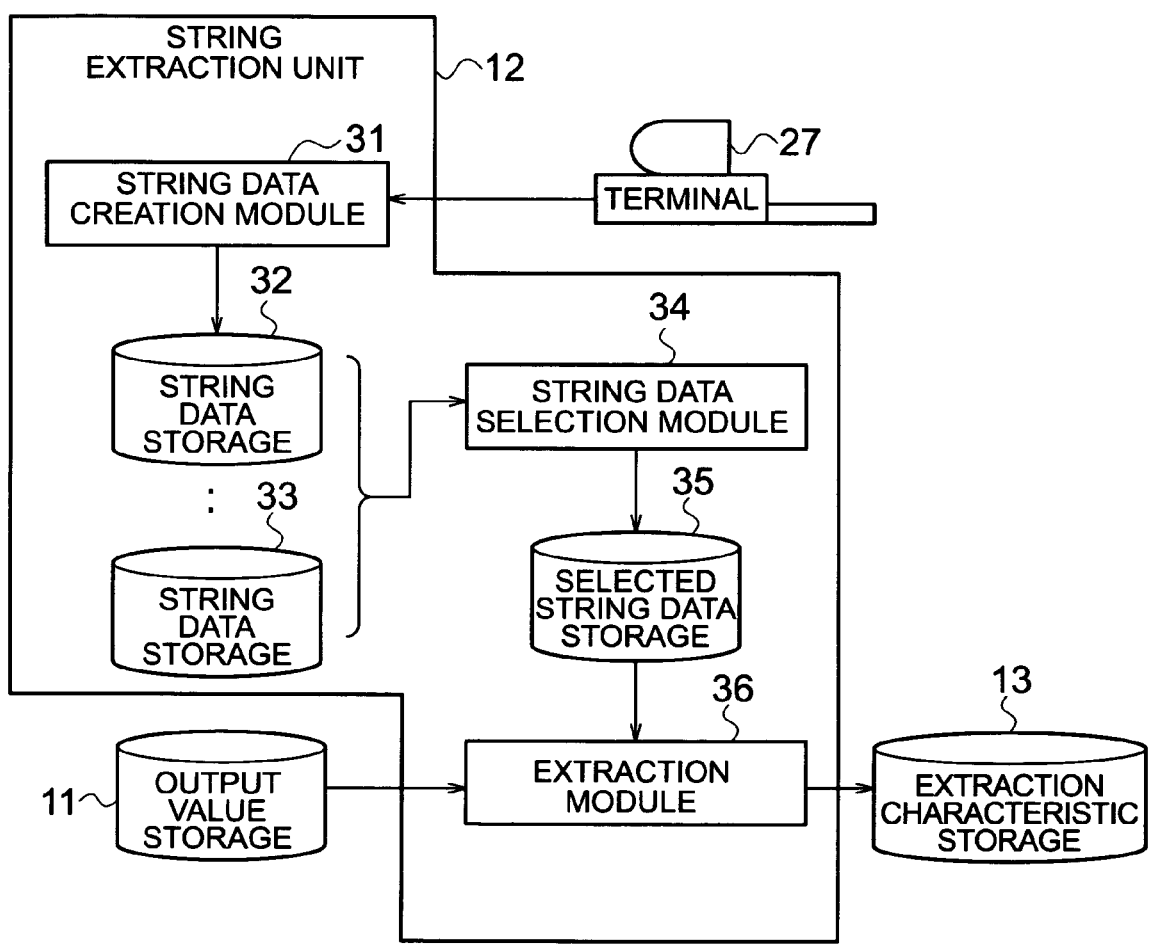
FIG. 2 is a block diagram showing an example of a string extraction unit according to the embodiment of the present invention.

As shown in FIG. 2, the string extraction unit 12 includes a string data creation module 31, a plurality of string data storages 32, . . . , 33, a string data selection module 34, a selected string data storage 35, and an extraction module 36.

The string data creation module 31 creates extraction position data for extracting a desired string, such as the reference characteristic value, from an ASCII character string which is an output value including the reference characteristic value stored in the output value storage 11, and format data of the ASCII character string and the extracted string from the ASCII character string, by operator entry to a terminal 27.

The string data storages 32, . . . , 33, store data of the extraction positions of a first string through a n-th string, and the format data. The extraction position data and the format data vary with each simulation carried out by the simulator 10, and also vary according to the calculation objects, such as the reference characteristic value and the target characteristic value, calculated by the simulator 10. Therefore, it is beneficial to have the plurality of the string data storages 32, . . . , 33 to store each of the first to n-th strings. Moreover, the extraction position data includes designation of a number of rows and columns in which a desired string exists, designation of a searchable title character, designation of order of delimiters and words, and the like. Further, the format data includes a format of a string and a storage variable.

The string data selection module 34 selects the extraction position data and the format data corresponding to the ASCII character string of the output value stored in the output value storage 11, from the string data storage units 32, . . . , 33. The selected string data is stored in the select string data storage 35.

The extraction module 36 extracts the desired string, such as the reference characteristic value, from the ASCII character string of the output value including the reference characteristic value and the like stored in the output value storage 11, based on the selected extraction position data and the format data. Data such as the reference characteristic value written in a processable format by the optimization system 1, is transmitted from the extracted string, and the reference characteristic value and the like are stored in the extraction characteristic storage 13.

Figure 3:
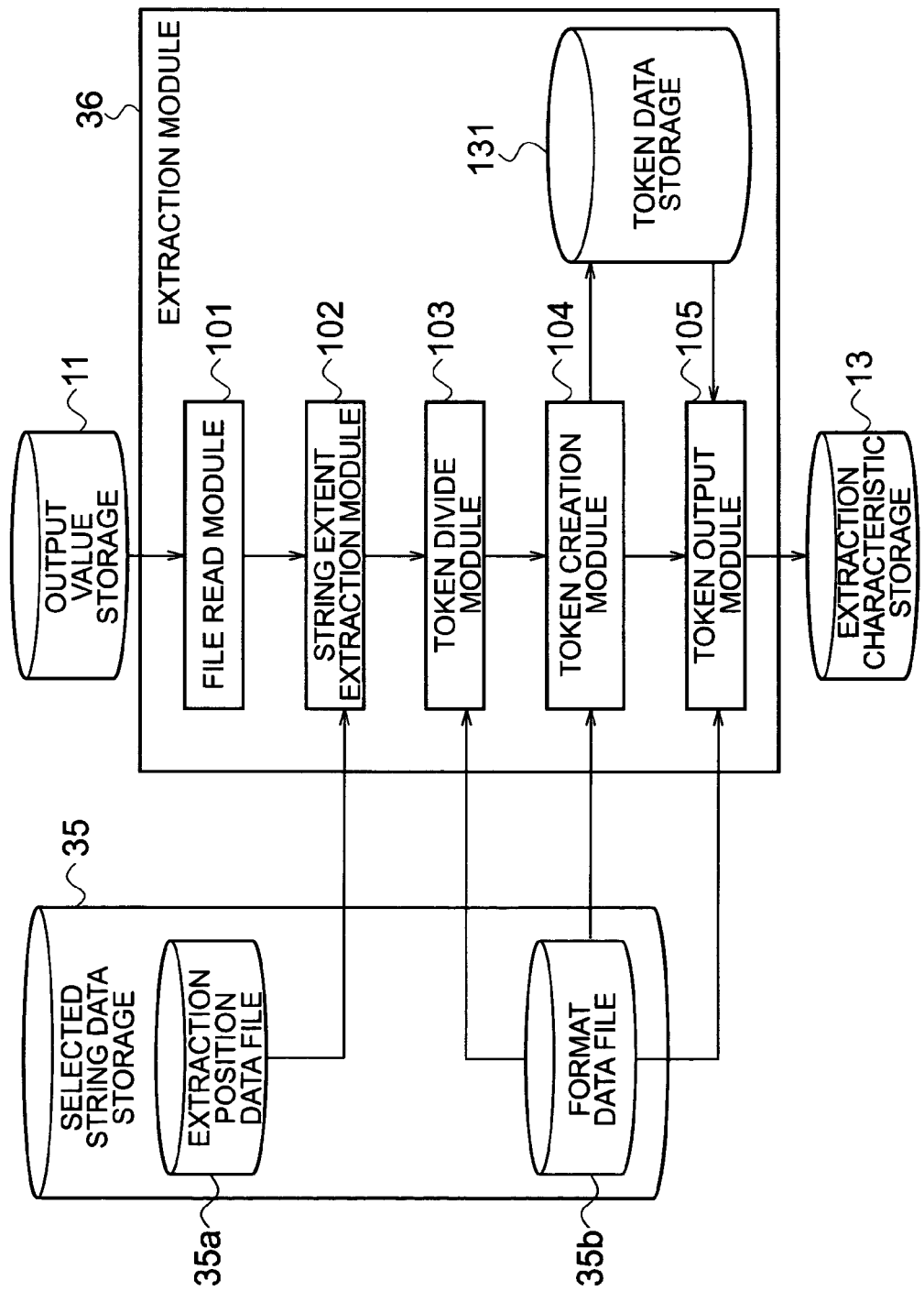
FIG. 3 is a block diagram showing an example of an extraction module according to the embodiment of the present invention.

As shown in FIG. 3, the extraction module 36 includes a file read module 101, a string extent extraction module 102, a token divide module 103, a token creation module 104, a token output module 105, a token data storage 131, and the like. Further, the selected string data storage 35 includes an extraction position data file 35*a* and a format data file 35*b*.

The file read module 101 reads the entire file of the simulation output value stored in the output value storage 11.

The string extent extraction module 102 extracts an string extent including the reference characteristic value in the simulation output value from the simulation output value read by the file read module 101, using an applicable extraction position of a start row and an end row of the string extent including the reference characteristic value in the simulation output value stored in the extraction position data file 35*a*.

The token divide module 103 divides the extracted string extent of the simulation output value into a plurality of tokens based on an applicable format stored in the format data file 35*b*, which is applied to the simulation output value from among the computer output formats. The applicable format includes information put in between the plurality on tokens, such as a delimiter, a carriage return, and a space character. The token divide module 103 creates a first token string by arranging the plurality of divided tokens.

The token creation module 104 creates a second token string configured to extract the reference characteristic value from the first token string, based on the applicable format stored in the format data file 35*b*. The second token string includes list information for each token, such as a comparison string, a comparison discriminator, and a next token arranged subsequent to the current token in the second token string. Moreover, the token creation module 104 extracts the reference characteristic value from the first token string using the second token string. A portion of the list information designated by the information extracted as the second token string, such as reference characteristic value, is stored in the token data storage 131 as a variable name and a token value.

The token output module 105 transmits the characteristic values of the reference characteristic and the target characteristic stored in the token data storage 131 to the extraction characteristic storage 13. Here, the applicable extraction level and the applicable format is information sent from the search control unit 5 shown in FIG. 1 to the string extraction unit 12.

Figure 4:
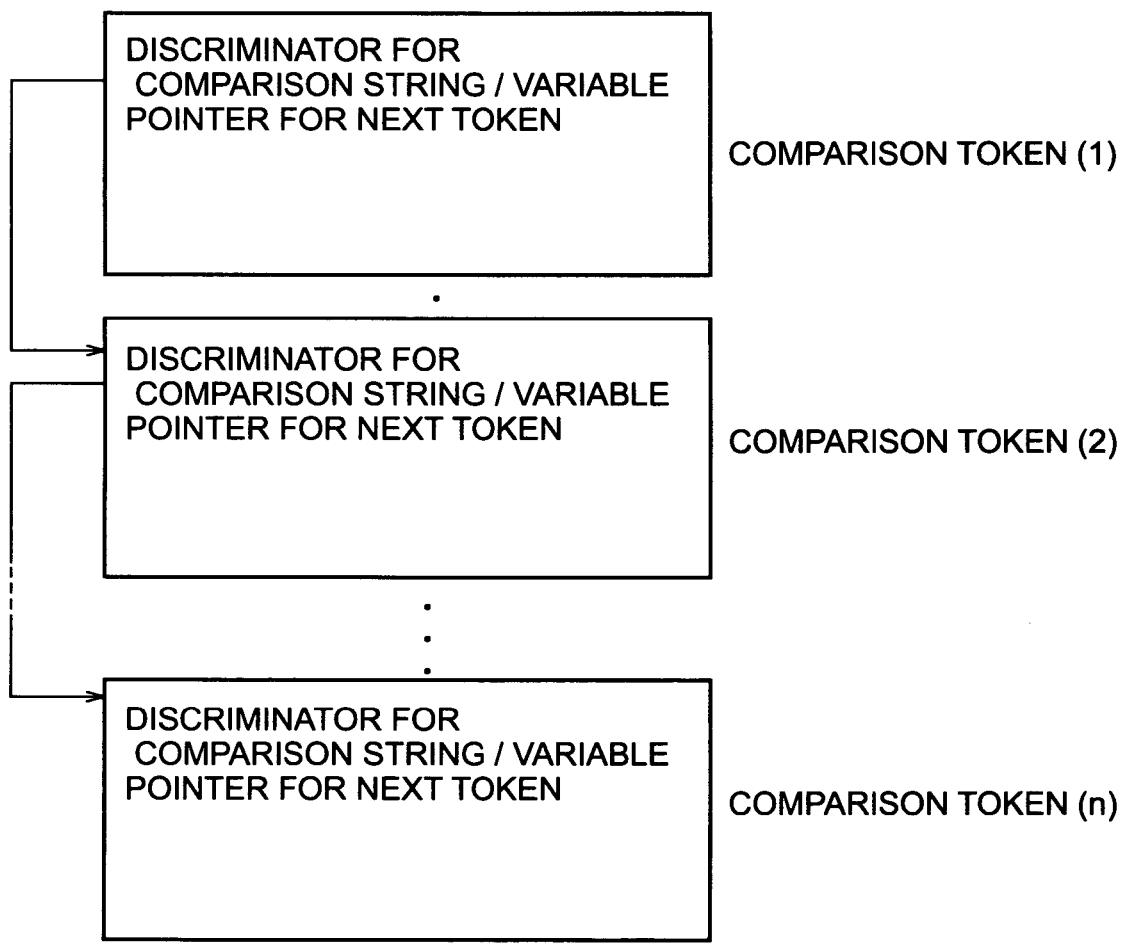
FIG. 4 is a diagram showing an example of a format data file used in the description of the embodiment of the present invention.

As shown in FIG. 4, the second token string of the applicable format has a data structure having a plurality of comparison tokens (1), (2), . . . , (n) in which an order of readout is provided. Each of the comparison tokens (1) to (n) includes a discriminator for discriminating whether the token is a comparison string or a variable, and a pointer to a next token subsequent to the current token. Further, when the token is the comparison string, the comparison string and a discriminator for implementing string comparison are provided. When the token is the variable, a variable name is provided.

For the sake of easy understanding, a case in which a linked list format is used as a data retention method of the second token string is shown in FIG. 4. The readout order of the token in the second token string is determined by the pointer to the next token. The order of tokens used to determine whether it is a token to be extracted when extracting the token, corresponds to the order of the token in the second token string. When the discriminator designates a comparison string, a data portion to be different by the value of the discriminator for discriminating the comparison string or the variable has information of the comparison string used in the comparison (for example, a string having more than one character except a space string) and the possibility of implementing the string comparison (Yes/No). Further, when the discriminator designates the variable, the data portion has a variable name (string). If the C programming language is used, data of the token can be described using type declarators "struct" and "union".

Figures 5, 6:
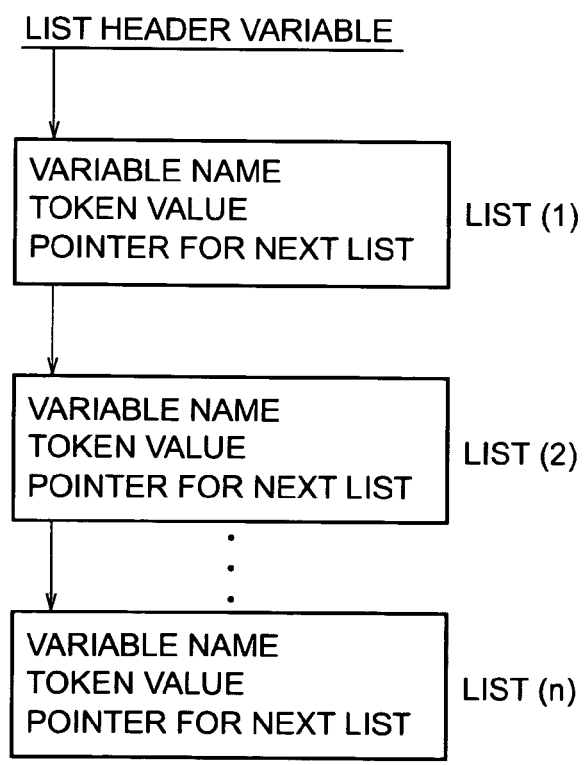
FIG. 5 is a diagram showing an example of a variable name and token value table used in the description of the embodiment of the present invention.
FIG. 6 is a diagram showing another example of a variable name and token value table used in the description of the embodiment of the present invention.

As shown in FIG. 5, it is possible to construct a data structure of the variable name and the token value stored in the token data storage 131, by an array. The data of the variable name and the token value can be described as two sets of arrays of the variable name and the token value.

Further, as shown in FIG. 6, it is possible to construct a data structure of the variable name and the token value stored in the token data storage 131, by linked lists having a plurality of lists (1), (2), . . . , (n). Here, "list header variable" denotes that the list header is variable. When using the linked lists, each of the lists (1) to (n) includes information of the variable name, the token value, and the pointer to the subsequent list. Because the portion of a set of the variable name and the token value is used when searching for the token value corresponding to the variable name described in the output format by the token output module 105, a data structure, such as a binary tree, having an easily searched format when processing a large amount of information, may be used.

Figure 7:
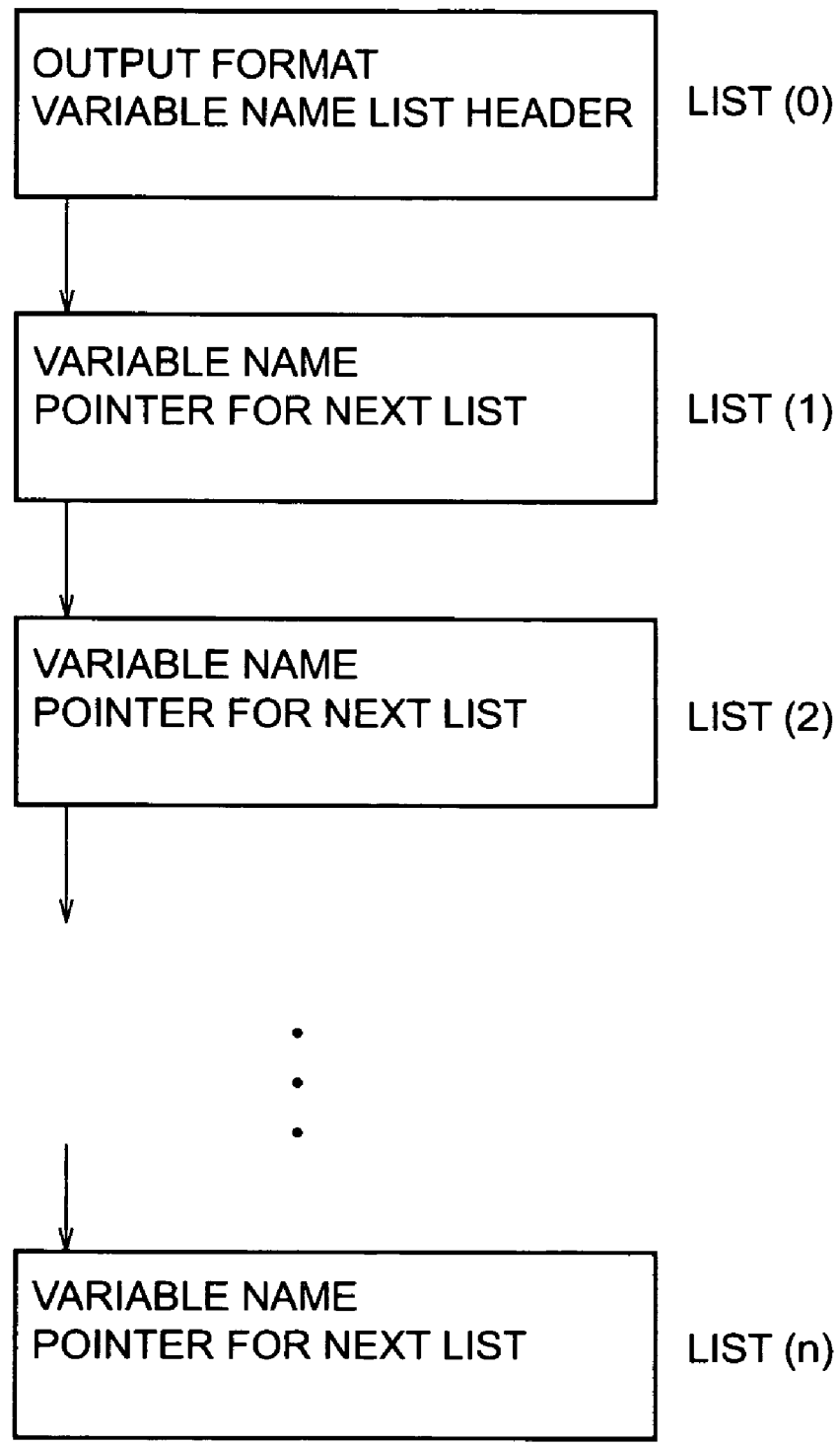
FIG. 7 is diagram showing an example of an output format used in the description of the embodiment of the present invention.

As shown in FIG. 7, the data structure of the output format of the applicable format stored in the format data file 35*b* can also be constructed by link lists having a plurality of lists (0), (1), (2), . . . , (n). The list (0) has an output format of a string, and a variable name list header. It is possible to read out the list (1) by the variable name list header in the list (0). Each of the lists (1) to (n) has a variable name corresponding to each character of a string, and a pointer to the list having the variable name corresponding to a next character of the string. For example, the output format is constructed using a string according to a format specified by a standard C language function, such as "printf". The variable name is retained in a normal linked list format.

Figure 8:
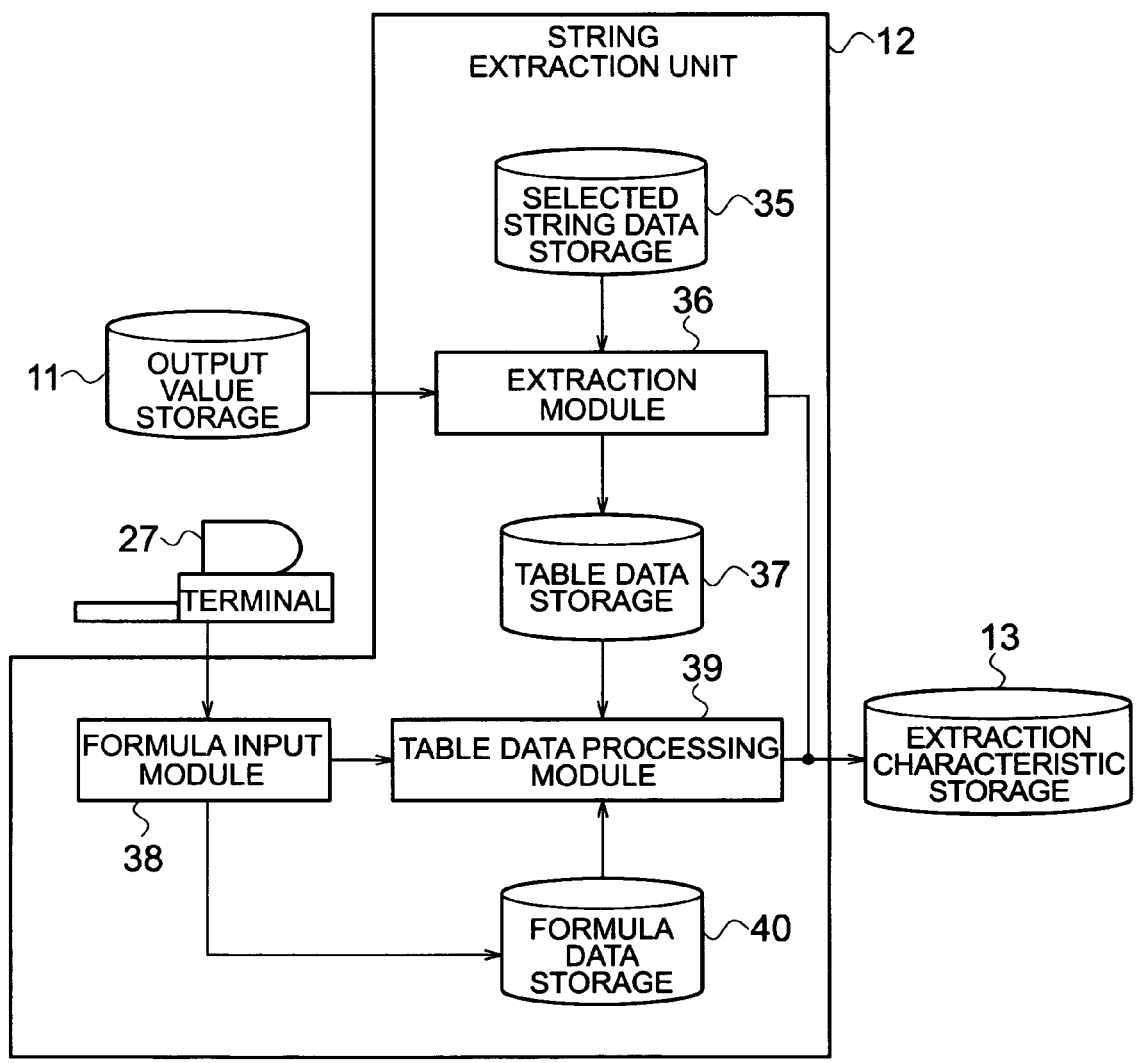
FIG. 8 is a block diagram showing another example of a string extraction unit according to the embodiment of the present invention.

As shown in FIG. 8, the string extraction unit 12 may include the selected string data storage 35, the extraction module 36, a table data storage 37, a formula input module 38, a table data processing module 39, and a formula data storage 40. The selected string data storage unit 35 stores extraction position data to extract a desired string for calculating the reference characteristic value and the like, from an ASCII character string of the output value including a string for calculating the reference characteristic value and the like, and format data of an ASCII character string of the output value and the extracted string.

The extraction module 36, based on the stored extraction position data and the format data, extracts the desired string for calculating the reference characteristic value and the like, from the ASCII character string of the output value including the string for calculating the reference characteristic value and the like, stored in the output value storage 11. Data of an array format for calculating the reference characteristic value and the like, written in a processable format by the optimization system 1 from the extracted string is stored in the table data storage 37. Here, when the reference characteristic is, for example, a drive current Ion characteristic of a MOSFET, an off leak current Ioff characteristic, or a threshold voltage Vth characteristic, the data for calculating the reference characteristic value corresponds to a plurality of gate voltage values and a plurality of drain current values, in a drain current Id versus a gate voltage Vg characteristic (Id-Vg curve).

The formula input module 38 acquires a procedure for calculating the reference characteristic value in a formula, by operator entry to the terminal 27. The formula data storage 40 stores the formula.

The table data processing module 39 processes the data for calculating the reference characteristic value, based on the procedures indicated in the formula. The calculated result is transmitted to the extraction characteristic storage 13, as the reference characteristic value. The extraction characteristic storage 13 stores the transmitted reference characteristic value. For example, when the data for calculating the reference characteristic value is the plurality of drain currents Id corresponding to the plurality of gate voltages Vg, the drive current Ion, the off leak current Ioff, and the threshold voltage Vth are calculated from the Id-Vg curve. When the off leak current Ioff is the reference characteristic, the gate voltage Vg, the source voltage, and the substrate voltage Vsub are 0V. Thus, the drain current Id when applying the power supply voltage VDD to the drain voltage is provided as the off leak current Ioff. When the drive current Ion is the reference characteristic, the source voltage and the substrate voltage Vsub are 0V. Thus, the drain current Id when applying the power supply voltage VDD to the drain voltage and the gate voltage vg is provided as the drive current Ion.

The extraction module 36 shown in FIG. 8 has a similar structure to that shown in FIG. 3. However, in the extraction module 36 of FIG. 8, the function of the token creation module 104 and the token output module 105 is slightly different from the function of the token creation module 104 and the token output module 105 described in FIG. 3.

The token creation module 104, based on the applicable format applied in the output from the computer, creates a second token string having a third token string including a plurality of repetition tokens, which is able to repeatedly extract a plurality of characteristic values of a plurality of reference characteristics, from the first token string. The characteristic values of the reference characteristic are created from the first token string using the second token string. The created characteristic values are stored in the token data storage 131.

The token output module 105 transmits the characteristic values of the reference characteristic stored in the token data storage 131 to the extraction characteristic storage 13.

The second token string extracted by the token creation module 104 includes the third token string having repetition tokens. According to the repetition tokens, it is possible to process the simulation output value transmitted in a table format.

Figure 9:
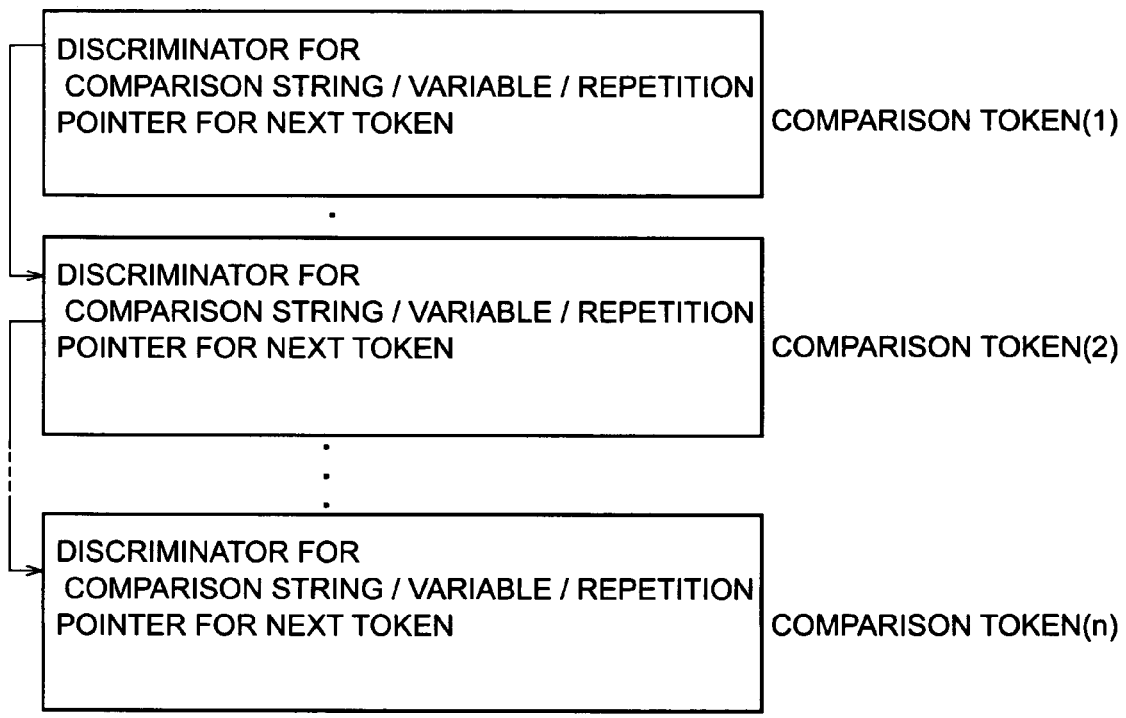
FIG. 9 is a diagram showing another example of a format data file used in the description of the embodiment of the present invention.

As shown in FIG. 9, an applicable format of the second token string having repetition data is modified slightly from the applicable format of the second token string shown in FIG. 4. The modifications are made so that a discriminator for repetition is added, and that information of the repetition is added. When the discriminator is the repetition, a repetition ending condition by an ending determination function, and a header to a token list describing the repetition of the third token are added to each comparison token. When the C programming language is used, the repetition ending condition may be a pointer to the ending determination function. The ending determination function returns "Yes" (or "1") when the necessary ending condition has been satisfied, and returns "No" (or "0") when the necessary ending condition has not been satisfied.

Figure 10:
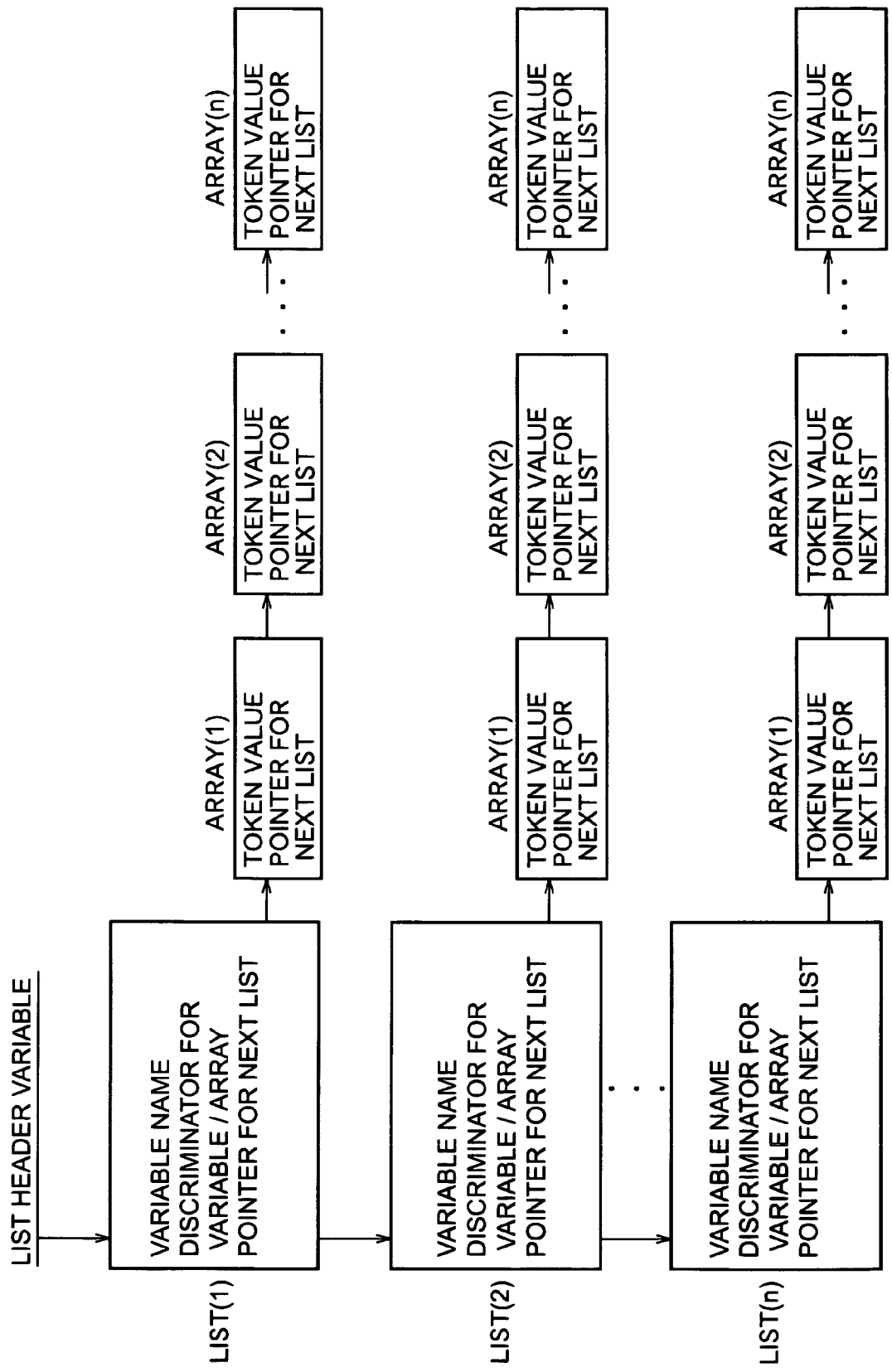
FIG. 10 is a diagram showing another example of a variable name and token value table used in the description of the embodiment of the present invention.

As shown in FIG. 10, the data structure of the table of the variable name and the token value in a case having repeated data is slightly modified from the data structure of the table of the variable name and token value shown in FIG. 6. The data structure shown in FIG. 10 is different from the data structure of FIG. 6 in that a plurality of arrays is used for the variable name. A discriminator for discriminating between a variable and an array has been newly provided. Different information according to the discriminator is provided. In particular, information for the discriminator of the array is added. When the discriminator is the variable, a token value is provided. When the discriminator is an array, a header of a token list for variables which constructs the arrays, is provided. In the data structure shown in FIG. 10, not only the tokens are provided in the linked list format, but the arrays are also provided in the linked list format. By making the arrays usable for the variable name, it is possible to store repetition data in the arrays.

Figure 11:
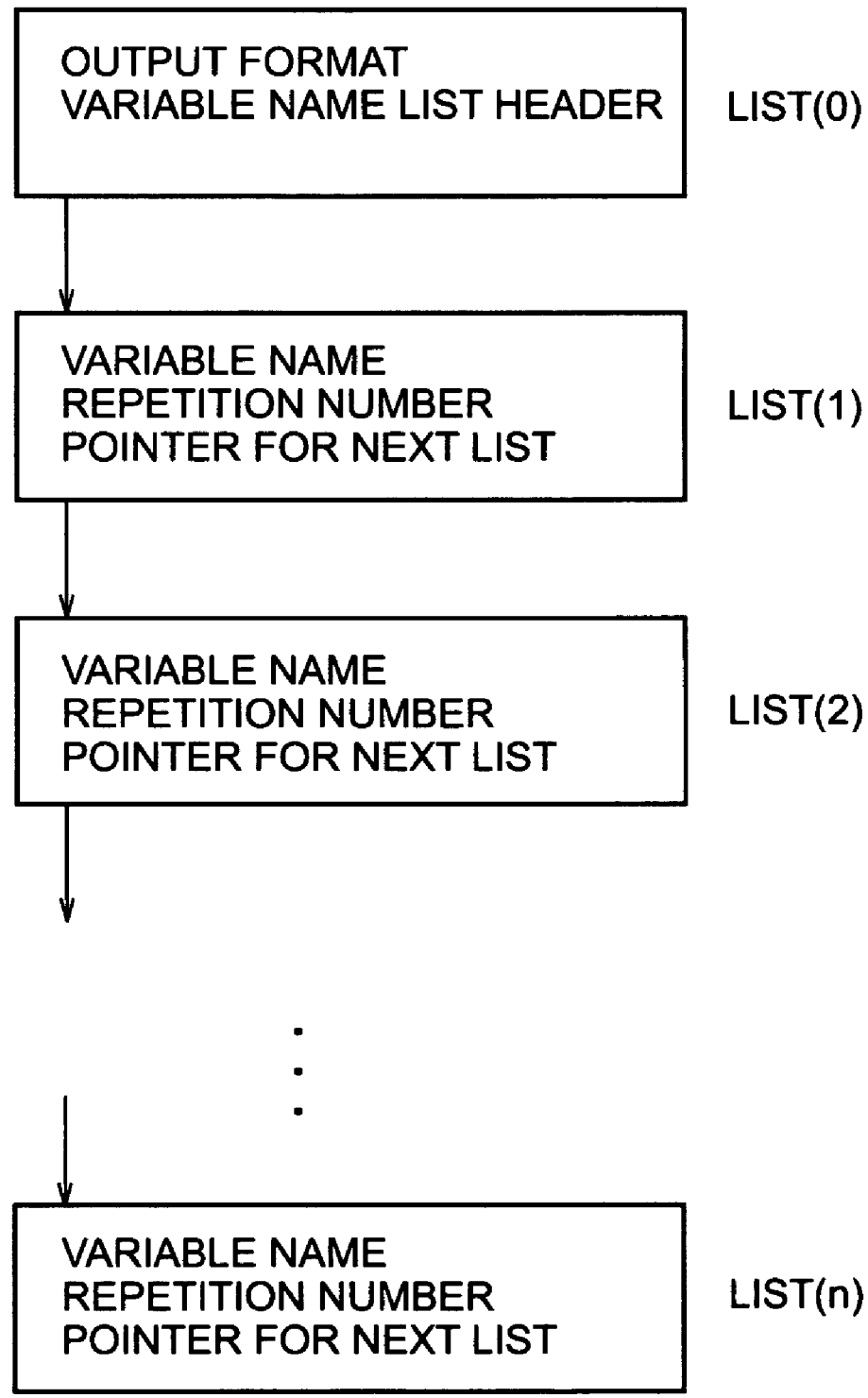
FIG. 11 is a diagram showing another example of an output format used in the description of the embodiment of the present invention.

As shown in FIG. 11, when including repetition data, the data structure of the output format is slightly modified from the data structure of the output format shown in FIG. 7. The different point is in that each list (1), (2), . . . , (n) has a repetition number. By designating the variable name and the repetition number, the token value having a relation with the variable name and corresponding to the repetition number may be read out from the token data storage 131.

In the optimization system according to the embodiment of the present invention, because the string extraction unit 12 which extracts designated data from data input with an arbitrary format is provided, it is possible to process the extracted data, with the simulator 10, having only an executable format without a source code.

Further, because the table data processing module 39 is provided with respect to the extracted data, it is possible to extract a point satisfying a gradient of the Id-Vg curve from the calculation result input in the table format, such as the Id-Vg data, and time series data.

The optimization system 1 may be a computer, or may be provided by virtually equivalent functions achieved by software, using the CPU of a general purpose computer system.

(Optimization Method)

An optimization method according to the embodiment of the present invention is described with reference to the flowchart shown in FIG. 12. The optimization method is carried out using a L36 orthogonal array including eleven factors having two levels, and twelve factors having three levels.

In Step S1, a preliminary survey is carried out using the simulator 10. By examination of the simulation result, a plurality of control factors, a plurality of noise factors, and a prior adjustment factor are selected from among factors having an influence on quality characteristics. The control factors can control a target characteristic. A target characteristic and a reference characteristic are selected from among the quality characteristics. Using the control factors, the experiment array corresponding to an orthogonal array is created.

More specifically, the array editor 18 selects the control factor and sets level values of the respective control factors (Step S1A). The input data editor 17 selects the noise factors, the reference characteristic, and the prior adjustment factor. For example, a quality characteristic having a trade-off relation with the target characteristic is selected as a reference characteristic (Step S1B). A reference value of the reference characteristic, and a target value of the target characteristic are provided. The factor on which the reference characteristic is strongly dependent is selected as a prior adjustment factor (Step S1C). The noise factors, which cause a variation in the reference characteristic, are selected from among the factors. A plurality of noise conditions are compounded by setting a plurality of level values to the noise factors (Step S1D). The array creation unit 16 allocates level values of the control factors to the selected orthogonal array, and creates experiment conditions for a plurality of experiments in which a plurality of combinations of the levels of the respective control factors are provided (Step S1E).

In Step S2, prior adjustment of the reference characteristic using the prior adjustment factor is carried out by the computer. The prior adjustment makes the interactions between the control factors uniform using the prior adjustment factor, as described later. The search condition setting unit 2 selects a search method to search for an adjustment value of the prior adjustment factor so that the reference characteristic will be substantially equal to the reference value of the reference characteristic, and provides a search condition of a simulation for the search method.

Figure 13:
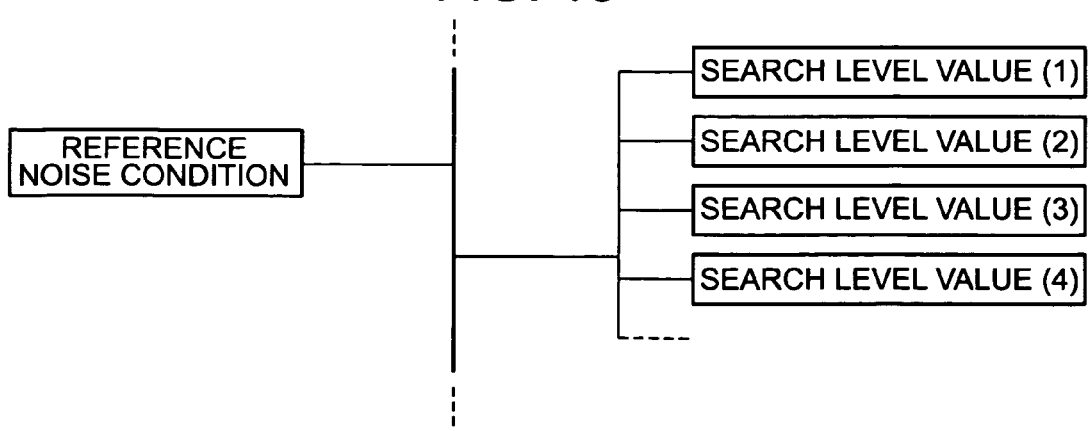
FIG. 13 is a diagram for describing a method for setting an input condition of a simulation to implement a prior adjustment according to the embodiment of the present invention.

As shown in FIG. 13, as the search condition, a plurality of search level values (1), (2), (3), (4), . . . is provided to the respective prior adjustment factors in a reference noise condition selected from among the plurality of noise conditions. In the search control unit 5, the level values of the prior adjustment factor is changed based on the search condition. The simulator 10 calculates a characteristic value of the target characteristic and a search characteristic value of the reference characteristic, based on the search level values, which are the level values of the prior adjustment factor, the experiments providing the combinations of the levels of the control factors, and the level values of the noise factors. The simulation control unit 4 controls the timing to feed the input values and the timing to transmit the output value of the simulator 10, so as to repeat each of simulations for the experiments required for the prior adjustment. The arrangement unit 19 creates a result list in which the input values of the simulator 10 and the output values of the simulator 10, corresponding to the input values, have a relation with each other in which either one may be extracted from the other.

In Step S3, a search is made for the adjustment value of the prior adjustment factor by the selected search method, based on result of the prior adjustment carried out for all experiments of the orthogonal array experiments for the reference noise condition. For example, the adjustment unit 21 searches for the adjustment value of the prior adjustment factor, to provide a reference characteristic that is substantially equal to the reference value of the reference characteristic, for each of the experiments, based on the search level values and the search characteristic value in the result list. The adjustment unit 21 transmits the reference characteristic value of the reference characteristic for the adjustment value to the adjustment characteristic storage 22.

In Step S4, the reference characteristic determination unit 23 determines whether the reference characteristic value for the adjustment value is substantially equal to the reference value. When the reference characteristic value for the adjustment value is indeed substantially equal to the reference value, the process advances to Step S5.

When the reference characteristic value for the adjustment value is not substantially equal to the reference value, the process returns to Step S1. In Step S1, the control factors, the reference characteristic, the prior adjustment factor, and the like, are reexamined. It is effective to reexamine the kind of control factors or the level values of the control factors, for example. When there is interaction that cannot be adjusted in the prior adjustment, it is effective to use a sliding level for a specific control factor. Moreover, it is effective to use a factor, which can more strongly carry out prior adjustment, as the prior adjustment factor, and to use other characteristic variable as the reference characteristic.

In Step S5, the characteristic value of the target characteristic is calculated by the simulation for all of the experiments of the orthogonal array experiment with respect to all noise conditions. Moreover, the characteristic value of the target characteristic may be calculated for all of the experiments of the orthogonal array experiments with respect to the reverence noise conditions, in Step S3. The orthogonal array experiment control unit 24 controls each experiment of orthogonal array experiments so as to determine the adjustment value of the prior adjustment factor and the target characteristic value of the target characteristic corresponding to each of the experiments using the simulator 10.

In Step S6, post-processing is carried out in which a signal to noise (S/N) ratio and a sensitivity of the target characteristic are analyzed. The post-processing module 25 determines an optimal value of the target characteristic and an optimal combination of the levels of the control factors, which provides the optimal value of the target characteristic, based on the target characteristic of each of the experiments, by analysis of the S/N ratio and the sensitivity of the target characteristic.

In Step S7, the target characteristic determination unit 26 determines whether the optimal value of the target characteristic achieves the desired target value. When the optimal value of the target characteristic does not achieve the desired target value, the process returns to Step S1. When the optimal value of the target characteristic achieves the desired target value, the optimization method is ended.

In the optimization method of the embodiment of the present invention, when optimizing the structure which depends on a plurality of manufacturing parameters, the target characteristic may be optimized after preliminarily adjusting the structure to provide the reference value with regard to the reference characteristic, using a computer. As a result, it is possible to improve the precision of optimization analysis, and to improve the efficiency of optimization processing. Although the optimization method of the embodiment of the present invention is not limited to an orthogonal array experiment, it is particularly effective to use the optimization method in the orthogonal array experiment.

When the target characteristic of the structure nonlinearly depends on a plurality of manufacturing parameters, by analyzing the structure in a subspace having a group of adjusted structures in which each reference characteristic provides each reference value, with respect to a certain reference characteristic corresponding to a specific target characteristic, the linearity of the response of the other target characteristics related to the reference characteristic is increased. Also, the precision of approximation by a first-order expansion is improved. By adjusting the prior adjustment factor, which is one of manufacturing parameters of the structure, it is possible to easily obtain the group of adjusted structures.

In the orthogonal array experiment, when the interaction can be ignored, the experimental results comply with the additivity rule, and an analysis by combining results of a plurality of factorials can be easily carried out. Therefore, it is possible to easily select a structure to minimize a variation of the target characteristic, and a structure to approximate the target value for the target characteristic.

In the optimization method of the embodiment of the present invention, when the orthogonal array experiment is carried out after the prior adjustment, any related interaction will be artificially eliminated by the prior adjustment. Furthermore, the experimental results comply with the additivity rule. Thus, it is possible to select a structure to minimize a variation of the target characteristic, and a structure to approximate the target value for the target characteristic. Additionally, it is possible to determine the optimal value for the plurality of manufacturing parameters in one attempt. Thus, it is possible to dynamically improve the efficiency of the analysis for determining the optimum structure.

The orthogonal array experiment after carrying out the prior adjustment, as the optimization method of the embodiment of the present invention, is an analysis having a binding condition using prior adjustment. The prior adjustment is carried out using a factor other than the control factors which construct the orthogonal array. The orthogonality of the control factors is retained, and thus it is possible to apply the technique of the orthogonal array experiment. By the prior adjustment, the orthogonal array experiment may be an analysis for the structure in which the related target characteristic is similar to the preliminarily adjusted reference characteristic. Thus, the linearity of the response to the control factors with respect to the target characteristic may be improved. An actual variable space having interactions between variables due to nonlinearity is analyzed by mapping in a space in which the interactions are made increasingly uniform by preliminarily adjusting the reference characteristic.

Even on the current orthogonal array experiment, a technology of a sliding level to combine and change the levels of a plurality of factors in conjunction with each other for eliminating interactions is used. The aspect of the optimization method of the embodiment of the present invention may correspond to sliding the entire control factors of the structure in order that the reference characteristic may satisfy the reference value by using the prior adjustment factor.

Processing of the optimization method of the embodiment of the present invention can be provided by an executable optimization program on a computer. The processing for optimization can be executed by a computer by use of the optimization program.

Herein below, description will be given with the flowchart shown in FIG. 14 for a method of processing the characteristic value of the target characteristic and the search characteristic value of the reference characteristic calculated by the simulator 10 in the prior adjustment, by using the prior adjustment factor in Step S2 shown in FIG. 12. In particular, description will be given for a method of extracting the characteristic value of the target characteristic and the search characteristic value of the reference characteristic from the output value of the string extraction unit 12 shown in FIG. 1. Further, comparison of a token and storing an extraction target token, implemented in the token creation module 104 shown in FIG. 3, will be described.

In Step S201, a number (i) of a comparison target token attained by dividing the simulation output value stored in the output value storage 11 into tokens is initialized to zero. In Step S202, the number (i) of the comparison target token is incremented to (i=i+1).

In Step S203, there is a determination as to whether the comparison target token (i) corresponding to the number (i) is the last token. If the comparison target token (i) is the last token, the process is ended. If the comparison target token (i) is not the last token, the process proceeds to Step S204.

In Step S204, a number (k) of a comparison token retained in the data structure shown in FIG. 4 is initialized to zero.

In Step S205, the number (k) of the comparison token is incremented to (k=k+1).

In Step S206, there is a determination as to whether the number (k) of the comparison token is a maximum number which is a data number n of the comparison token list.

When the number (k) of the comparison token is the maximum number, in Step S211, it is determined that the current target token corresponds to data for extraction, and thus the temporarily stored target token and a variable name are duly registered in a table stored in the token data storage 131 shown in FIG. 3.

Alternately, when the number (k) of the comparison token is not the maximum number, the process proceeds to Step S207, and a discriminator of the comparison token (k) is discriminated.

When the discriminator is a variable, in Step S208, after the comparison target token (i) is temporarily stored into virtual memory, the process proceeds to Step S205.

Alternatively, when the discriminator of the comparison target token (i) is a comparison string, in Step S209, a comparison flag of the comparison token (i) is determined. When a value of the flag is "No", the process returns to Step S205 without doing anything else. When the value of the flag is "Yes", the process proceeds to Step S210.

In Step S210, the comparison target token (i+k−1) is compared with the comparison token (k). When the comparison target token (i+k−1) is identical to the comparison token (k), the process proceeds to Step S205. When the comparison target token (i+k−1) is not identical to the comparison token (k), the process proceeds to Step S202.

By the above processing, it is possible to store the value of the token to be extracted in the table of the variable name and token value stored in the token data storage 131, from the simulation output value of the output value storage 11, so that the variable name is attached to an extracted portion of the simulation output value by the information stored in the format data file 35b. To facilitate ease of understanding, detailed error handling is not shown, and in the following description with the flowcharts shown in FIGS. 15 to 19 as well, the detailed error handling will be omitted.

Next, description will be given with the flowchart shown in FIG. 15 for transmitting an output string including the extracted tokens of the token output module 105 shown in FIG. 3, from the output value of the output value storage 11.

In Step S301, in the token output module 105, an output format of an output string is extracted and the output string is initialized. For example, in initializing the output string, the character "NULL" is substituted, when using C programming language.

In Step S302, a character number (i) and a variable number (k) of the string of the output format are initialized to zero. In Step S303, the character number (i) is incremented to (i=i+1).

In Step S304, there is a determination as to whether the character corresponding to the character number (i) is the last character of the output format.

When the character corresponding to the character number (i) is the last character, the process proceeds to Step S310, and an output string having the first to I-th characters corresponding to the character number (1) to (i) is transmitted to a previously designated output apparatus.

When the character corresponding to the character number (i) is not the last character, the process proceeds to Step S305, and there is a determination as to whether the i-th character corresponding to the character number (i) of the string of the output format is a replacement character replaced by a variable. When following a format designated by the instruction of the C programming language, such as "printf", there is a determination as to whether the character is a "%".

When the character is not a replacement character, the process proceeds to Step 311. After adding a character of the character number (i) to the output string, the process proceeds to Step S303.

In Step S306, when the character is the replacement character, the variable number (k) is incremented to (k=k+1).

In Step S307, a name of the k-th variable is extracted from a variable list of the output format.

In Step S308, a token value related to the name of the k-th variable is extracted from the table of the variable name and token value stored in the token data storage 131.

In Step S309, after adding the extracted token value to the output string, the process proceeds to Step S303.

Herein below, description will be given regarding the handling method of the characteristic value of the target characteristic and the search characteristic value of the reference characteristic calculated by the simulator 10, in the prior adjustment using the prior adjustment factor in Step S2 shown in FIG. 12. Particularly, description will be given to a case in which there is repetition in the output value stored in the output value storage 11, in the method of extracting the characteristic value of the target characteristic and the search characteristic value of the reference characteristic from the output value executed by the string extraction unit 12 shown in FIG. 1. First, description will be given with the flowchart shown in FIG. 16 regarding the storage of the token to be compared and extracted from the token when there is repetition in the processing of the token creation module 104 shown in FIG. 3.

Figure 14:
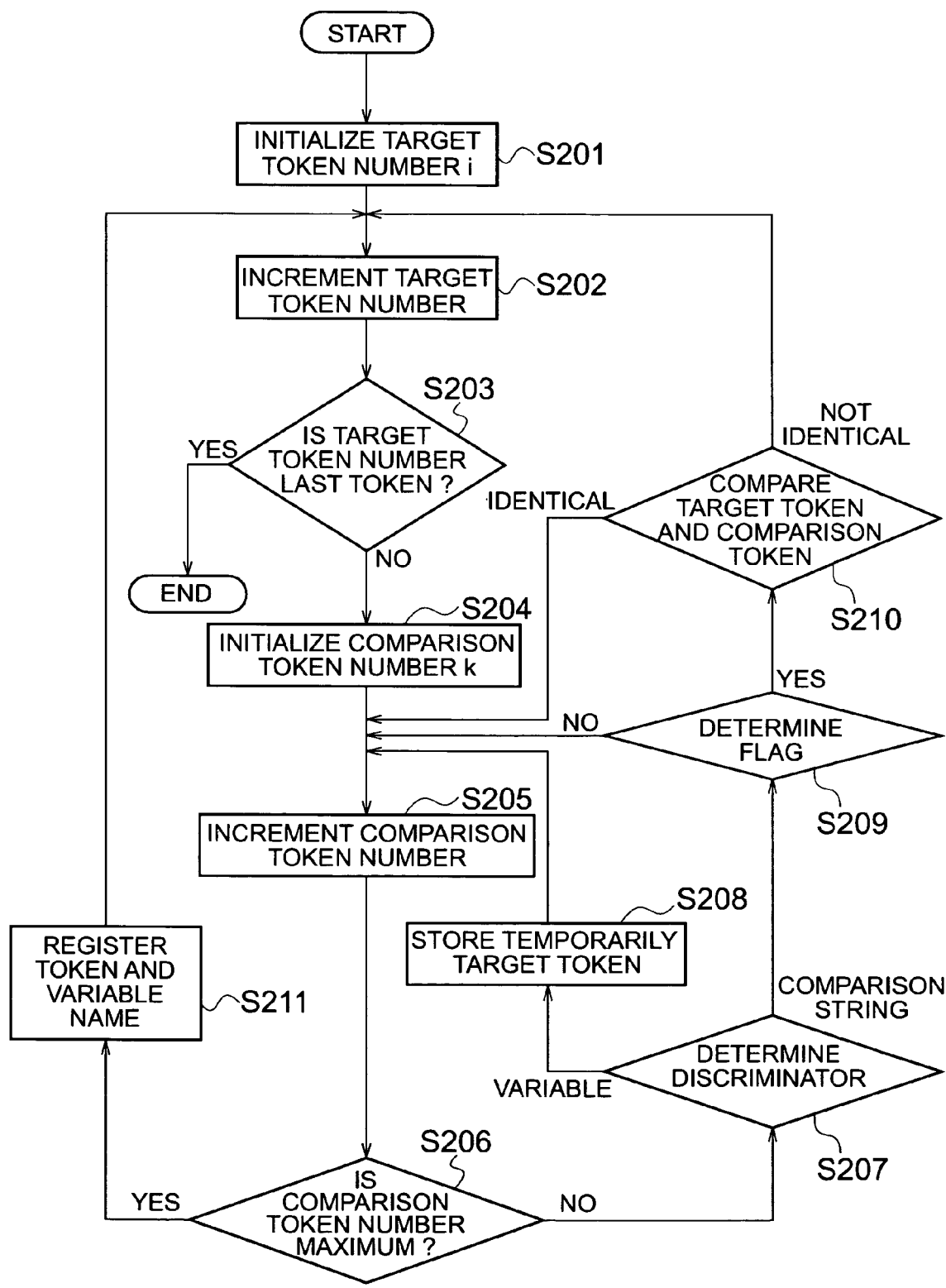
FIG. 14 is a flowchart showing an example of a method for extracting a characteristic value of a target characteristic and a search characteristic value of a reference characteristic according to the embodiment of the present invention.
Figure 16:
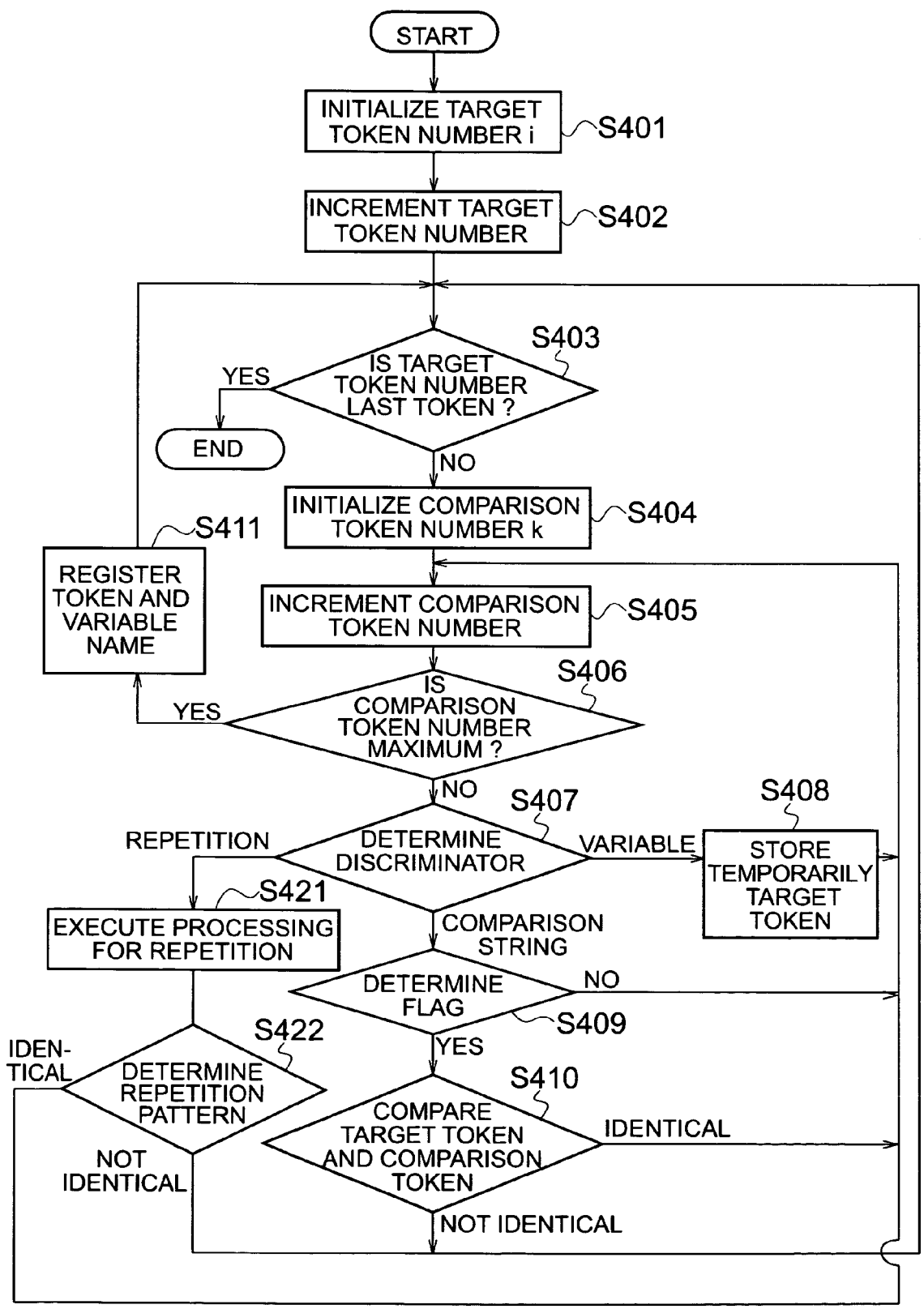
FIGS. 16 and 17 are flowcharts showing another example of a method for extracting a characteristic value of a target characteristic and a search characteristic value of a reference characteristic according to the embodiment of the present invention.

Steps S401 to S406 and S408 to 411 in the flowchart shown in FIG. 16 correspond to Steps S201 to S206 and S208 to S211 of the flowchart shown in FIG. 14. Step S407 corresponds to Step S207 with adding processing for repetition.

Steps S421 and S422 are newly added. When it is determined that the discriminator is for repetition, in Step S407, processing for repetition is carried out in Step S421.

In Step S422, there is a determination as to whether a repetition pattern of the comparison target token is identical. When the repetition pattern of the comparison target token is identical, the process returns to Step S403. When the repetition pattern of the comparison target token is not identical, the process returns to Step S405.

Figure 17:
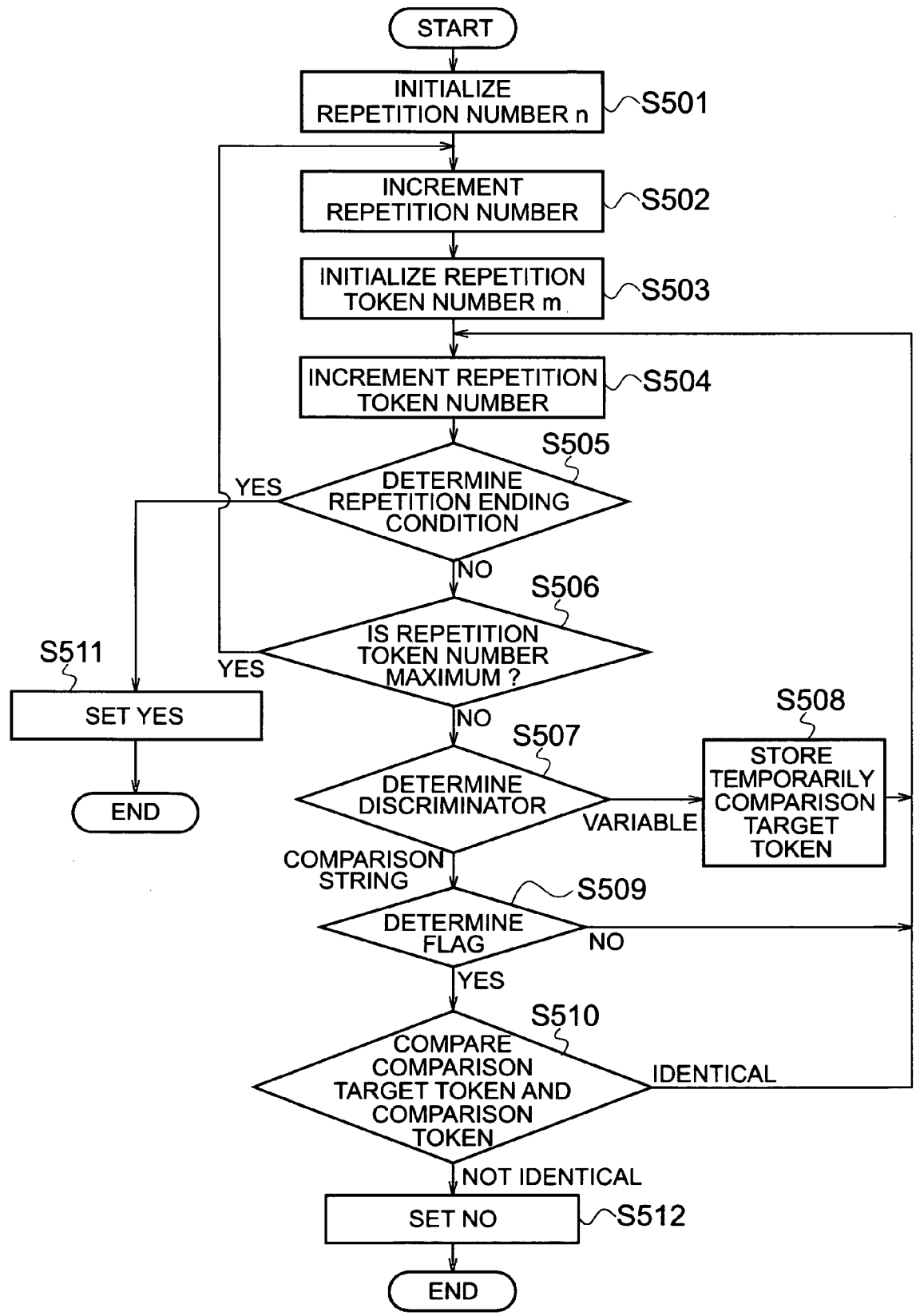

The processing for repetition in Step S421 will be described with the flowchart shown in FIG. 17.

In Step S501, a number (n) of the repetition is initialized to zero. In Step S502, the number (n) of the repetition is incremented to (n=n+1). In Step S503, a repetition token number (m) is initialized to zero. In Step S504, the repetition token number (m) is incremented to (m=m+1).

In Step S505, it is determination whether a repetition ending condition is satisfied.

When the repetition ending condition is satisfied, the process proceeds to Step S511, and a variable for indicating a repetition pattern identification is set to "Yes" or "1". For example, the variable may be a return value when processing shown in FIG. 17 is provided by a single function of the C programming language.

Alternately, when the repetition ending condition is not satisfied, the process proceeds to Step S506, and there is a determination as to whether the repetition token number (m) is a maximum number. When the repetition token number (m) is the maximum number, the process returns to Step S502. When the repetition token number (m) is not the maximum number, the process proceeds to Step S507.

In Step S507, there is a determination as to whether the discriminator of the comparison token (m) is a variable or a comparison string.

When the discriminator is a variable, the process proceeds to Step S508. After temporarily storing the comparison target token, the process returns to Step S504.

When the discriminator is a comparison string, the comparison flag is determined. When the comparison flag is "No", the process returns to Step S504. When the comparison flag is "Yes", the comparison target token (i+m−1) is compared to the comparison token (m) in Step S510. When the comparison target token (i+m−1) is identical to the comparison token (m), the process returns to Step S504. When the comparison target token (i+m−1) is not identical to the comparison token (m), the variable for indicating the repetition pattern identification is set to "NO" in Step S512, and the processing is ended.

Next, description will be given with the flowchart shown in FIG. 18 for transmitting the extracted token from the token output module 105, shown in FIG. 3, when there is repetition in the output value stored in the output value storage 11.

Figure 15:
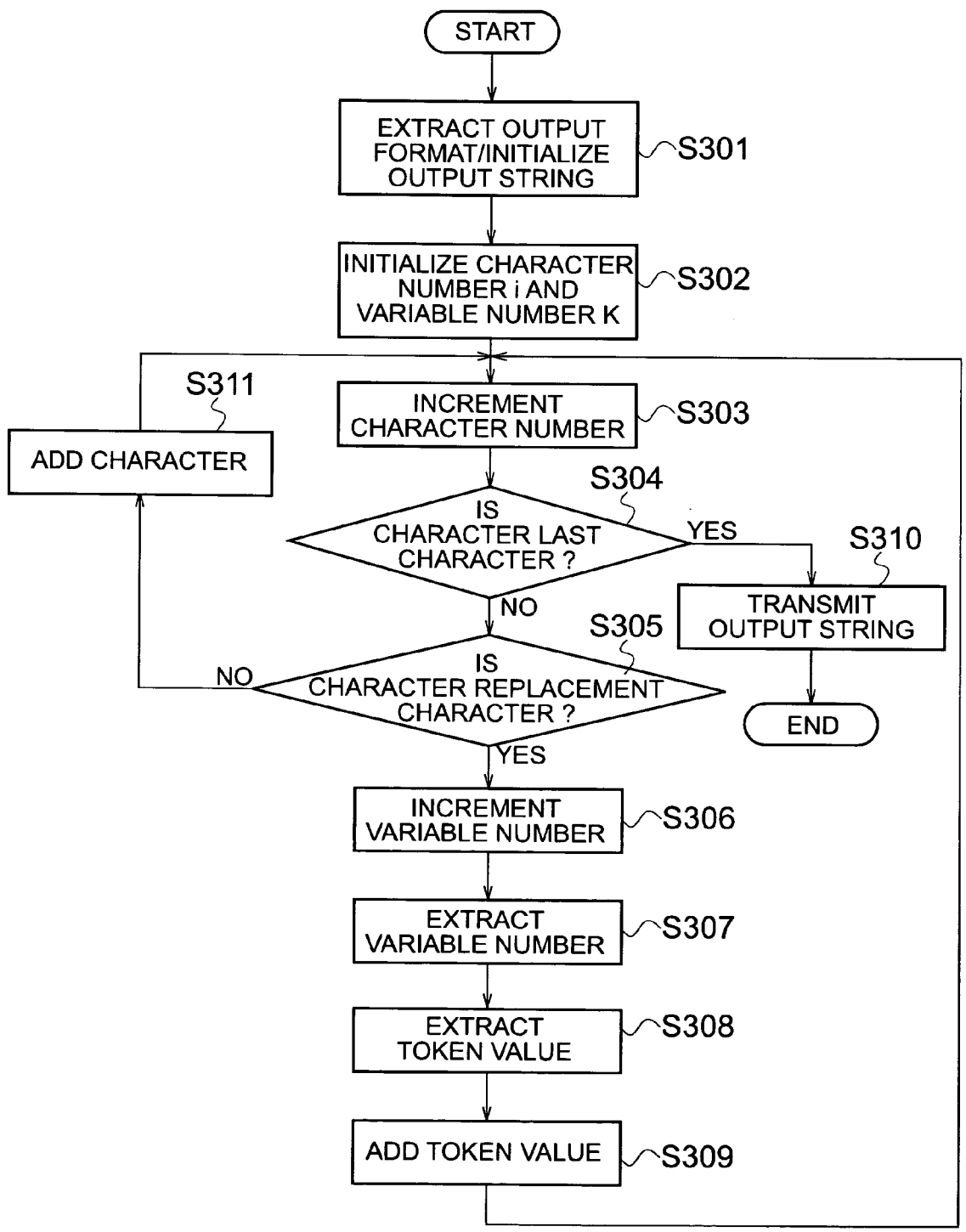
FIG. 15 is a flowchart showing an example of a method for transmitting a characteristic value of a target characteristic and a search characteristic value of a reference characteristic according to the embodiment of the present invention.
Figure 18:
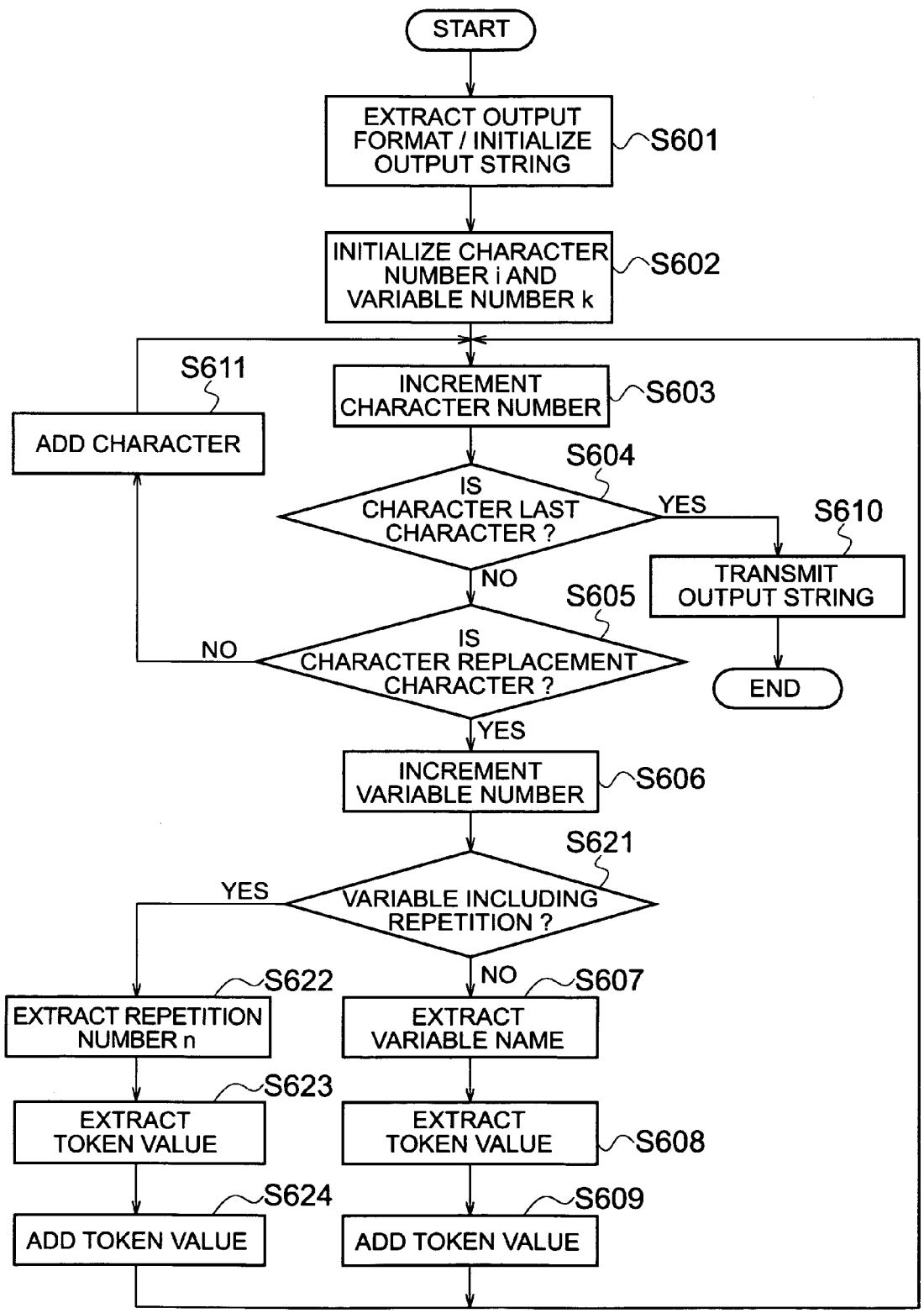
FIG. 18 is a flowchart showing another example of a method for transmitting a characteristic value of a target characteristic and a search characteristic value of a reference characteristic according to the embodiment of the present invention.

Steps S601 to S611 in the flowchart shown in FIG. 18 correspond to Steps S301 to S311 in the flowchart shown in FIG. 15, respectively. In FIG. 18, Steps S621 to S624 are newly added.

In Step S621, which is inserted between Steps S606 and S607, there is a determination as to whether the output value is the variable having repetition. When the output value is a variable having repetition, the process proceeds to Step S622. In Step S622, a k-th variable name is extracted from the variable list, and a repetition number (n) is extracted from the output format.

In Step S623, data having the k-th variable name and the repetition number (n) is extracted from the variable name and token value table.

In Step S624, the token value of the data having the k-th variable name and the repetition number (n) is added to the output variable string. The process returns to Step S603.

In Step S621, when the output value is not the variable having repetition, the process proceeds to Step S607.

Next, description will be given with the flowchart shown in FIG. 19 for transmitting the extracted token from the token output module 105 when there is a formula in the output format and formula processing is carried out in the extraction of the characteristic value of the target characteristic and the search characteristic value of the reference characteristic from the output value.

Figure 19:
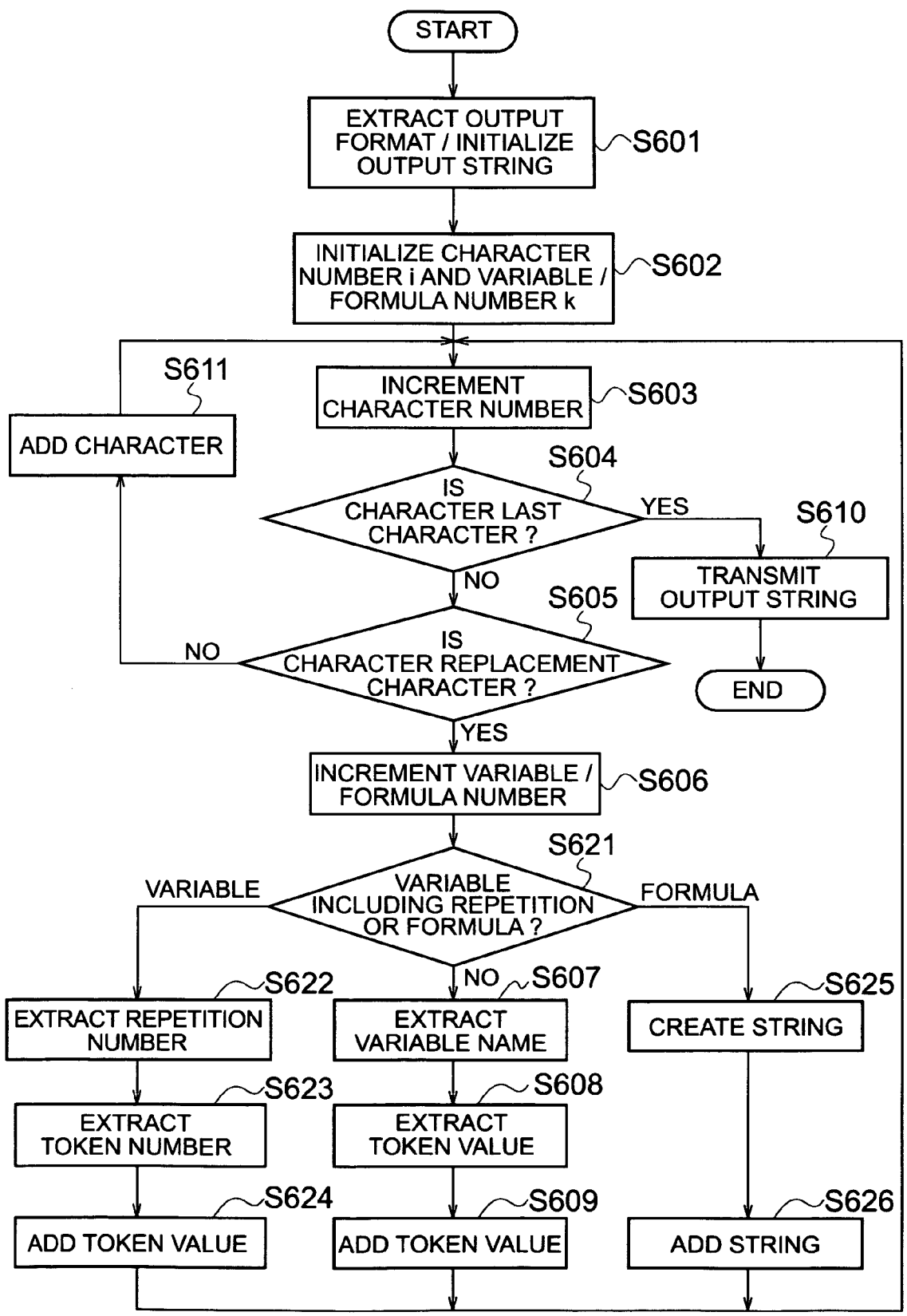
FIG. 19 is a flowchart showing another example of a method for extracting a characteristic value of a target characteristic and a search characteristic value of a reference characteristic according to the embodiment of the present invention.

Steps S602 to S611 in the flowchart shown in FIG. 19 correspond to Steps S302 to S311 in the flowchart shown in FIG. 15. In FIG. 19, Steps S621 to S626 are newly added.

In Step S621, which is inserted between Step S S606 and S607, there is a determination as to whether the output value is a formula or a variable having repetition. When the output value is the formula, the process proceeds to Step S625. In Step S625, table data processing is carried out based on the formula, and a string is created as a result.

In Step S626, the string, which is the result of the table data processing is added to the output variable string, and the process returns to Step S603.

In Step S621, when the output value is the variable having repetition, the processing in Steps S622 to S624 are carried out in the same manner as in the flowchart shown in FIG. 18.

In Step S621, when the output value is neither the formula nor the variable having repetition, the process proceeds to Step S607.

The detailed description of Step S625 is disclosed in literature, for example, of "Herbert Schildt, ADVANCED C, McGraw-Hill, 1986". Therefore, because the processing in Step S625 is well known and requires an enormous amount of processing, a detailed description of the processing in Step S625 is omitted.

According to the embodiment of the present invention, it is possible to easily design a high performance semiconductor device, by optimizing the structure of the semiconductor device, so as to provide the optimal value of the characteristic value and the optimal combination of level values of the control factors which have an influence on the optimal value of the characteristic value. Thus, it is possible to manufacture a semiconductor device using a semiconductor substrate as the object of processing, or other industrial product, based on a condition determined by the optimization design.

FIRST EXAMPLE

In a first example of the embodiment of the present invention, a structure of a minute MOSFET is optimized using a simulation and an orthogonal array experiment having a binding condition by applying the optimization system and the optimization method of the embodiment. Specifically, an example of a MOSFET structure is provided in which the short channel effect, due to a variation of a gate length, is suppressed. Simultaneously, an off leak current Ioff is decreased and a driving current Ion is increased. This prevents a decrease in the yield rate in miniaturization due to processing variations. The description will be given in conjunction with the flowchart shown in FIG. 12.

In Step S1, a preliminary survey is carried out. For the preliminary survey, control factors and noise factors are selected from among a plurality of factors. For the control factors, twenty four manufacturing parameters are selected. For the noise factors, three manufacturing parameters are selected. Examination of optimization will be carried out in regard to these twenty four parameters. Next, a reference characteristic is selected, and a reference value of the reference characteristic is selected. Further, a prior adjustment factor is selected and a condition of the orthogonal array experiment is created. From among the twenty four control factors, with regard to a single parameter out of the selected twenty four parameters, two levels are set for eleven control factors, and three levels are set for twelve control factors. A L36 orthogonal array is used as the orthogonal array.

In Step S1, examination of the structure of the MOSFET is carried out using the simulation result of the simulator 10 as the preliminary survey. In a structure for decreasing the off leak current Ioff, the drive current Ion is also generally decreased. Put simply, there is a trade-off relation between the off leak current Ioff, and the drive current Ion. In the first example of the embodiment of the present invention, the off leak current Ioff of the MOSFET is selected as the reference characteristic. The reference value of the reference characteristic is set to 100 nA/μm based on a product specification of a LSI which includes the MOSFET. More specifically, in a MOSFET structure in which the off leak current Ioff is fixed to 100 nA/μm, a search is conducted and a selection is made of MOSFET structure that increases the drive current Ion. When selecting the MOSFET structure that increases the drive current Ion, there is no need to consider the off leak current Ioff, and thus it is possible to definitely select a MOSFET structure.

Moreover, dependence of the off leak current Ioff on various manufacturing parameters Xi of the MOSFET has been examined. It has been learned that the off leak current Ioff strongly depends on an implant dose of halo ions. Consequently, the implant dose of the halo ions is selected as the prior adjustment factor for adjusting the off leak current Ioff. This is because, a parameter having such a high sensitivity to the reference characteristic can adjust the reference characteristic with a slight change of value. Further, even if the implant dose of halo ions is changed slightly, it is understood that optimal values of the other manufacturing parameters Xi will not be significantly changed.

As shown in FIG. 20, an orthogonal array is created considering the dependence of characteristics, such as the drive current Ion, on the other manufacturing parameters Xi of the MOSFET. In the first example of the embodiment of the present invention, an experiment condition table shown in FIG. 21 is created using the L36 orthogonal array shown in FIG. 20. In the L36 orthogonal array, eleven control factors from factor A to factor K have two level values, and twelve control factors from factor L to factor W have three level values, respectively. In experiments of thirty-six runs, with respect to each level of the factors A to W, all levels of other factors are set to evenly appear in each experiment. The configuration of the levels is such that the experiment conditions are mutually orthogonal. The twenty-three factors A to W are parameters to control characteristic values of desired characteristics to be improved. Thus, each of the factors A to W is referred to as a control factor. The numerals "1", "2", and "3" on each of the control factors A to W shown in FIG. 20, correspond to a first level, a second level, and a third level, respectively. As shown in FIG. 21, level values are allocated to each level of the twenty-three control factors A to W shown in FIG. 20.

When experiments are planned using the L36 orthogonal array, it is known that it is possible to analyze a variation of the characteristic value of the target characteristic which is to be improved and a magnitude of the characteristic value of the target characteristic, by the thirty-six runs of the experiments shown in this chart, without executing $2^{11} \times 3^{12}$ experiments for each of the levels of the twenty-three factors A to W.

Further, when carrying out the orthogonal array experiment, the noise factors are provided to analyze the variation of the target characteristic value. As shown in FIG. 22A, in the first example of the embodiment of the present invention, a gate length of the gate electrode is selected as a noise factor EA. Two levels are provided to the gate length EA with respect to the center value of the permissible range of the design of the gate length. A first level EA1 is a value about 15% larger than the center value. A second level EA2 is a value about 15% less than the center value. Additionally, an error of a tilt angle of halo ion implantation, which is a control factor S, is selected as a noise factor EB. A two degrees increased value is provided to a first level EB1, and a two degrees decreased value is provided to a second level EB2, centering around a value of each level of the halo implant angle S of the halo ion implantation. Additionally, an operating temperature of the MOSFET is selected as a noise factor EC. For two levels of the operating temperature EC, a first level EC1 is set to room temperature, and a second Level EC2 is set to 65° C.

A structure that decreases the variation of the characteristic value of the target characteristic with respect to the levels of the noise factors EA, EB, and EC, is selected as a robust structure with respect to the noise factors EA, EB, and EC. The influence of the noise factors EA, EB, and EC on the MOSFET characteristic, such as the drive current Ion and the off leak current Ioff, is surveyed in the preliminary survey carried out in Step S1. More specifically, there is a survey as to whether each level of the noise factors EA, EB, and EC contributes to an increase or a decrease of the drive current Ion and the off leak current Ioff.

As shown in FIG. 22B, four noise conditions Ni1 to Ni4 are compounded. In the noise condition Ni1, the levels contributing to an increase of the drive current Ion are extracted for each of the noise factors EA, EB, and EC. The levels contributing to an increase of the drive current Ion are the levels EA1, EB1, and EC1. By use of the levels EA1, EB1, and EC1, it is possible to set the maximum drive current Ion for the noise factors EA, EB, and EC. The levels of the noise condition Ni2 contributing to a decrease of the drive current Ion are the levels EA2, EB2, and EC2. By use of the levels EA2, EB2, and EC2, it is possible to set the minimum drive current Ion for the noise factors EA, EB, and EC. The levels of the noise condition Ni3 contributing to an increase of off leak current Ioff are the levels EA1, EB1, and EC2. By use of the levels EA1, EB1, and EC2, it is possible to set the maximum off leak current Ioff for the noise factors EA, EB, and EC. The levels of the noise condition Ni4 contributing to a decrease of off leak current Ioff are the levels EA2, EB2, and EC1 respectively. By use of the levels EA2, EB2, and EC1, it is possible to set the minimum off leak current Ioff for the noise factors EA, EB, and EC.

Next, when carrying out the orthogonal array experiment, the factors strongly correlated with each other are combined and the level values of a factor which is strongly correlated with other factors are provided by referencing the level values of the other factors, to reduce the interaction between the factors. In the experiment condition chart shown in FIG. 21, the implant dose of the channel ion implantation of the factor M is provided as a sliding level with respect to the channel implant energy of the factor L. As shown in FIG. 23A, in the channel implant dose of the factor M, three levels of "Low", "Medium", and "High" are set so that the threshold voltage of the MOSFET in each of the level values L1, L2, and L3 of the channel implant energy of the factor L may be roughly the same.

Further, as shown in FIG. 23B, the factor V, which is the width of a TEOS sidewall spacer, is provided as a sliding level with respect to the factor N, which is a thickness of the sidewall spacer. The value of the spacer thickness of the factor V is provided so that the sum of the spacer thickness of the factor N and the spacer width of the factor V is 40 nm, 50 nm, or 60 nm.

Furthermore, the factor K shown in FIG. 21 is selected as a dummy factor, in which no level is set. The factor W is also selected as a dummy factor, in which level 2 and level 3 of the factor W are set to the same value. The dummy levels, as is also set forth herein below, are used for evaluating an analysis error by the orthogonal array experiment.

As shown in FIG. 20, in the first example of the embodiment of the present invention, the optimal values for a lot of the factors A to W are searched. The drive current Ion and the off leak current Ioff of the MOSFET depend on the respective factors A to W. Also, the magnitude of the influence of the respective factors A to W for the drive current Ion and the off leak current Ioff varies depending on the levels of the other factors A to W. Therefore, if examination is carried out using a portion of the factors A to W in order to search for the optimal values of the factors A to W, it is not possible to attain the entire optimal values of the factors A to W. It is desirable to carry out simultaneous examination of the influence of the factors A to W on the characteristics.

It is beneficial to use the prior adjustment in order to carry out simultaneous examination. In the first example of the embodiment of the present invention, the prior adjustment is carried out using the prior adjustment factor of the halo implant dose of the halo ion implantation shown in FIG. 21. The orthogonal array experiment is carried out using the results of the prior adjustment. In Steps S2 to S4 in the flowchart shown in FIG. 12, the adjustment unit 21 carries out adjustment of the prior adjustment factor for each run of the thirty-six experiments, to provide the reference characteristic for each run of the experiments to the same reference value. Thus, the optimal value of each factor is immediately examined using the values of the prior adjustment factor adjusted in each run of the experiments.

In Step S2, the prior adjustment is carried out using the prior adjustment factor, with respect to each run of the thirty-six experiments. In each run of the experiments, the value of the prior adjustment factor is changed without changing the level values of the control factors and the noise factors, so that the characteristic value of the reference characteristic corresponds with the reference value of the reference characteristic.

More detailed description will be given with respect to the prior adjustment. As shown in FIG. 13, the noise condition Ni1 is selected as a reference noise condition. A n-th MOSFET structure (n=1 to 36) for the reference noise condition Ni1 corresponding to the n-th run of the experiment, is prepared for each search level value (1) to (4) or more of the prior adjustment factor. The reference characteristic, such as the off leak current Ioff, is searched with respect to each search level value (1) to (4) of the prior adjustment factor. The value of the prior adjustment factor at which the value of the reference characteristic, such as the off leak current Ioff, is adjusted to be substantially equal to the reference value of the reference characteristic. Specifically, using the quasi-Newton method and the like, the search for the reference characteristic value uses the value of the prior adjustment factor which is changed in order to bring the searched characteristic value close to the reference value. By repeating the above-mentioned processing, the value of the reference characteristic is brought closer to the reference value and eventually is substantially equal to the reference value. Thus, an adjustment value of the prior adjustment factor, which provides the reference characteristic to be substantially equal to the reference value, is extracted.

In Step S3, the values of the prior adjustment factor and the characteristic values of the reference value, which are extracted in Step S2, are stored in the adjustment characteristic storage 22 to correspond to the structures of the MOSFET for all runs of the thirty-six experiments.

In the prior adjustment, simulation of the drive current Ion and the off leak current Ioff are carried out on a simulator 10 (computer) for the thirty-six structures of the MOSFET using the levels of the factors A to W and the L36 orthogonal array. For example, in a case of the structure of the tenth run of the experiments shown in FIG. 20, the levels of each of the factors in the orthogonal array are created by the array creation unit 16 as in the numerical sequence "1 2 1 2 2 1 2 2 1 1 2 1 1 3 2 1 3 2 3 2 1 3 2" for the factors A to W, as shown in FIG. 24. The array editor 18 reads the numerical sequence and converts the numerical sequence into an input data string to be used in the simulation in the simulator 10. Put simply, as shown in FIG. 25, the input data string "A1 B2 C1 D2 E2 F1 G2 H1 J1 K2 L1 M1 N3 O2 P1 Q3 R2 S3 T2 U1 V3 W2" of the factors A to W is created following the numerical sequence shown in FIG. 24.

As shown in FIG. 21, it is understood that in the factor A, the time of the level 1, which is 23 seconds, is recorded in the input data string of the level A1. Similarly, in the factor B, the implant dose of the level 2, which is $5.0 \times 10^{12}$ cm$^{-2}$, is recorded in the input data string of the level B2. The time of the factor A being 23 seconds (A1) and the implant dose of the factor B being $5.0 \times 10^{12}$ cm$^{-2}$ (B1) and the like, which are the simulation conditions, are fed to the simulator 10. As shown in the FIG. 26, specifically, the string replacement unit 7 feeds the input data of the levels A1, B2 and the like into the simulator 10 as corresponding to the simulation input data identifiers % time, % dose and the like.

Moreover, when creating the input data string, each individual data of the input data string "A1 B2 C1 D2 E2 F1 G2 H1 J1 K2 L1 M1 N3 O2 P1 Q3 R2 S3 T2 U1 V3 W2", or internal data fixed in the simulator 10, that is able to be changed according to the data input from outside of the simulator 10, is changed in accordance with the levels EA1, EB1, EC1 of the noise factor corresponding to the reference noise condition Ni1. In this manner, it is possible to carry out simulation experiments which reflect the conditions of the orthogonal array experiment and the noise condition.

Figure 28:
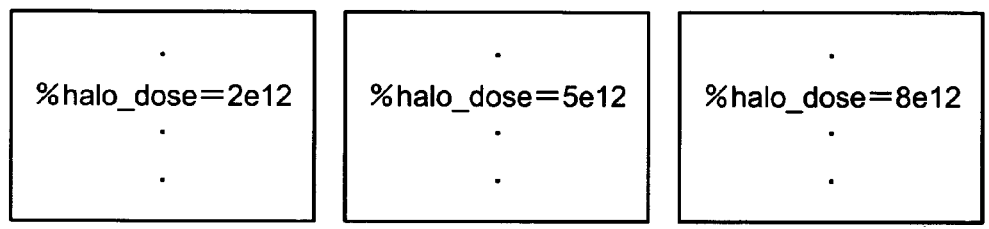
FIG. 28 is a diagram showing an example of an input value format of a prior adjustment factor used in the description of the first example of the embodiment of the present invention.
Figure 29:
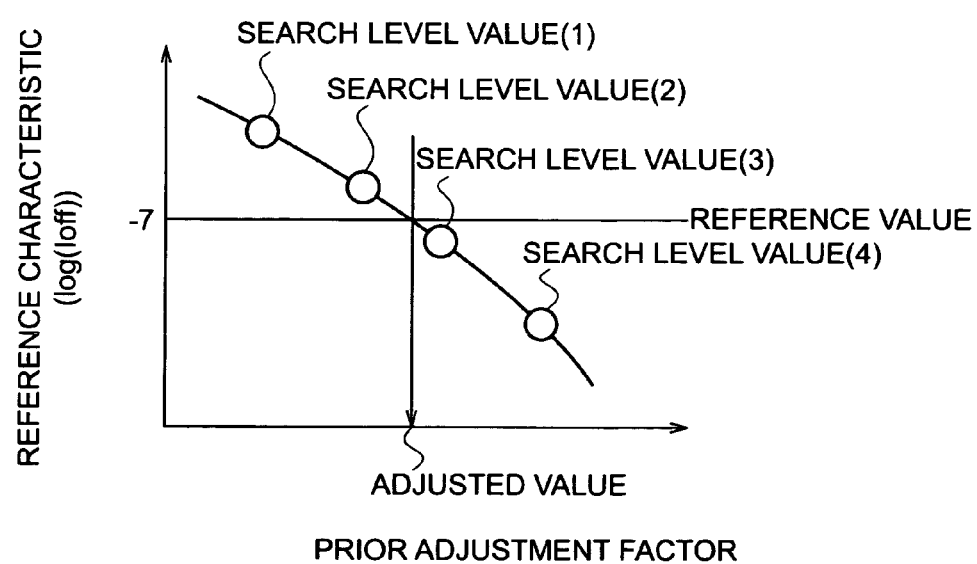
FIG. 29 is a graph showing an example of a relation of the prior adjustment factor and the reference characteristic used in the description of the first example of the embodiment of the present invention.

Moreover, the halo implant dose of the halo ion implantation, which is a simulation condition, is used as the prior adjustment factor independent of the input data string, as shown in FIG. 21. Put simply, as shown in FIG. 29, in the simulation of the experiment runs one to thirty-six for the noise condition Ni1, the halo implant dose of the halo ion implantation is changed corresponding to the search level values (1) to (4) of the prior adjustment factor shown in FIG. 13 so that the off leak current Ioff may be brought closer to the reference value Log(Ioff) of "−7". Because of this, as shown in FIG. 28, using the fixed input data shown in FIGS. 21 to 23, the search control unit 5 creates a group of input data strings including changed values of the halo implant dose. The group of the input data strings is stored in the level storage 6. Alternatively, the halo implant dose of the halo ion implantation for each input data string is changed. The halo implant dose of the halo ion implantation is changed as $2 \times 10^{12}$ cm$^{-2}$, $5 \times 10^{12}$ cm$^{-2}$, $8 \times 10^{12}$ cm$^{-2}$, and the off leak current Ioff is calculated by the simulation. Or, a series of simulations changing the halo implant dose is carried out using a series of input data strings changing the halo implant dose, to calculate a series of values of the off leak current Ioff.

As shown in FIG. 30, a concrete description is given regarding the function of the string extraction unit 12, using an example of a case in which the output value of the simulation stored in the output value storage 11 is transmitted and the drive current Ion and the off leak current Ioff are extracted.

First, the file read module 101 shown in FIG. 3 reads the entire file of the simulation output value stored in the output value storage 11.

The token divide module 103 divides the simulation output value into a plurality of tokens based on the format data file. The format data file includes information having space characters disposed in between the plurality of tokens.

As shown in FIG. 30, the token divide module 103 divides the simulation output value for the off leak current Ioff and the drive current Ion to tokens (1) to (8), and creates a 1st token string arranging the plurality of divided tokens (1) to (8), for example. The token creation module 104 creates a second token string. Using the second token string, the characteristic value of the reference characteristic may be extracted from the first token string based on the format data file.

Figure 31:
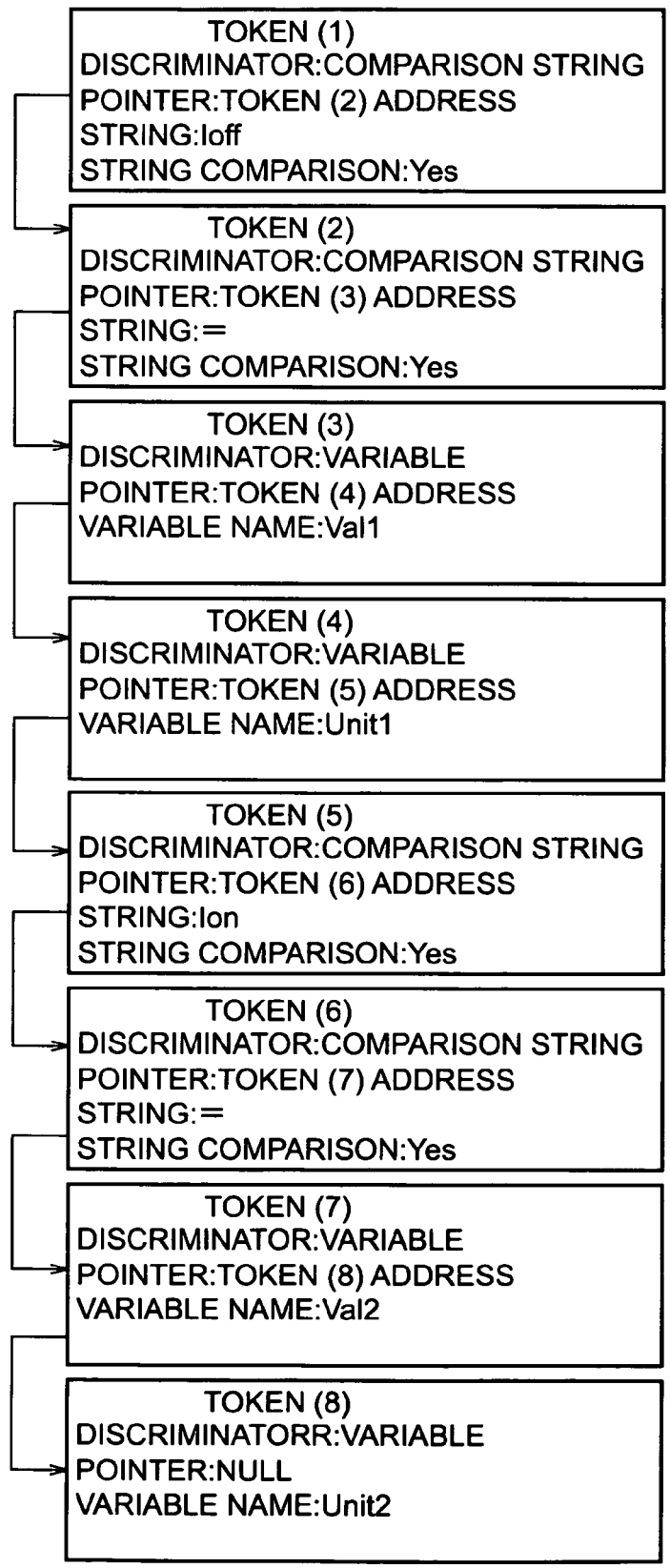
FIG. 31 is a diagram showing an example of a format data file used in the description of the first example of the embodiment of the present invention.

As shown in FIG. 31, the second token string includes either a discriminator of a comparison string or a variable, pointer of an token address for storage arranged next to the current token in the second token string, a character string, a discriminator of a string comparison, and a variable name, for each of the tokens (1) to (8). To be specific, the token (1) includes "comparison string" as the discriminator, "token (2) address" as the pointer, "Ioff" as the character string, and "Yes" as the string comparison discriminator. The token (2) includes "comparison string" as the discriminator, "token (3) address" as the pointer, "=" as the character string, and "Yes" as the string comparison discriminator. The token (3) includes "variable" as the discriminator, "token (4) address" as the pointer, and "Val1" as the character string. The token (4) includes "variable" as the discriminator, "token (5) address" as the pointer, and "Unit1" as the character string. The token (5) includes "comparison string" as the discriminator, "token (6) address" as the pointer, "Ion" as the character string, and "Yes" as the string comparison discriminator. The token (6) includes "comparison string" as the discriminator, "token (7) address" as the pointer, "=" as the character string, and "Yes" as the string comparison discriminator. The token (7) includes "variable" as the discriminator, "token (8) address" as the pointer, and "Val2" as the character string. The token (8) includes "variable" as the discriminator, "NULL" as the pointer, and "Unit2" as the character string.

Figures 32, 33:
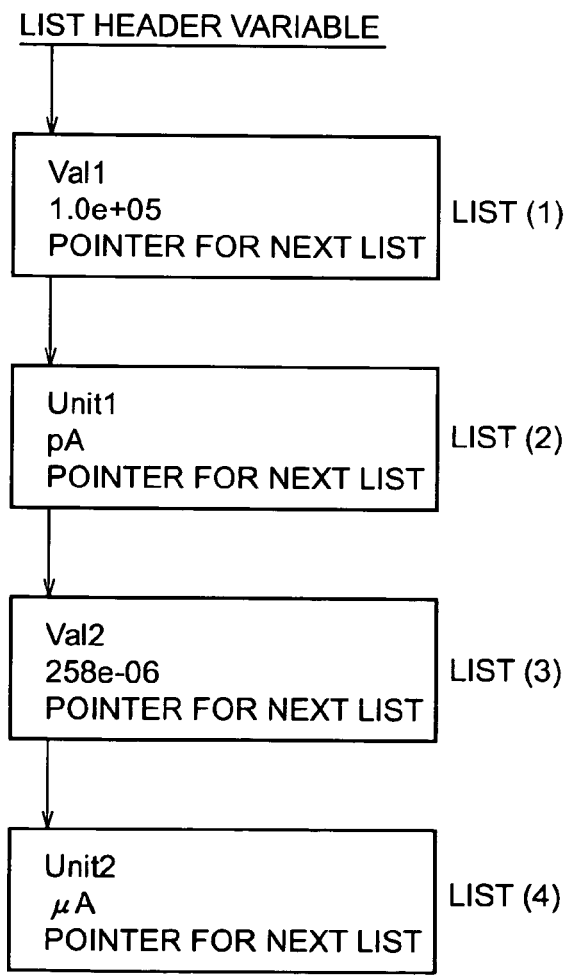
FIG. 32 is a diagram showing an example of a variable name and token value table used in the description of the first example of the embodiment of the present invention.
FIG. 33 is a diagram showing another example of a variable name and token value table used in the description of the first example of the embodiment of the present invention.

The token creation module 104 extracts the characteristic value of the reference characteristic from the first token string shown in FIG. 30 using the second token string shown in FIG. 31. The token values corresponding to the variables "Val1", "Unit1", "Val2", "Unit2" designated by the extracted information are stored in the token data storage 131 shown in either FIG. 32 or FIG. 33.

Figure 34:
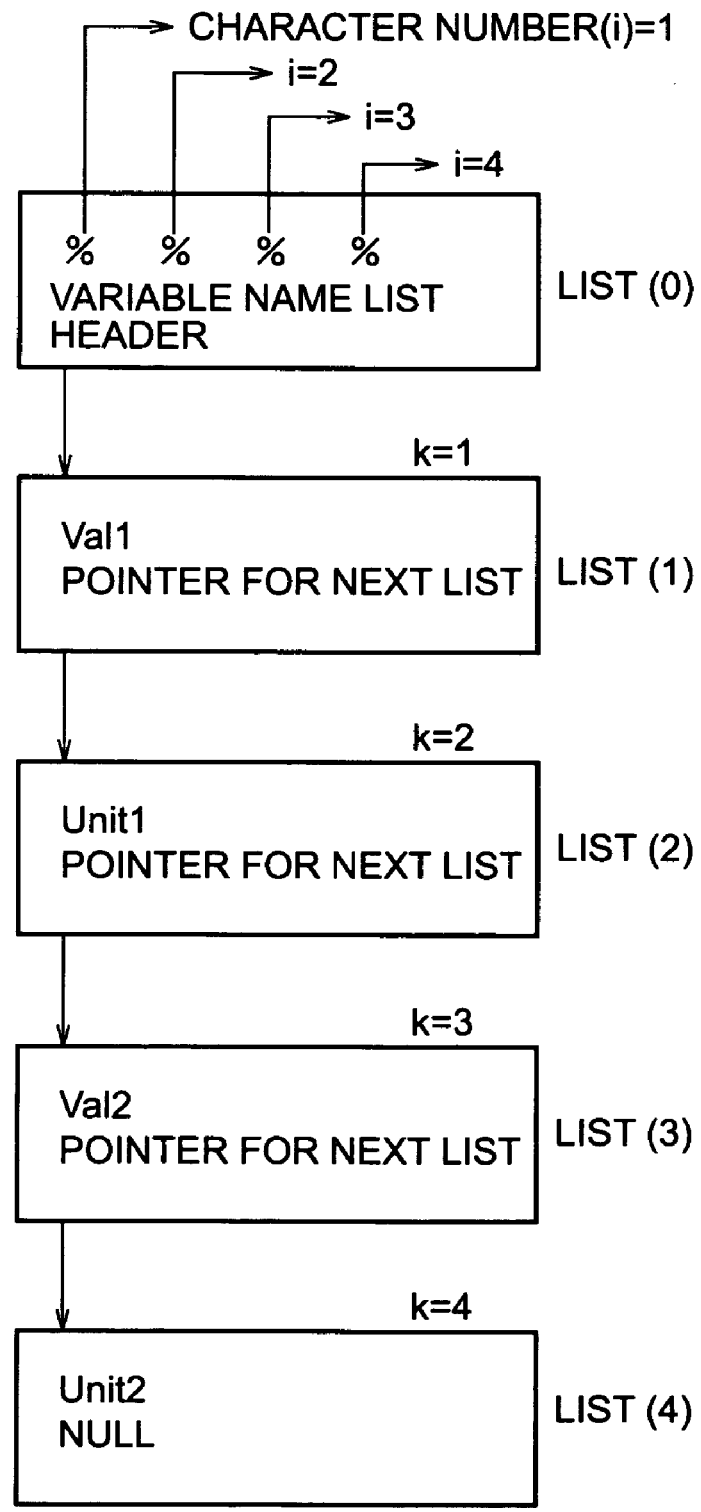
FIG. 34 is a diagram showing an example of an output format used in the description of the first example of the embodiment of the present invention.

The token output module 105 transmits the characteristic value of the reference characteristic and the characteristic value of the target characteristic stored in the token data storage 131 to the extraction characteristic storage 13, in accordance with the output format shown in FIG. 34. As shown in FIG. 34, the list (0) includes a character number string (i=1 to 4) "% % % %" as the output format, and a header of a variable name list. According to the character number string "% % % %", it is possible to replace four variables. It is possible to read out the list (1) from the header of the variable name list. The list (1) has a variable name "Val1" corresponding to the character number (1), and a pointer to the list (2). The token value "1.0e+05" corresponding to the variable name "Val1" is added to the output string shown in FIG. 33. It is possible to read out the list (2) from the list (1) by using the pointer to the list (2). The list (2) has a variable name "Unit1" corresponding to the character number (2), and a pointer to the list (3). The token value "pA" corresponding to the variable name "Unit1" is added to the output string shown in FIG. 33. It is possible to read out the list (3) from the list (2) by using the pointer to the list (3). The list (3) has a variable name "Val2" corresponding to the character number (3), and a pointer to the list (4). The token value "258e−06" corresponding to the variable name "Unit1" is added to the output string shown in FIG. 33. It is possible to read out the list (4) from the list (3) by using the pointer to the list (4). The list (4) has a variable name "Unit2" corresponding to the character number (4), and "NULL" indicating the final list. The token value "μA" corresponding to the variable name "Unit1" is added to the output string shown in FIG. 33.

The string extraction unit 12 can extract and transmit "1.0e+05 pA", and "258e−06 μA" as values of the off leak current Ioff and the drive current Ion to the extraction characteristic storage 13.

As shown in FIG. 29, using a series of values of the off leak current Ioff, which is the result of the simulation, the adjustment unit 21 determines the halo implant dose by an interpolation method or an extrapolation method so that a value of Log(Ioff) becomes −7. In this way, the prior adjustment for determining the prior adjustment factor of the halo implant dose so as to provide the reference characteristic to be equal to the reference value, is repeatedly carried out for the structures for each of the thirty-six runs of the orthogonal array experiment with each of the noise conditions in Step S3 in the flowchart shown in FIG. 12. As a result, as shown in FIG. 35, the halo implant dose value for adjusting the value of Log(Ioff) to −7 in the reference noise condition Ni1 for each of the thirty-six runs of experiments is determined.

Further, the drive current Ion is determined using the halo implant dose value adjusting the value of Log(Ioff) to −7 in the structures for each of the thirty-six runs of experiments. This is the drive current Ion data of the reference noise condition Ni1.

In Step S4, there is a determination as to whether each of the thirty-six characteristic values of the reference characteristic corresponding to the thirty-six experiments is substantially equal to the reference value. Because the logarithm of the off leak current Ioff, which is the reference characteristic, is −7 in all of thirty-six structures of the orthogonal array, all thirty-six characteristic values of the reference characteristic are determined to be substantially equal to the reference value. Thereafter, the process proceeds to Step S5. Thus, the prior adjustment processing is ended.

In addition, when even one of the thirty-six characteristic values of the reference characteristic is not substantially equal to the reference value, the process returns to Step S1. In such a case, at least one of the following processes is carried out in Step S1. (a) Change parameters for the control factors, or change the levels of the control factors. (b) Decrease the amount of interaction. Specifically, apply a multi level method or a sliding level method. (c) Change parameters for the prior adjustment factor, or change the permissible range of change of the values of adjustment factors. (d) Change the characteristic for the reference characteristics, or change the reference value of the reference characteristic.

When the process proceeds to Step S5, the input data editor 17 creates a simulation input data string for the noise conditions Ni2, Ni3, and Ni4 other than the reference noise condition Ni1, using the halo implant dose for each of the structures of the thirty-six experiments based on the search of the reference noise condition Ni1. The simulator 10 reads the input data string and proceeds to carry out a simulation. As shown in FIG. 35, the off leak current Ioff and the drive current Ion for the noise conditions Ni2, Ni3, and Ni4 are determined. In the simulation experiment result shown in FIG. 35, values of the off leak current Ioff of the reference noise condition Ni1 are adjusted to be equal to the reference value, and values of the halo implant dose shown at the right end of the drawing, which are determined by the reference noise condition Ni1, is used for the prior adjustment with the noise conditions Ni2, Ni3, and Ni4.

In Step S6, post-processing calculation is carried out using the simulation experiment results shown in FIG. 35. In post-processing, S/N ratio and sensitivity, which are used in a normal orthogonal array experiment, are calculated with respect to the off leak current Ioff and the drive current Ion. FIGS. 36 to 39 show factorial effect charts with respect to the off leak current Ioff and the drive current value Ion. In addition, the logarithm of the off leak current Ioff is used in the factorial effect chart shown in FIGS. 36 and 39. In the factorial effect charts shown in FIGS. 36 to 39, analysis error is evaluated using dummy levels K1, K2, W2, and W3. In each of the dummy levels K1, K2, W2, W3 of the factors K, W shown in FIG. 21, the level value is not changed to be the same value. Differences between effects for the dummy levels K1, K2 are errors. Also, Differences between effects for the dummy levels W1, W2 are errors.

Figure 36:
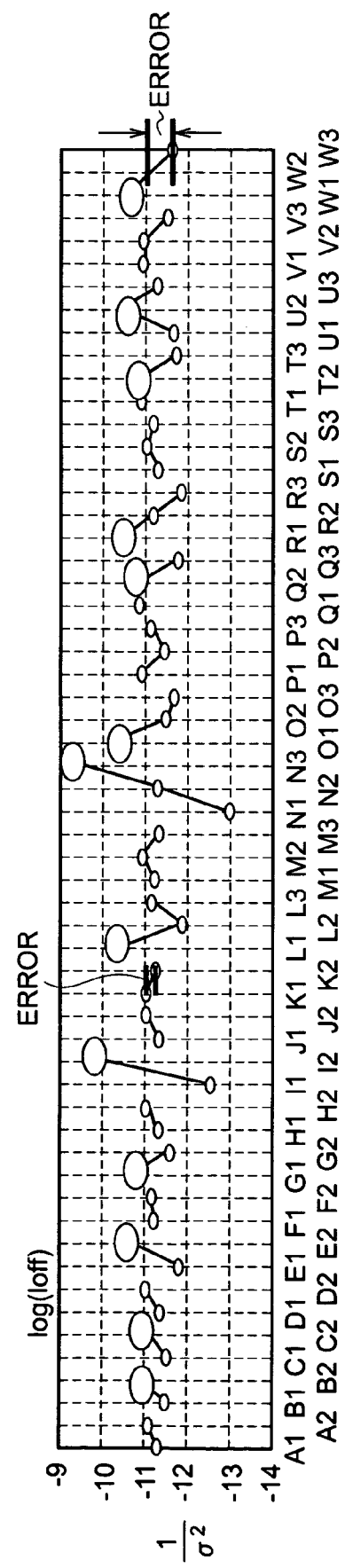
FIG. 36 is a diagram showing an example of a factorial effect chart of a S/N ratio of the reference characteristic used in the description of the first example of the embodiment of the present invention.

As shown in FIG. 36, $1/\sigma^2$ is substituted for the S/N ratio for evaluating a variation of the value of log(Ioff). Here, $\sigma$ is the standard deviation. Among the levels A1 to W3, a level which provides a large value of $1/\sigma^2$ provides a structure that even further suppresses a variation of log(Ioff) with the noise conditions Ni3 and Ni4. In the factorial effect chart in FIG. 36, the analysis error in the dummy levels K1, K2 of the dummy factor K is small compared to the level dependences of other factors. Likewise, the analysis error in the dummy levels W1, W2 of the dummy factor W is also small compared to the level dependencies of other factors. Levels B2, C2, E2, G1, I2, L1, N3, O1, Q2, R1, T2, U2, and W1, indicated by large circles in FIG. 36, can be chosen as levels having a significant difference compared to the analysis errors. A total of thirteen significant factors and level values including five factors from among the two level factors and eight factors from among the three level factors, are obtained.

Figure 37:
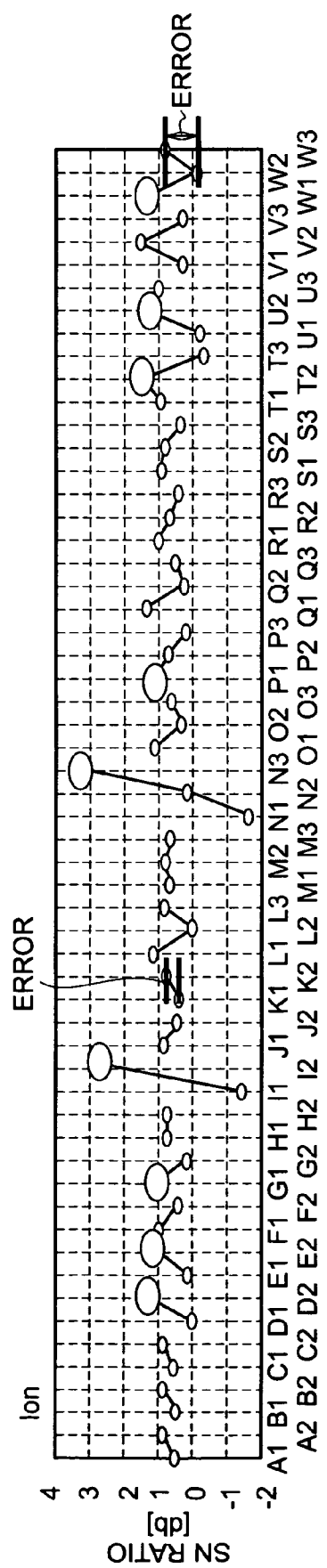
FIG. 37 is a diagram showing an example of a factorial effect chart of a S/N ratio of the target characteristic used in the description of the first example of the embodiment of the present invention.

FIG. 37 shows the factorial effect chart of the S/N ratio of the drive current value Ion. The S/N ratio is derived by dividing a value of the drive current Ion by a magnitude of the variation of the drive current Ion. When the S/N ratio is large, it indicates that there is little variation on the drive current Ion. Even for the S/N ratio of the drive current Ion, nine significant factors and levels D2, E2, G1, I1, N3, P1, T2, U2, W1 having a significant difference compared to the analysis errors are obtained.

Further, as shown in FIGS. 36 and 37, the levels suppressing the variation of the off leak current Ioff do not conflict with the levels suppressing the drive current Ion. As a result, it is possible to select the levels D2, E2, G1, N3, T2, U2, W1 to suppress variations of both the off leak current Ioff and the drive current Ion.

Figure 38:
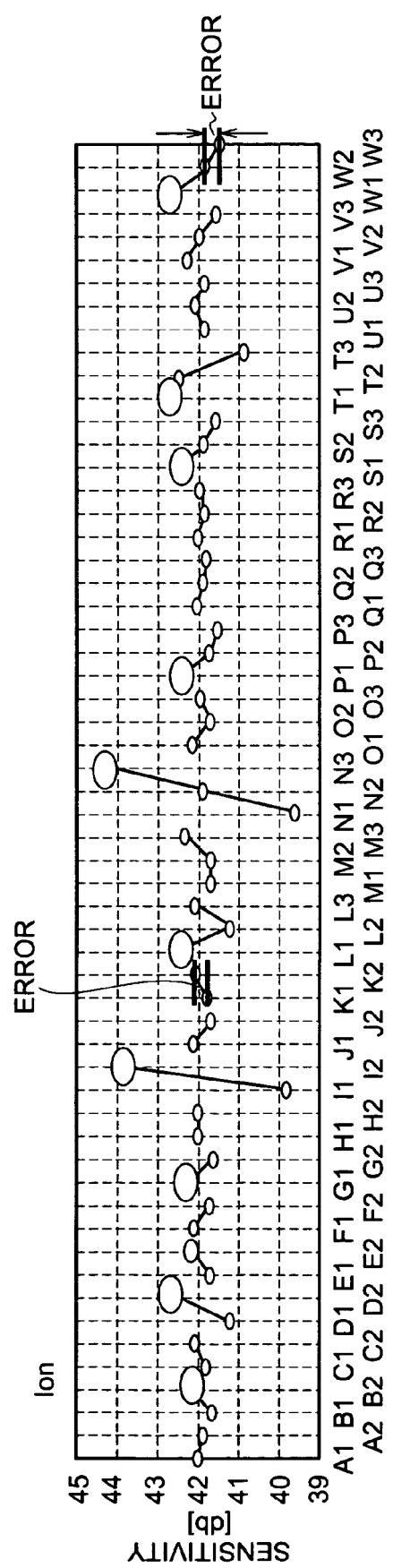
FIG. 38 is a diagram showing an example of a factorial effect chart of a sensitivity of the target characteristic used in the description of the first example of the embodiment of the present invention.

FIG. 38 shows the factorial effect chart of the sensitivity of the drive current Ion. The larger the sensitivity, the higher the off leak current Ioff. As shown in FIG. 38, the analysis error in each of the dummy levels K1, K2, W2, and W3 is small compared to the level dependence of other factors. Thus, a plurality of significant factors and the levels B2, D2, E2, G1, I2, L1, P1, S1, T1, W1 are obtained.

Figure 39:
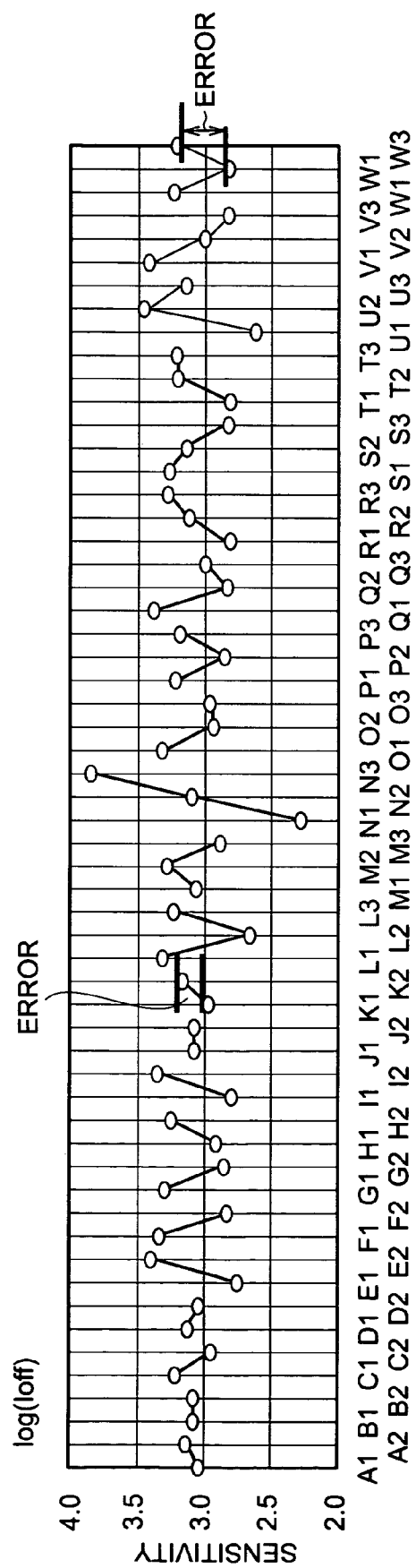
FIG. 39 is a diagram showing an example of a factorial effect chart of a sensitivity of the reference characteristic used in the description of the first example of the embodiment of the present invention.

FIG. 39 shows the factorial effect chart of the sensitivity of the off leak current Ioff. With regard to the sensitivity, the factorial effect chart of the off leak current Ioff shown in FIG. 39 indicates the same level dependence in the factorial effect chart of the drive current Ion shown in FIG. 38. Thus, in the factorial effect chart shown in FIGS. 38, 39, it is understood that a structure having a high drive current Ion has also a high off leak current Ioff and there is a trade-off relation between the drive current Ion and the off leak current Ioff.

In the first example of the embodiment of the present invention, the off leak current Ioff is adjusted using the reference noise condition Ni1 as the reference. The variation of the off leak current Ioff is reduced using the significant levels provided by the factorial effect chart shown in FIG. 36. The factorial effect chart shown in the FIG. 39 is used only for determining the tendency of the level dependence and not used for determining the optimal conditions. Based on these analysis strategies, analysis results, and other examinations, a combination of the levels B1, C2, E2, G1, I2, L2, N3, O1, P2, R1, S1, T2, U3, W1 is determined as an optimal combination of the levels, as shown in FIG. 40. In addition, the level D3 is selected for the factor D, even though the factor D has two levels in the level value table shown in FIG. 21. The reason to use the level D3 is because the value of 0.7 nm, which is even smaller than the level value of 1.0 nm of the level 2 of the factor D, is provided as the level D3 for satisfying the target value of the drive current Ion, as the effect of the factor D to the sensitivity of the drive current Ion is larger as shown in FIG. 38.

In Step S7, there is a determination as to whether the optimized characteristic value of the target characteristic is identical to the target value. When the optimized characteristic value of the target characteristic is identical to the target value, the optimization of the structure of the MOSFET is ended.

In addition, when the optimized characteristic value of the target characteristic is not identical to the target value, the process returns to Step S1. At least one of the following two processes is carried out. (1) Reexamine and change the structure of the MOSFET. (2) Reconsider and change the specification of the target value of the target characteristic.

In this manner, when the prior adjustment factor is used, the analysis error is small, and knowledge of a number of factorials, such as the S/N ratio and the sensitivity for each characteristic, may be obtained. Therefore, it is possible to simultaneously search for the optimum conditions with respect to the S/N ratio and the sensitivity for each characteristic. Further, the factorial effect may be clearly examined. Therefore, it is possible to select the control factors, which are the examination targets, from among a number of factor candidates. Further, in the prior adjustment, analysis is carried out by replacing the original structures with a group of structures having a uniform reference characteristic. Therefore, it is possible to provide a larger variation width of the level values of the factors within the adjustable range of the levels of the factors. Thus, it is possible to examine an optimal structure which is effective within an even broader selection range.

Further, because optimization for the adjusted reference characteristic is not necessary, it is not necessary to examine the trade-off relation between the characteristics including the reference characteristic. Thus, it is possible to optimize a group of structures which satisfy the specification of the target characteristic in a trade-off relation with the reference characteristic with high precision.

In the first example of the embodiment of the present invention, although only the noise condition Ni1 is used as the reference noise condition for carrying out the prior adjustment, the reference noise condition is not limited to one of the noise conditions Ni1 to Ni4. For example, two or more noise conditions maybe used as reference noise conditions in the prior adjustment. When a plurality of reference noise conditions are used, the prior adjustment factor may be set so that the average value of the reference characteristic obtained for each of the plurality of reference noise conditions is substantially equal to the reference value. Even in such a case, the value of the prior adjustment factor is set to the same value for all of the noise conditions Ni1 to Ni4 in each of the thirty-six structures of the L36 orthogonal array. The reason to set the same value of the prior adjustment factor for all of the noise conditions Ni1 to Ni4 is because, in the orthogonal array experiment, although a robust structure for suppressing the variation by the noise conditions is selected, the magnitude of the variation for each noise condition cannot be correctly provided if the prior adjustment factor is changed for each of the noise conditions.

Further, in the first example of the embodiment of the present invention, all values of the off leak current Ioff for every run of the experiments with the reference noise condition Ni1 shown in FIG. 35 are substantially identical to the value of $1\times10^5$ pA/μm or $1\times10^{-7}$ A/μm. However, this is because the search for the halo implant dose is performed by the interpolation method using the dependence of the off leak current Ioff on the halo implant dose during the simulation so that the off leak current Ioff may become about $1\times10^5$ pA/μm as shown in FIG. 29. The halo implant dose, which has a value not substantially identical to the reference value of $1\times10^5$ pA/μm but close to the reference value, may be used without using the interpolation method. If the characteristic value of the reference characteristic not identical but close to the reference value is used in the simulation, the characteristic value of the target characteristic to be optimized will include an adjustment error therein. However, the adjustment error can be minimized by use of the closest characteristic value of the reference characteristic to the reference value. Therefore, high precision optimization with small analysis error is possible due to the effectiveness of the first example of the embodiment of the present invention. Further, even if the characteristic value includes the adjustment error, the variation due to the noise conditions Ni1 to Ni4 will be correctly reflected in the analysis of the robustness with respect to each of the thirty-six kinds of structures when the value of the prior adjustment factor for each of the noise conditions Ni1 to Ni4 is substantially identical.

Compared to the method of the first example of the embodiment of the present invention in which the prior adjustment factor is used, general optimization methods based on the orthogonal array experiment first the control factors, the noise factors, and depending on the purpose, a signal factor, and the like are set in the preliminary survey. Next, without performing any prior adjustment, after setting the orthogonal array, the levels of factors, sliding levels and the like, an orthogonal array experiment is carried out following experiment conditions according to the orthogonal array.

In the general optimization methods in which prior adjustment is not carried out, it is impossible to sufficiently decrease the interaction between the factors, even when using sliding levels or the like. Therefore, generally, the analysis error of the orthogonal array experiment may become extremely large. Because of this, it is only possible to obtain a small amount of significant factors and significant levels. Other methods, such as decreasing the variation width of the level values of the factors in order to reduce analysis error, can obtain significant factors and levels. However, in this case, a range for examining the optimum structure is narrow, and thus it is impossible to carry out effective optimization.

As to the orthogonal array, besides the L36 orthogonal array used in the first example of the embodiment of the present invention, it is also possible to use a combined general type L18 orthogonal array, a multilevel L18 orthogonal array, a L108 orthogonal array, and even a larger scale orthogonal array. Also, it is possible to use even a smaller scale orthogonal array in the first example of the embodiment of the present invention. The same effects as in the first example of the embodiment of the present invention will be attained in either case.

Figure 12:
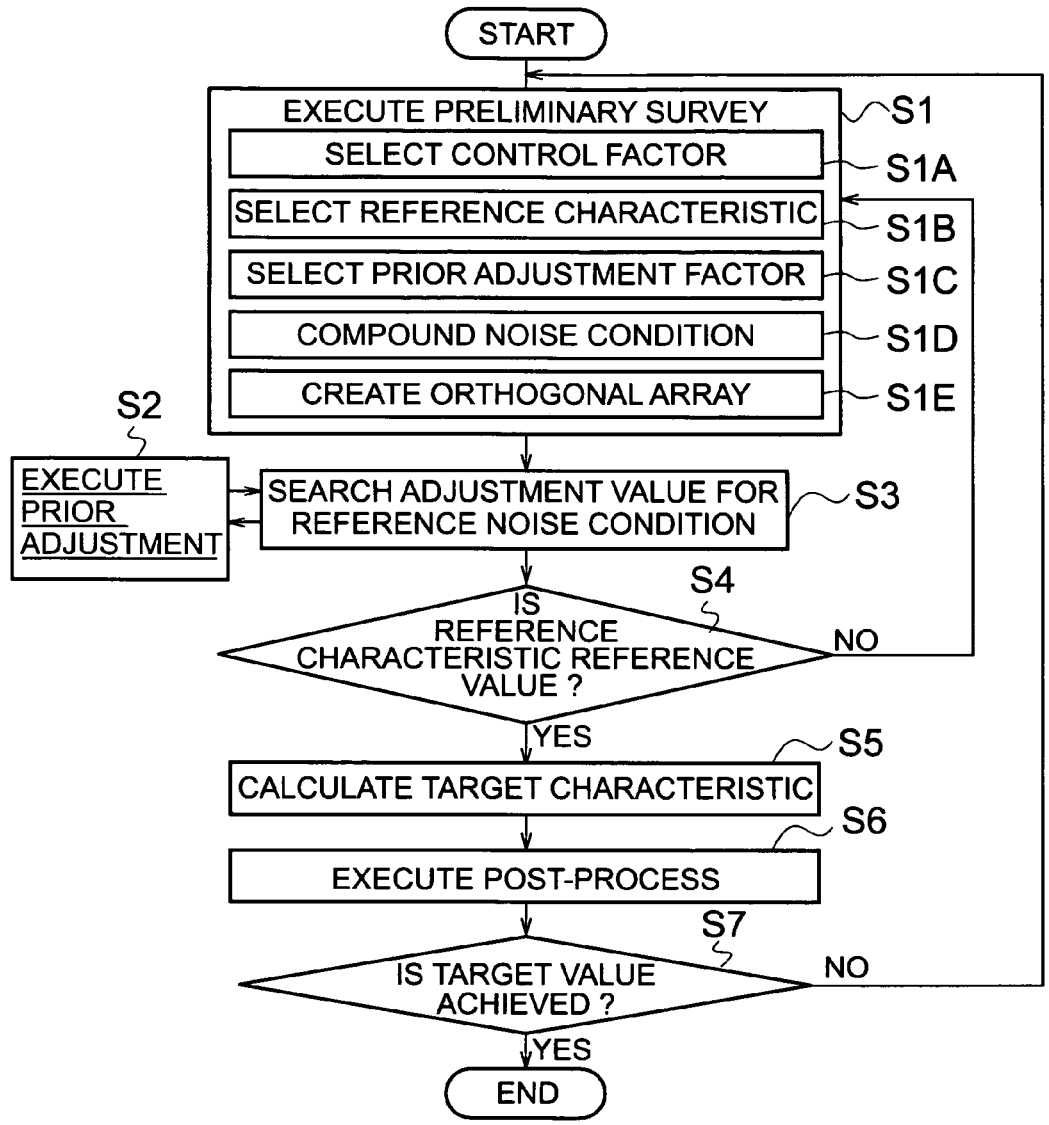
FIG. 12 is a flowchart showing an example of an optimization method according to the embodiment of the present invention.

In the first example of the embodiment of the present invention, calculation of the prior adjustment in Step S2 shown in FIG. 12 is an additional process compared to the general optimization methods. However, it is possible to easily carry out prior the adjustment processing using a computer. Also, using the orthogonal array experiment for a plurality of factors, it is possible to greatly decrease the number of simulation runs for the calculation of the characteristic value, compared to a case of using a response surface method for a plurality of variables. Also, compared to a case of using a multivariable response surface method, it is possible to perform multivariable optimization with a small number of simulation runs when using the multifactor orthogonal array experiment.

Moreover, in the first example of the embodiment of the present invention, the prior adjustment in Step S2 and the orthogonal array experiment in Step S3, shown in FIG. 12, are carried out using computer simulation. However, a trial manufacture may be used instead of the computer simulation. As the trial manufacture, the MOSFETs are manufactured by changing the halo implant dose of halo ions. Thereafter, the off leak current Ioff of each MOSFET is measured. Using a computer, it is possible to search for the implant dose that provides an off leak current Ioff that is substantially equal to the reference value by interpolation of measurement values of the off leak current Ioff. By measuring the drive current Ion of the manufactured MOSFET, it is possible to similarly search for the drive current Ion of the MOSFET implanted with the halo implant dose determined by interpolation of the measured values of the drive current Ion. It is possible to carry out the orthogonal array experiment after Step S5 in the flowchart shown in FIG. 12 of the first example of the embodiment of the present invention by using the interpolated halo implant dose determined by the prior adjustment for the MOSFETs.

Further, in the trial manufacture of the MOSFET, a plurality of MOSFETs are manufactured on a semiconductor substrate. As noise conditions, measured values of the plurality of MOSFETs may be used.

Further, in the first example of the embodiment of the present invention, the value of the off leak current Ioff is set as the reference characteristic. However, it is also possible to use another characteristic as the reference characteristic. In the case of a MOSFET, characteristics, such as a threshold voltage, a drain breakdown voltage, a short channel effect that can be evaluated by the magnitude of a variation of the drive current Ion with respect to a gate length variation, a gate leak current value, and an electric field strength at a gate electrode edge or a channel surface, may be used as a reference characteristic. In examination of a trade-off relation of the parameters with respect to optimization of a specific characteristic, optimization target characteristics having a trade-off relation between the specific characteristic are candidates for use as the reference characteristic.

It is necessary to select a reference characteristic for which the prior adjustment factor may be set so that the characteristic value can be sufficiently controlled. For this purpose, it is effective to carry out a preliminary survey by simulation in Step S1. In the preliminary survey, it is effective to use the orthogonal array experiment depending on the number of factors necessary in the optimization.

In the preliminary survey, characteristics of the MOSFET, such as a gate leak current, an off leak current Ioff, a substrate current, a drive current Ion due to the short channel effect, and the like, are selected arbitrarily. A permissible range of a variation of each of the selected characteristics is provided. Moreover, simulation is carried out by changing structures of the MOSFET in various manners, to calculate characteristic values of the selected characteristics.

Alternately, trial manufacture of the MOSFET is carried out by changing structures of the MOSFET in various manners, to measure characteristic values of the selected characteristics. A characteristic in which the calculated or measured characteristic value cannot be adjusted within the permissible range is extracted. It is possible to use the extracted characteristic as the reference characteristic. Moreover, the sensitivity of each manufacturing parameter of the MOSFET with respect to the reference characteristic is calculated by simulation. The manufacturing parameter which has a high sensitivity and a strong influence on an increase and decrease of the reference characteristic is extracted. Thus, it is possible to use the extracted factor as the prior adjustment factor.

Further, it is possible to use two or more reference characteristics. For example, it is possible to simultaneously use the off leak current Ioff and the substrate current as the reference characteristics. In this case, it is desirable to use two prior adjustment factors. For example, the halo implant dose and the source/drain implant dose are candidates for the prior adjustment factors. In this case, values of the two prior adjustment factors are determined in Step S2 shown in FIG. 12. Additionally, when optimization is carried out using an orthogonal array larger than the L108 orthogonal array for a small scale integrated circuit including a plurality of MOSFETs and capacitors, it is possible to use each threshold voltage of each of the plurality of MOSFETs as the reference characteristic.

Further, it is desirable to use a single prior adjustment factor for a single reference characteristic. However, when adjustment in a desired value range of a prior adjustment factor is difficult, two or more combined adjustment factors maybe used. For example, when a halo implant dose that is higher than a tolerance of the halo implant dose is necessary to decrease the off leak current Ioff by increasing the halo implant dose, both the halo implant dose and the halo implant energy are combined as adjustment factors. By decreasing the halo implant energy, it is possible to decrease the value of the off leak current Ioff while maintaining the halo implant dose within a set tolerance.

Further, when carrying out the prior adjustment to adjust the reference characteristic to be substantially equal to the reference value using three or more prior adjustment factors, it is possible to apply the optimization method of the first example of the embodiment of the present invention to the prior adjustment, which can be assumed to be a kind of optimization problem. Put simply, it is possible to carry out optimization by applying the optimization method of the first example of the embodiment of the present invention to two or more steps.

For example, for a small scale integrated circuit including a plurality of MOSFETs, it is possible to carry out optimization shown in FIGS. 12 and 13 with a power consumption of the circuit at standby time as the reference characteristic. Here, when the manufacturing parameters of the MOSFET are used as the prior adjustment factors, in order to adjust the standby power consumption to be substantially equal to a reference value of the standby power consumption, it is possible to assume the prior adjustment to adjust the standby power consumption to the reference value as an optimization problem. In an additional optimization problem, it is possible to apply the optimization shown in FIGS. 12 and 13 for example, by using the off leak current Ioff of the MOSFET of the small scale integrated circuit as a new reference characteristic.

Further, it is also effective to carry out examination of the optimization by uniform preliminary adjustment of the reference characteristic to the reference value using the prior adjustment factor according to the first example of the embodiment of the present invention, in a case using a response surface method. For example, when using two or more step optimization methods according to the first example of the embodiment of the present invention, there are many cases in which it is sufficient for optimization to use a small scale orthogonal array including two factors and two levels in a subsequent step of optimization. In such a case, it is possible to carry out efficient optimization for the small scale orthogonal array by uniform preliminary adjustment of the reference characteristic to the reference value, using the prior adjustment factor.

Furthermore, there is a case in which a value of the prior adjustment factor can not be adjusted within the desired value range of the prior adjustment factor by the prior adjustment. When a number of the failed prior adjustment factors not being adjusted within the desired range are limited in the entire analysis, for example the number of the failed prior adjustment factors is less than two to three in the L36 orthogonal array, it is effective to carry out the entire orthogonal array experiment and examination of the factorial effect chart, even including the failed prior adjustment factor. Because the dependence of the characteristic on the factorials is correctly provided, even using such failed prior adjustment factors, it is possible to obtain information for optimization.

Furthermore, when the prior adjustment has failed to adjust the reference characteristic for all experiments of a group of the orthogonal array experiments in Step S4 shown in FIG. 12, the process proceeds to Step S1. In Step S1, it is effective to reconsider setting of parameters for the control factors and the levels of the control factors. When it becomes difficult to set the value of the prior adjustment factor, the level values of the control factor are modified so as to enable the prior adjustment. For example, when an extremely high halo implant dose with a certain structure is obtained using the halo implant dose as the prior adjustment factor, the level values of the channel implant dose, which is a second prior adjustment factor, used for the structure is modified to a higher value. When reconsidering the level values, it is necessary to recalculate, in part, for already completed portions of the prior adjustment, in order to maintain the orthogonality of the analysis. Due to modification of the level values, the amount of recalculation for the completed portions of the prior adjustment may be understood by calculating how much the prior adjustment factor has been used in the completed portion.

Furthermore, when failing to adjust the reference characteristic in the prior adjustment, in some case, it is effective to add the sliding levels in Step S1. The prior adjustment adjusts the interaction of the factors to be uniform using the prior adjustment factor. When failing to adjust the interaction, it is possible to reduce the load of the prior adjustment using the prior adjustment factor, by decreasing the interaction using the sliding levels set to other control factors.

Furthermore, when failing to adjust the reference characteristic in the prior adjustment, it is possible to select another factor having a stronger influence in the prior adjustment as the prior adjustment factor, or to select another characteristic variable as the reference characteristic, in Step S1.

According to the first example of the embodiment of the present invention, it is possible to easily search the value of the prior adjustment factor corresponding to the structure in which the value of the reference characteristic is previously adjusted, using a computer, in an optimization problem analyzed by setting the values of the factors to be orthogonal with each other. More specifically, it is possible to easily carry out the prior adjustment using a computer by changing the prior adjustment factor in various values to search the reference characteristic in order to adjust the value of the reference characteristic using the prior adjustment factor.

The prior adjustment factor is selected from among the factors different from the control factors controlling a plurality of characteristics and having values to be orthogonal with each other. Thus, it is possible to carry out the optimization method using the prior adjustment factor having a degree of freedom which is not limited by the degrees of freedom of the control factors of the orthogonal array.

According to the first example of the embodiment of the present invention, it is possible to carry out efficient optimization even in cases which do not effect the orthogonal array. In an optimization problem of parameters, in which a search is made for an optimal value of a target characteristic and a set of values of factors to provide the optimal value of the target characteristic without an orthogonal array, the target characteristic may be searched by previously adjusting the reference characteristic to be substantially equal to the reference value.

In the first example of the embodiment of the present invention, by setting a tolerance of the characteristic value of each of the target characteristics, the target characteristics which provide a characteristic value not satisfying the tolerance are selected as candidates for the reference characteristic. The reference characteristic may be selected from among the candidates. Thus, it is possible to easily select the reference characteristic based on the simulation.

Furthermore, by setting a tolerance of the characteristic value of each of two or more target characteristics, the target characteristics which provide a characteristic value not simultaneously satisfying the tolerance in an identical structure are selected as candidates for the reference characteristic. In other word, the candidates are in a trade-off relation. The reference characteristic may be selected from among the candidates. Thus, it is possible to easily select the reference variable based on the simulation from a trade-off point of view.

Furthermore, by setting a tolerance of a variation of the characteristic value of each of the target characteristics, the target characteristics which provide a variation of a characteristic value not satisfying the tolerance is selected as candidates for the reference characteristic. The reference characteristic maybe selected from among the candidates. Thus, it is possible to easily select the reference variable based on the simulation from a variation point of view.

Furthermore, in the first example of the embodiment of the present invention, a sensitivity of the reference characteristic with respect to the factors is calculated. Factors having a high sensitivity are selected as candidates for the prior adjustment factor. Thus, it is possible to easily select the prior adjustment factor having an influence to the reference characteristic, based on the simulation.

Furthermore, in the first example of the embodiment of the present invention, when it is not possible to adjust the prior adjustment factor within the tolerance, the prior adjustment factor may be readjusted by resetting the values of the control factors. Thus, even when the prior adjustment factor cannot be sufficiently adjusted, it is possible to adjust the prior adjustment factor by modifying the levels of the control factors constructing the orthogonal array.

Furthermore, in the first example of the embodiment of the present invention, by setting a tolerance of a variation of the reference characteristic from the reference value, a search is made for the adjustment value of the prior adjustment factor corresponding to the reference value of the reference characteristic using a bisection method or another iteration method so that the variation of the reference characteristic from the reference value is brought to or below the tolerance. Thus, it is possible to carry out the prior adjustment to adjust the reference characteristic to be substantially equal to the reference value using the prior adjustment factor, using the computer.

Furthermore, in the first example of the embodiment of the present invention, the sliding levels are used to set the level values of the control factors. In particular, by using the sliding level for the control factor that has an effect related to the prior adjustment factor, it is possible to decrease differences between the runs of the experiments for the adjustment value of the prior adjustment factor. Thus, it is possible to easily adjust the prior adjustment factor within the permissible range of the adjustment value of the prior adjustment factor.

Furthermore, in the first example of the embodiment of the present invention, by providing a plurality of target characteristics, a plurality of reference characteristics and a plurality of prior adjustment factors, a plurality of adjustment values of the plurality of prior adjustment factors are determined by a computer so as to adjust each of the plurality of reference characteristic to be substantially equal to each reference value of each of the reference characteristics in a multi-dimensional variable space, which is formed by the plurality of target characteristics, the plurality of reference characteristic and the plurality of prior adjustment factors. Thus, in a structure having the plurality of target characteristics, it is possible to select the plurality of target characteristics as the reference characteristics and to provide a binding condition to each of the reference values of the plurality of reference characteristics. Therefore, it is possible to carry out optimization of the characteristic values of the other target characteristics.

Furthermore, in the first example of the embodiment of the present invention, when the prior adjustment factor cannot be adjusted within the tolerance, a search is made for a value of the prior adjustment factor exceeding the tolerance. Even when the resultant value of the prior adjustment factor exceeds the tolerance, analysis is carried out with the resultant value of the prior adjustment factor. Because the resultant value of the prior adjustment factor exceeds the tolerance, it is impossible to apply the result of the analysis to an actual manufacturing application. However, the dependence of the characteristic value on the factors is generally searched correctly, and thus it is possible to carry out examination of the optimization correctly.

Furthermore, in the first example of the embodiment of the present invention, by using the same number of reference characteristics and prior adjustment factors, it is possible to eliminate vagueness of the adjustment value of the prior adjustment factor. Alternatively, by using a number of prior adjustment factors greater than the number of the reference characteristics, it is possible to easily adjust the value of the prior adjustment factor within the tolerance.

Furthermore, the optimization method according to the first example of the embodiment of the present invention may be carried out two or more times. As a result, it is possible to carry out optimization of the entire structure efficiently.

As mentioned above, according to the first example of the embodiment of the present invention, it is possible to achieve optimization of a structure depending on a plurality of variables with high precision and high efficiency by use of a computer. Additionally, according to the first example of the embodiment of the present invention, by carrying out optimization of parameters for searching an optimal value of the characteristic and a set of optimal values of the factors to provide the optimal value, and by processing a semiconductor substrate as a processing object with manufacturing conditions based on the set of optimal values of factors, it is possible to easily manufacture a high performance semiconductor device.

SECOND EXAMPLE

In a second example of the embodiment of the present invention, an orthogonal array experiment technique using prior adjustment according to the first example of the embodiment is applied to optimization of a manufacturing condition for manufacturing a semiconductor device. In particular, in the second example of the embodiment, ion implantation conditions and an activation annealing process for reducing a junction leak current are optimized with respect to source/drain diffusion layers of a n-type MOSFET.

Figure 41:
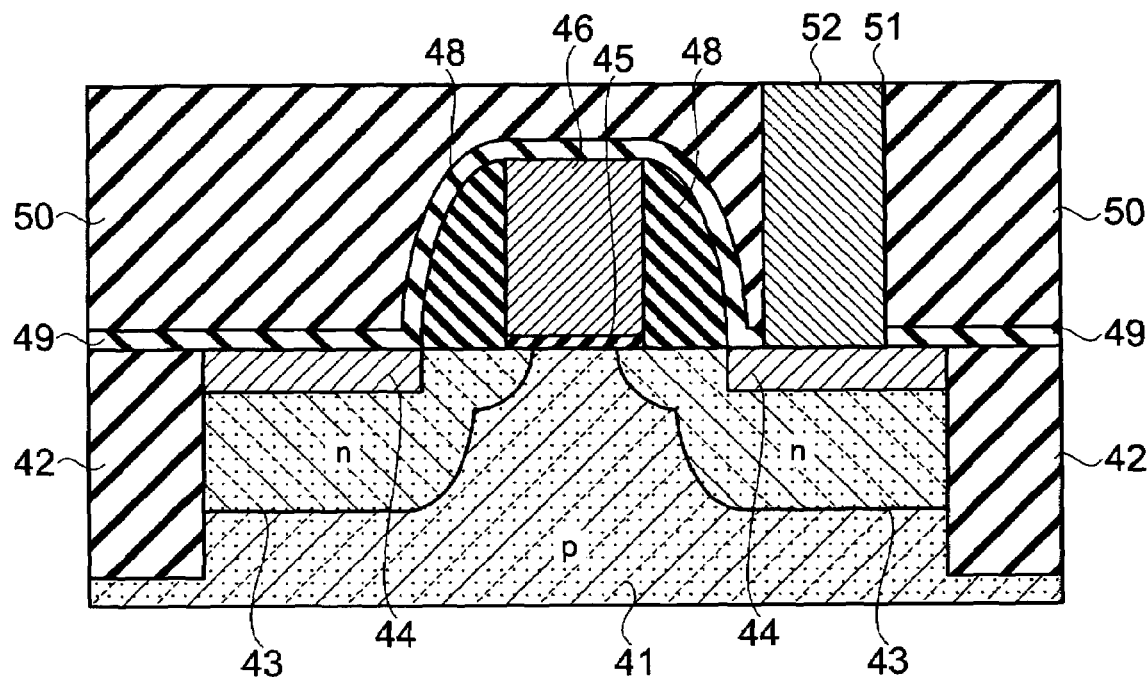
FIG. 41 is a sectional view showing an example of a MOSFET that is a subject for an optimization method according to a second example of the embodiment of the present invention.

As shown in FIG. 41, an n-type MOSFET, to which optimization according to the second example of the embodiment is carried out, includes a p-type semiconductor substrate 41, such as a silicon (Si) substrate, an isolation region 42, such as a shallow trench isolation (STI), a source/drain (S/D) diffusion layer 43, a silicide layer 44, a gate insulating film 45, a gate electrode 46, a sidewall spacer 48, a protection film 49, an interlevel insulating film 50, a plug 52, and the like. A pn junction is formed by the n-type S/D diffusion layer 43 in a p-type Si region of the semiconductor substrate 41.

In order to reduce a power consumption, it is necessary to suppress a junction leak current flowing through the pn junction formed between the semiconductor substrate 41 and the S/D diffusion layer 43. It is necessary that a periphery component of the junction leak current is less than about 0.1 pA/μm, and an area component of the junction leak current is less than about 0.1 pA/μm². The periphery component of the junction leak current is created at the junction between the peripheral portion of the S/D diffusion layer 43 and the semiconductor substrate 41. The periphery component of the junction leak current is expressed by a line density of a periphery length of the S/D diffusion layer 43. The area component of the junction leak current is created at the junction between the basal plane of the S/D diffusion layer 43 and the semiconductor substrate 41. The area component of the junction leak current is expressed by an area density of a basal plane area of the S/D diffusion layer 43.

Alternately, in order to decrease wiring contact resistance and diffusion layer sheet resistance, which are parasitic resistance to decrease a main current of the MOSFET, generated by connecting the S/D diffusion layer 43 to a circuit wiring (not shown), the silicide layer 44 is attached to the top of the S/D diffusion layer 43. Due to an influence of defects and the like, generated during formation of the silicide layer 44 onto the S/D diffusion layer 43, a problem of an increase of the junction leak current from the S/D diffusion layer 43 to the semiconductor substrate 41 occurs. In order to decrease the junction leak current, manufacturing conditions for forming the S/D diffusion layer 43, such as ion implantation conditions including ion species, an acceleration energy (implant energy) and an implant dose, and activation annealing after the ion implantation, are optimized.

The inventors have learned that the optimization is complicated in the preliminary survey of Step S1 shown in FIG. 12 due to the following four causes.

(a) The S/D diffusion layer 43 is formed by implanting n-type impurity ions, such as arsenic (As), and phosphorous (P), into the semiconductor substrate 41. An increase and decrease of the junction leak current depends on species of the n-type impurity.

Figure 42:
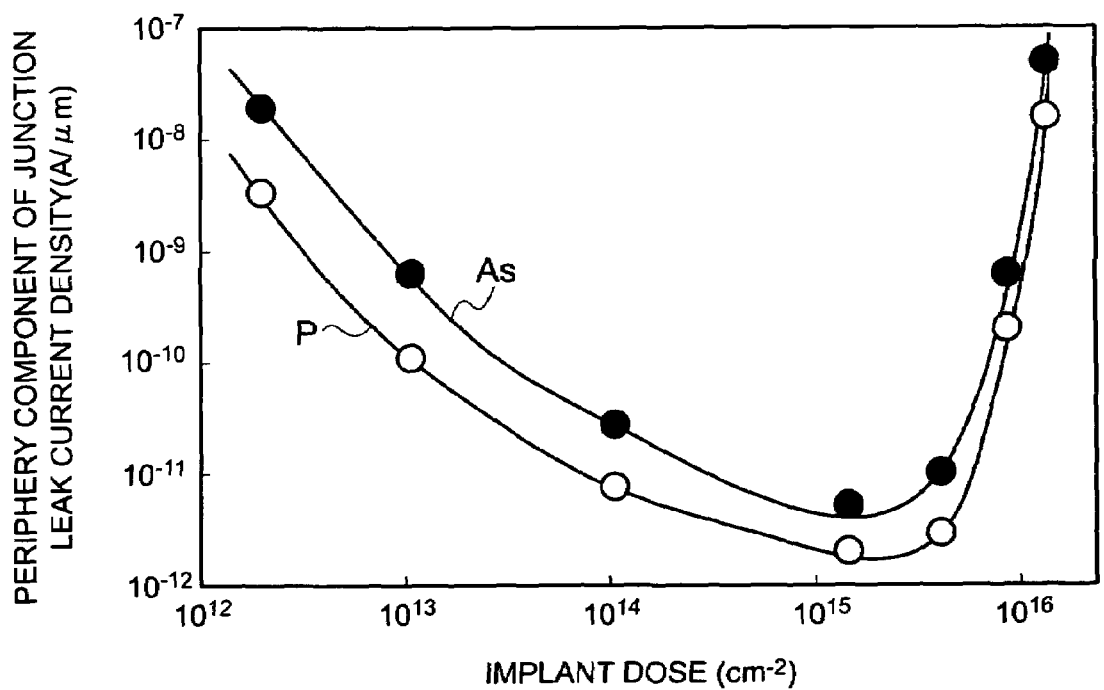
FIG. 42 is a graph showing an example of a dependence of a junction leak current on an implant dose used in the description of the second example of the embodiment of the present invention.

A dependence of the periphery component of the junction leak current (Ileak) on the implant dose of each of the impurity ions As and P is shown in FIG. 42. As shown in FIG. 42, the junction leak current decreases with increases in the implant dose in a range of the implant dose less than about $1 \times 10^{15}$ cm$^{-3}$. However, exceeding the implant dose of about $1 \times 10^{15}$ cm$^{-2}$, the junction leak current begins to increase.

The reason is described herein below. When the implant dose is small, the S/D diffusion layer 43 having a high impurity concentration of about $1 \times 10^{18}$ cm$^{-3}$ to about $1 \times 10^{19}$ cm$^{-3}$ immediately below the silicide layer 44 that contacts the S/D diffusion layer 43 cannot be formed with a sufficient thickness. If the n$^+$ S/D diffusion layer 43 below the silicide layer 44 is not formed to a sufficient thickness, the junction leak current increases due to the defects generated by forming the silicide layer 44. On the other hand, if the implant dose is increased, the n$^+$ S/D diffusion layer 43 may be formed to a sufficient thickness below the silicide layer 44. Therefore, the junction leak current may be decreased. However, if the ion implantation is carried out with a higher implant dose more than $3 \times 10^{15}$ cm$^{-2}$, crystal defects are generated in the implanted layer. If the generated crystal defects cannot sufficiently recover by annealing, the junction leak current increases with increases in the implant dose exceeding about $3 \times 10^{15}$ cm$^{-2}$. As shown in FIG. 42, a magnitude of the junction leak current varies by the ion species of the ion implantation. The junction leak current for the ion species of As is larger compared to the junction leak current for the ion species of P.

Figure 43:
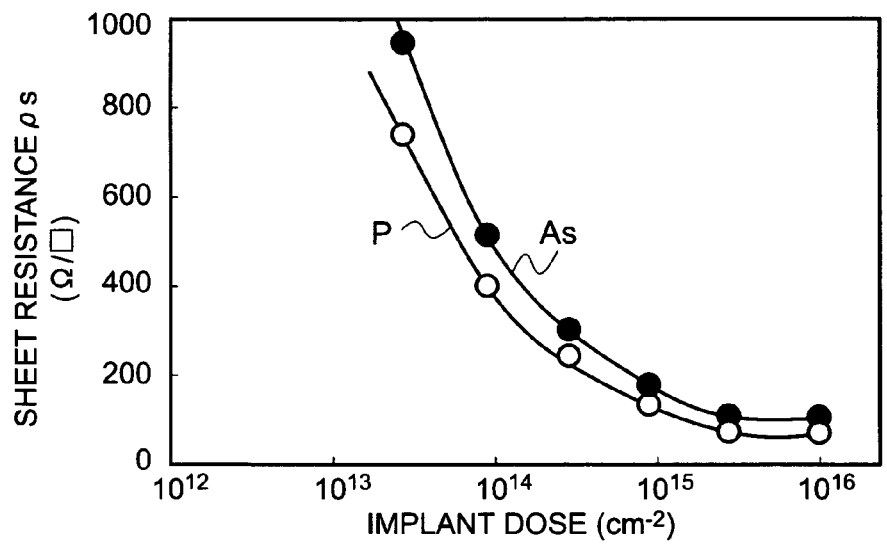
FIG. 43 is a graph showing an example of a dependence of sheet resistance on the implant dose used in the description of the second example of the embodiment of the present invention.
Figure 44:
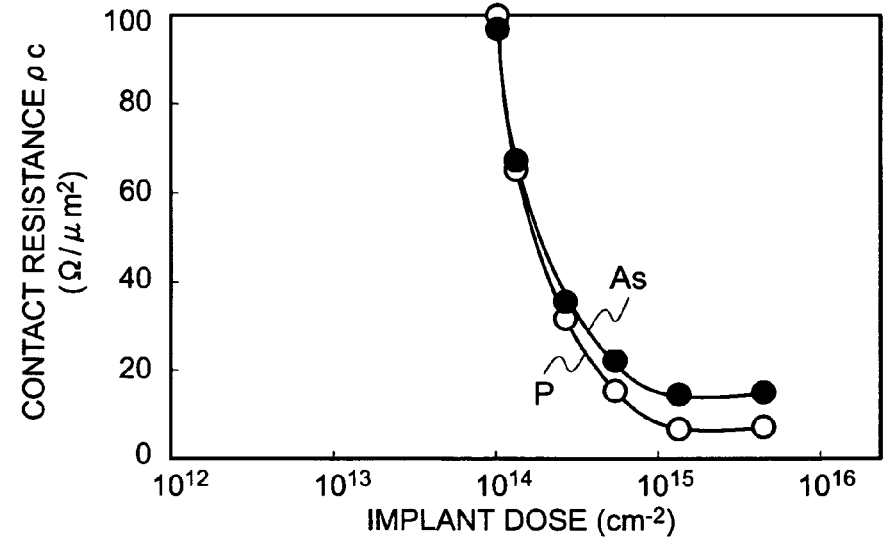
FIG. 44 is a graph showing an example of a dependence of contact resistance on the implant dose used in the description of the second example of the embodiment of the present invention.

(b) As shown in FIGS. 43 and 44, sheet resistance $\rho s$ of the S/D diffusion layer 43, and contact resistance $\rho c$ between the S/D diffusion layer 43 and the silicide layer 44 also depend on process conditions, such as the implant dose and the like. As shown in FIG. 43, the sheet resistance $\rho s$ decreases with increases in the implant dose. A magnitude of the sheet resistance $\rho s$ also varies by the ion species of ion implantation. The sheet resistance $\rho s$ using the ion species of As is larger than the ion species of P. As shown in FIG. 44, the contact resistance $\rho c$ decreases with increases in the implant dose. There is a case in which the size of the contact resistance $\rho c$ varies by the ion species of the ion implantation. When carrying out ion implantation with the implant dose exceeding about $3 \times 10^{14}$ cm$^{-2}$, the contact resistance $\rho c$ using the ion species of As is larger than the ion species of P.

Figure 45:
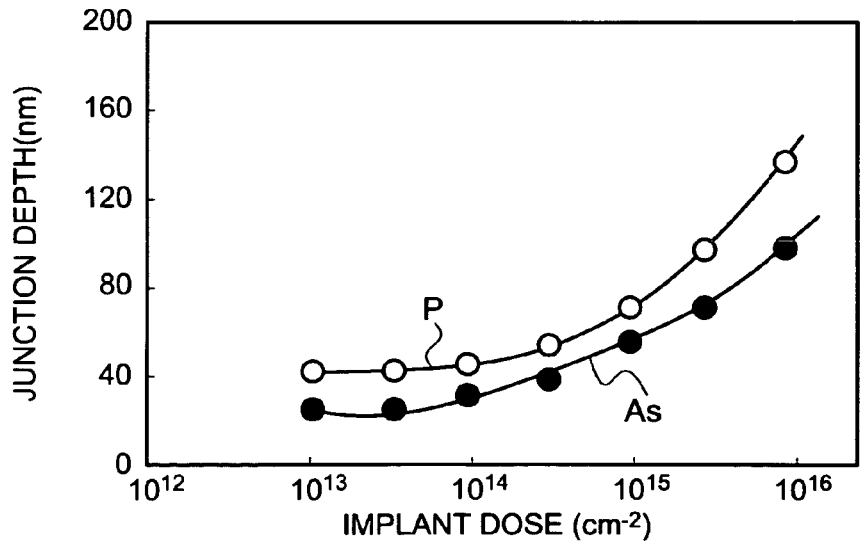
FIG. 45 is a graph showing an example of a dependence of a junction depth on the implant dose used in the description of the second example of the embodiment of the present invention.

(c) As shown in FIG. 45, a junction depth of the pn junction in an impurity distribution in a depth direction of the semiconductor substrate 41, which strongly influences variations of the MOSFET characteristics, also depends on the implant dose and the ion species. Generally, in order to suppress the variations of the MOSFET characteristics, it is desirable that the junction depth of the pn junction between the source/drain diffusion layer 43 and the semiconductor substrate 41 is shallower. In order to shallow the junction depth of the pn junction, it is desirable that the implant dose is smaller, as shown in FIG. 45. Additionally, the junction depth for the ion species of As is shallower than the ion species of P. Therefore, in order to shallow the junction depth of the pn junction, it is more desirable to use the ion species of As rather than the ion species of P. However, as shown in FIGS. 42, 43, and 44, the junction leak current Ileak and the parasitic resistance, such as the sheet resistance $\rho s$ and the contact resistance $\rho c$, for the ion species of As are larger than ion species of P. In other word, if the implant dose is decreased, the leak current Ileak may increase, and the sheet resistance $\rho s$ and the contact resistance $\rho c$ may also increase.

(d) The junction leak current Ileak shown in FIG. 42, and the sheet resistance $\rho s$ and the contact resistance $\rho c$ shown in FIGS. 43 and 44 can be decreased by adding high temperature annealing for an extremely short time period, which does not influence on the junction depth of the pn junction. However, it is understood that effectiveness for decreasing the junction leak current and the like by high temperature annealing also depends on the ion species used for ion implantation.

There are enormous requirements for experiment to carry out optimization while considering the above-mentioned causes (a) to (d). In the second example of the embodiment of the present invention, the junction depth after ion implantation of source/drain impurity ions, which has a trade-off relation with target characteristics, such as the junction leak current, the sheet resistance $\rho s$, and the contact resistance $\rho c$, is selected for a reference characteristic by considering the causes (a) to (d). In addition, as shown in FIG. 48, because the junction depth is also a control factor A, experiments are carried out after adjusting a prior adjustment factor so that the junction depth after the ion implantation of the source/drain impurity ions provides each designated level value with respect to all experiments of an orthogonal array experiment. The acceleration energy and the implant dose of impurity ions for different ion species are selected for the prior adjustment factors. Additionally, a L18 orthogonal array is used for the orthogonal array experiment.

A list of control factors and level values of the control factors is shown in FIG. 48. The ion species of ion implantation is selected for a control factor B of the orthogonal array. As shown in FIG. 48, the control factor B of the ion species includes three levels. The levels 1, 2 and 3 of the ion species are "As", "P", and "As and P", respectively. Control factors C, D, E, and F are factors with respect to high temperature and short time annealing, which does not influence the impurity distribution. More specifically, high temperature and short time annealing is carried out by irradiating a top surface of the semiconductor substrate 41 with a light after preheating at a low temperature from a bottom surface of the semiconductor substrate 41. An irradiation energy of the irradiated light to the top surface for high temperature and short time annealing is selected for the control factor C. A preheating temperature of preheating from the bottom surface is selected for the control factor D. An irradiation number of the high temperature and short time annealing to the top surface is carried out is selected for the control factor E. A preheating time of preheating from the bottom surface is selected for the control factor F.

In this manner, the high temperature and short time annealing, is carried out from the top surface of the semiconductor substrate 41, while preheating from the bottom surface of the semiconductor substrate 41. For example, in a condition including a level C1, which is a level 1 of the factor C, and a level D1, which is a level 1 of the factor D, the semiconductor substrate 41 is heated to about 450° C. from the bottom surface of the semiconductor substrate 41 and heated to about 500° C. for a extremely short time period, such as about 0.1 to 100 ms, from the top surface of the semiconductor substrate 41. As a result, the top surface of the semiconductor substrate 41 is heated to a temperature of about 950° C. for the extremely short time period. Therefore, the implanted impurity ions are activated with decreasing the crystal defects generated by the ion implantation, and thus the junction leak current may be decreased.

Further, it is possible to add pre-anneal in which the semiconductor substrate 41 is heated by low temperature annealing which does not influence the impurity profile before high temperature annealing for activation. A condition of the pre-anneal is selected for a control factor G.

Further, a thickness of a sputtered film of the silicide film 44 attached on the S/D diffusion layer 43 is selected for a control factor H.

In this manner, all control factors other than the control factor A of the junction depth and the control factor B of the ion species do not influence the impurity profile of the S/D diffusion layer 43.

Figure 46:
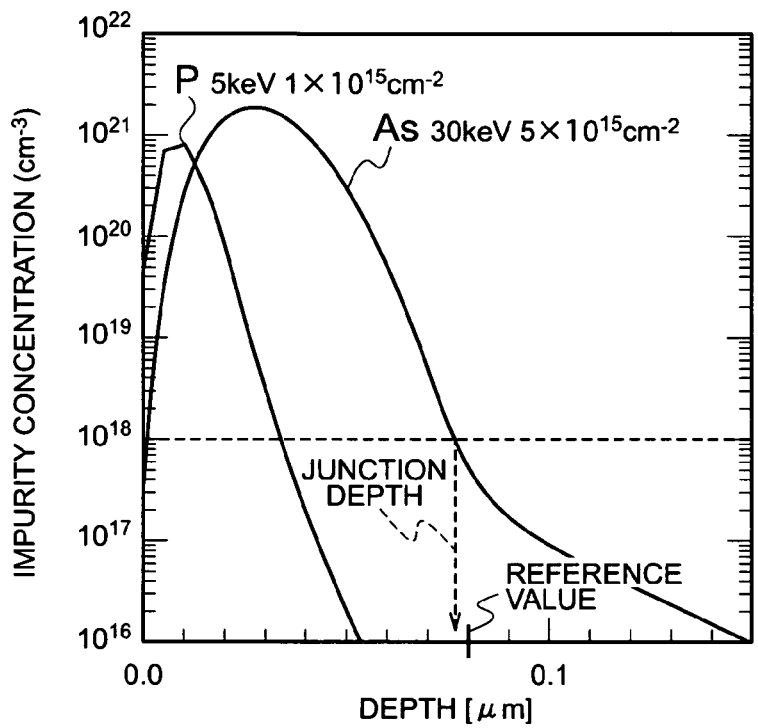
FIG. 46 is a diagram showing an example of an impurity density distribution adjusted by the prior adjustment used in the description of the second example of the embodiment of the present invention.
Figure 47:
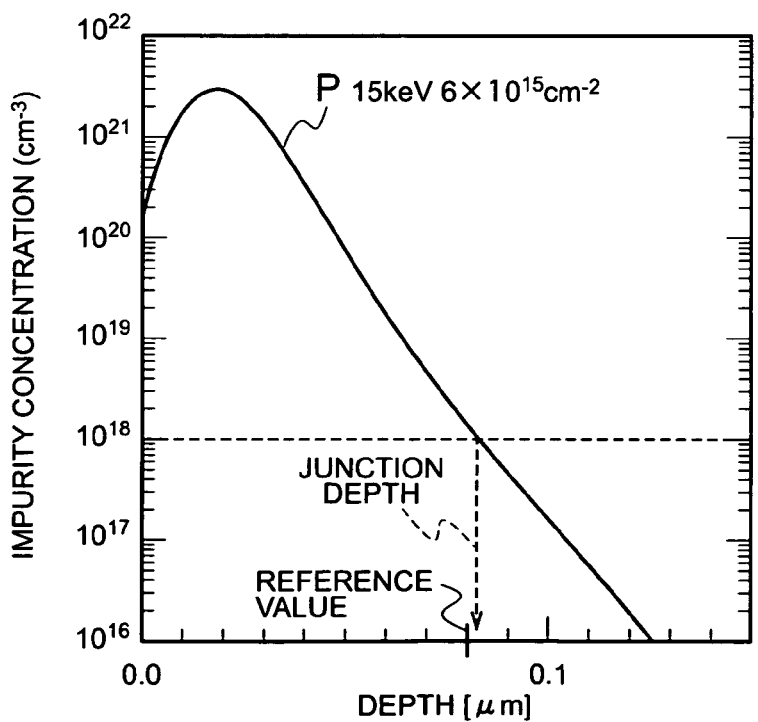
FIG. 47 is a diagram showing another example of an impurity density distribution adjusted by the prior adjustment used in the description of the second example of the embodiment of the present invention.

As shown in FIGS. 46 and 47, the junction depth of the S/D diffusion layer 43 after ion implantation is adjusted by prior adjustment using the ion implant dose and the acceleration energy for the S/D diffusion layer 43, which is the prior adjustment factors. The prior adjustment is carried out using computer simulation with respect to ion implantation. FIG. 46 shows a case in which both the ion species of As and P are used for the ion implantation, while FIG. 47 shows a case in which only the ion species of P is used. As shown in FIGS. 46 and 47, in both cases, the junction depth is adjusted using "80 nm" of the level A2 of the control factor A as a reference value 2. The junction depth is also independently adjusted using "100 nm" of the level A1 of the control factor A as a reference value 1.

As shown in FIG. 46, when both the ion species As and P are used for ion implantation, the junction depth is determined only by the As ions. The P ions is implanted to distribute in a surface region of the semiconductor substrate 41. As a result, the P ions may not influence the junction depth, but the contact resistance ρc may be decreased. The junction depth is adjusted to about 0.078 μm which is substantially equal to the reference value of 80 nm. The impurity distribution shown in FIG. 46 corresponds to a case of the level B3 of the control factor B shown in FIG. 48.

As shown in FIG. 47, the junction depth of ion implantation using the ion species P corresponding to a case of the level B2 of the control factor B, is adjusted to about 0.082 μm which is substantially equal to the reference value of 80 nm. The junction depth is adjusted to the same depth in the case of the level B3 of the control factor B shown in FIG. 46.

For an impurity distribution using only the ion species As corresponding to a case of the level B1 of the control factor B shown in FIG. 48, the impurity distribution of the ion species As shown in FIG. 46 without the impurity distribution of the ion species P may be used. Because all control factors other than the control factor B have no influence on the impurity distribution, it is possible to adjust the control factors by using the prior adjustment, so that the junction depth is the same for each experiment of the orthogonal array experiment.

In the second example of the embodiment of the present invention, the acceleration energy and the implant dose are used as the prior adjustment factors. The level values of the acceleration energy and the implant dose are changed in the input data of the simulation, so as to adjust the reference characteristic of the junction depth to the reference values 1 and 2 of 100 nm and 80 nm, respectively. One of the aspects of the second example of the embodiment of the present invention is to use the junction depth with respect to the different ion species as the reference characteristic for the prior adjustment.

As shown in FIGS. 42 to 44, the junction leak current value, the sheet resistance ρs, and the like, depend on the ion species. However, such dependence on the ion species is partially caused by the different junction depth due to different implanted depth with the same acceleration energy for each of the ion species. The junction depth is adjusted to a constant value for each of the experiments using the prior adjustment factors. Therefore, it is possible to examine the target characteristics, such as the junction leak current, the layer sheet resistance ρs, and the contact resistance ρc, by use of the dependence on the ion species in which the interaction with respect to the junction depth in the orthogonal array experiment is decreased. Further, another aspect of the second example of the embodiment of the present invention is to use two prior adjustment factors for prior adjustment to adjust a single reference characteristic.

As shown in FIG. 49, in the second example of the embodiment of the present invention, a L18 orthogonal array is used for setting experiment conditions. In manufacturing of semiconductor device, a series of manufacturing processes are carried out to a plurality of semiconductor substrates as a lot. In the second example of the embodiment of the present invention, a lot including semiconductor substrates for carrying out eighteen runs of experiments shown in FIG. 49 is prepared. Manufacturing processes before and after the optimization target processes with respect to the control factors A to H are carried out with the same conditions for the lot. With respect to the optimization target processes, the orthogonal array experiment is carried out with conditions of each experiment shown in FIG. 49 using selected semiconductor substrates in the lot. In this manner, in the experiments for the manufacturing processes of the semiconductor device using the selected semiconductor substrates in the lot, another aspect of the second example of the embodiment of the present invention is to carry out the orthogonal array experiments by adjusting the reference characteristic.

Moreover, in a plurality of semiconductor devices, such as the n-type MOSFETs, manufactured in the semiconductor substrates, characteristics of twenty-two semiconductor devices in different locations in each semiconductor substrate are measured to use for a noise factor. Optimization of the manufacturing conditions, which correspond to a combination of optimal level values of the control factors, is carried out so as to decrease the location dependence of the characteristic.

Figure 50:
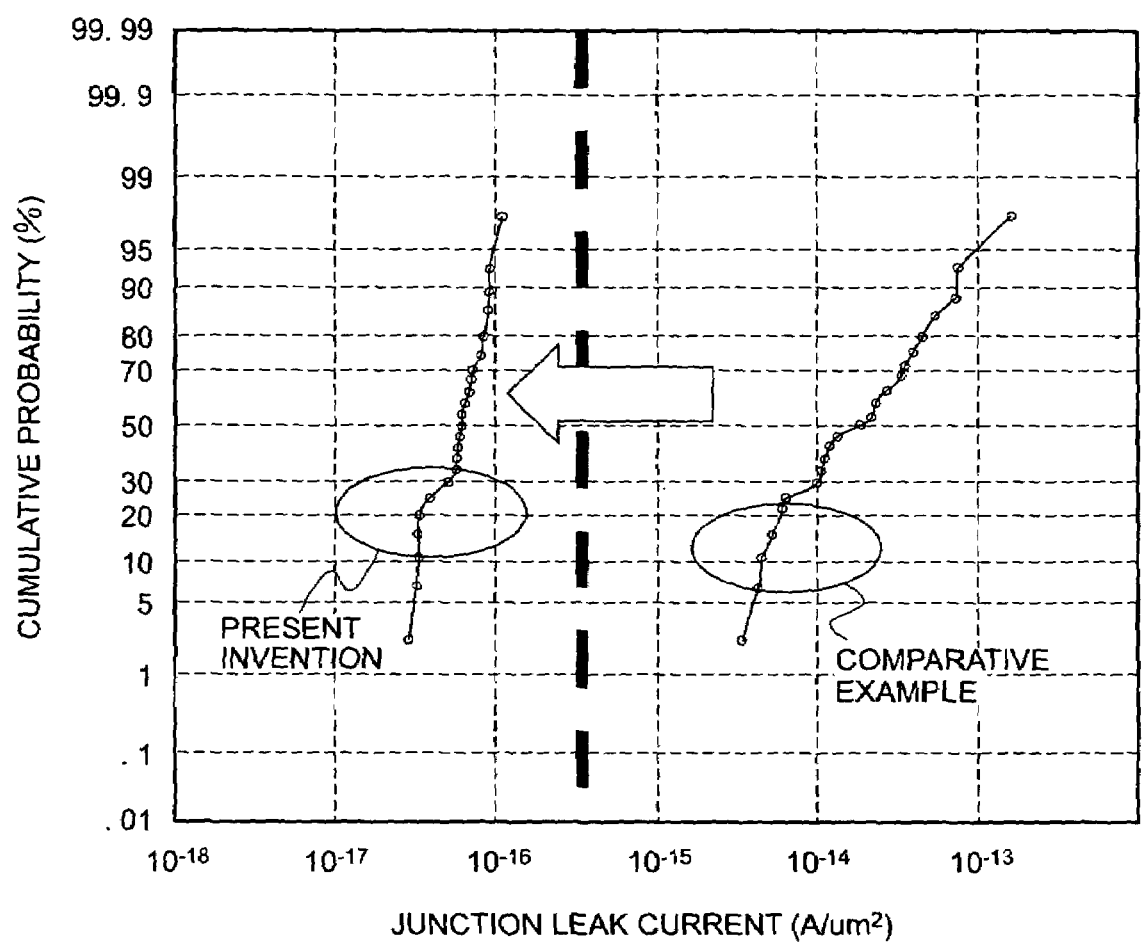
FIG. 50 is a graph showing an example of a cumulative probability distribution of the optimized junction leak current of the MOSFET according to the second example of the embodiment of the present invention.

A cumulative probability distribution of the junction leak current in the semiconductor device manufactured using the optimized conditions is shown in FIG. 50. A cumulative probability distribution of the junction leak current for a semiconductor device manufactured using conditions which are optimized by current orthogonal array experiment without prior adjustment using a prior adjustment factor, is also shown in FIG. 50, as a comparative example. As shown in FIG. 50, an improvement by one hundred times in the junction leak current according to the second example of the embodiment of the present invention can be confirmed compared to the comparative example. Moreover, the contact resistance ρc of the silicide film 44 to the S/D diffusion layer 43 is improved to less than about $1 \times 10^{-7}$ Ωcm² from about $3 \times 10^{-7}$ Ωcm² of the comparative example In the second example of the embodiment of the present invention, the manufacturing parameters are optimized by a search for the optimal value of the target characteristic and the combination of optimal level values of the control factors which provides the optimal value of the target characteristic. Using the combination of optimal level values for the optimal manufacturing conditions, a semiconductor substrate as an object is processed. Therefore, it is possible to easily manufacture a high performance semiconductor device.

THIRD EXAMPLE

In a third example of the embodiment of the present invention, description will be given in regard to an optimization method for improving a variation of current gain (hFE) of a bipolar transistor.

Bipolar transistors are used in an analog integrated circuit (IC). By decreasing a variation of hFE of the bipolar transistor, the yield rate of the analog IC may be improved. Thus, a profitability of the analog IC may be improved.

When suppressing the variation of hFE of the bipolar transistor, it is desirable that an Early voltage VA remain unchanged. The Early voltage VA is defined as the point of intersection of the slope of the collector current (Ic) in the saturation region on the collector-emitter voltage (Vce) axis, in the Ic versus Vce curve.

A procedure of an optimization method for improving the variation of hFE using the Taguchi method is described in conjunction with the flowchart shown in FIG. 12.

In Step S1, control factors, noise factors, a prior adjustment factor, a reference characteristic, and a target output characteristic which is a target for optimization, are selected.

More specifically, five factors from among the manufacturing parameters of the bipolar transistor are selected for the control factors. For each of the five factors, three levels are provided. For example, the control factors A to E are respectively: (a) a boron (B) implant dose of base ion implantation; (b) a B ion acceleration energy of base ion implantation; (c) an As implant dose of emitter ion implantation; (d) an emitter annealing temperature; and (e) an emitter annealing time.

In order to evaluate a manufacturing variation of the bipolar transistor, two factors are selected as the noise factors. For each of the two factors, two levels of a maximum value (Max) and a minimum value (Min) are set. For example, the noise factors EA and EB are respectively: (a) a film thickness of a buffer silicon oxide (SiO₂) film for base ion implantation; and (b) a film thickness of a buffer SiO₂ film for emitter ion implantation.

Moreover, the Early voltage VA is selected for the reference characteristic. An As acceleration energy for emitter ion implantation is selected for the prior adjustment factor. hFE is selected for the target characteristic for optimization.

In Step S1, the control factors and the levels of the control factors are allocated to the L18 orthogonal array. Moreover, levels of the noise factors are combined with each other, to create four noise conditions N1 to N4 from two levels of two noise factors EA, EB. The noise condition N1 is a case in which both the noise factor EA, EB have the levels Max. The noise condition N2 is a case in which the noise factor EA has the level Max, and the noise factor EB has the level Min. The noise condition N3 is a case in which the noise factor EA has the level Min, and the noise factor EB has the level Max. The noise condition N4 is a case in which both the noise factors EA, EB have the level Min.

In Step S2 and S3, for each of eighteen runs of the L18 orthogonal array experiment, the acceleration energy, which is the prior adjustment factor, of the As ions of emitter ion implantation is adjusted using the noise condition N1 for a reference noise condition, so that the Early voltage VA may become the reference value of −50 V, for example. In addition, in order to adjust the Early voltage VA to the reference value, a plurality of values of the Early voltage VA are calculated by a plurality of simulations carried out for each of a plurality of levels of the prior adjustment factor. By interpolation using the plurality of calculated values of the Early voltages VA and the plurality of levels of the prior adjustment factor, the acceleration energy of the As ions of emitter ion implantation is calculated and determined so that the Early voltage VA is substantially equal to the reference value. The plurality of runs of simulation and the prior adjustment for determining the levels of the prior adjustment factor are automatically carried out in a computer using control software.

In Step S4, there is a determination as to whether the Early voltage VA, which is the reference characteristic, is substantially equal to the reference value for each of eighteen runs of the L18 orthogonal array experiment using the noise condition N1. After determining that the value of the Early voltage VA of each run of the orthogonal array experiments is substantially equal to the reference value, the process proceeds to Step S5.

In Step S5, using the searched level of the prior adjustment factor for each of the eighteen experiments of the L18 orthogonal array for the noise condition N1, a search is made for a hFE value by each of eighteen runs of the L18 orthogonal array experiment for each of the noise conditions N2 to N4.

In Step S6, post-process is carried out. By analyzing the S/N ratio and the sensitivity, a selection is made for an optimal level of each control factor which decreases a variation of the hFE value, as well as provides the hFE value close to the target value.

In Step S7, there is a determination as to whether the hFE value is substantially equal to the target value using an optimal combination of the levels of the control factors. More specifically, simulation is carried out using the selected optimal levels of the control factors, to calculate the hFE value. The calculated hFE value is then compared to the target value. If the calculated hFE value is substantially equal to the target value, the optimization comes to an end. In the above-mentioned optimization, because the Early voltage VA is held at a constant value, it is possible to suppress interaction of the variation of the Early voltage VA with the variation of hFE. Thus, it is possible to easily extract the control factors and the levels thereof that decrease the variation of the hFE value.

In the third example of the embodiment of the present invention, the manufacturing parameters are optimized by a search for the optimal value of the target characteristic and the combination of optimal level values of the control factors which provides the optimal value of the target characteristic. Using the combination of optimal level values as the optimal manufacturing conditions, a semiconductor substrate as an object is processed. Therefore, it is possible to easily manufacture a high performance semiconductor device.

FOURTH EXAMPLE

As shown in FIG. 51, using a case to extract the threshold voltage Vth from the simulation output value stored in the output value storage 11 shown in FIG. 1, detailed description of the function of the string extraction unit 12 is given.

First, the file read module 101 shown in FIG. 3 reads the entire file of the simulation output value from the output value storage 11.

The token divide module 103 divides the simulation output value into a plurality of tokens based on the applicable format stored in the format data file 35b. The applicable format includes information that space characters are disposed in between the plurality of tokens. As shown in FIG. 51, the token divide module 103 divides the simulation output value to a plurality of tokens, for example first to fifth tokens, concerning the threshold voltage Vth, to create a first token string by arranging the plurality of divided tokens, for example.

Figure 52:
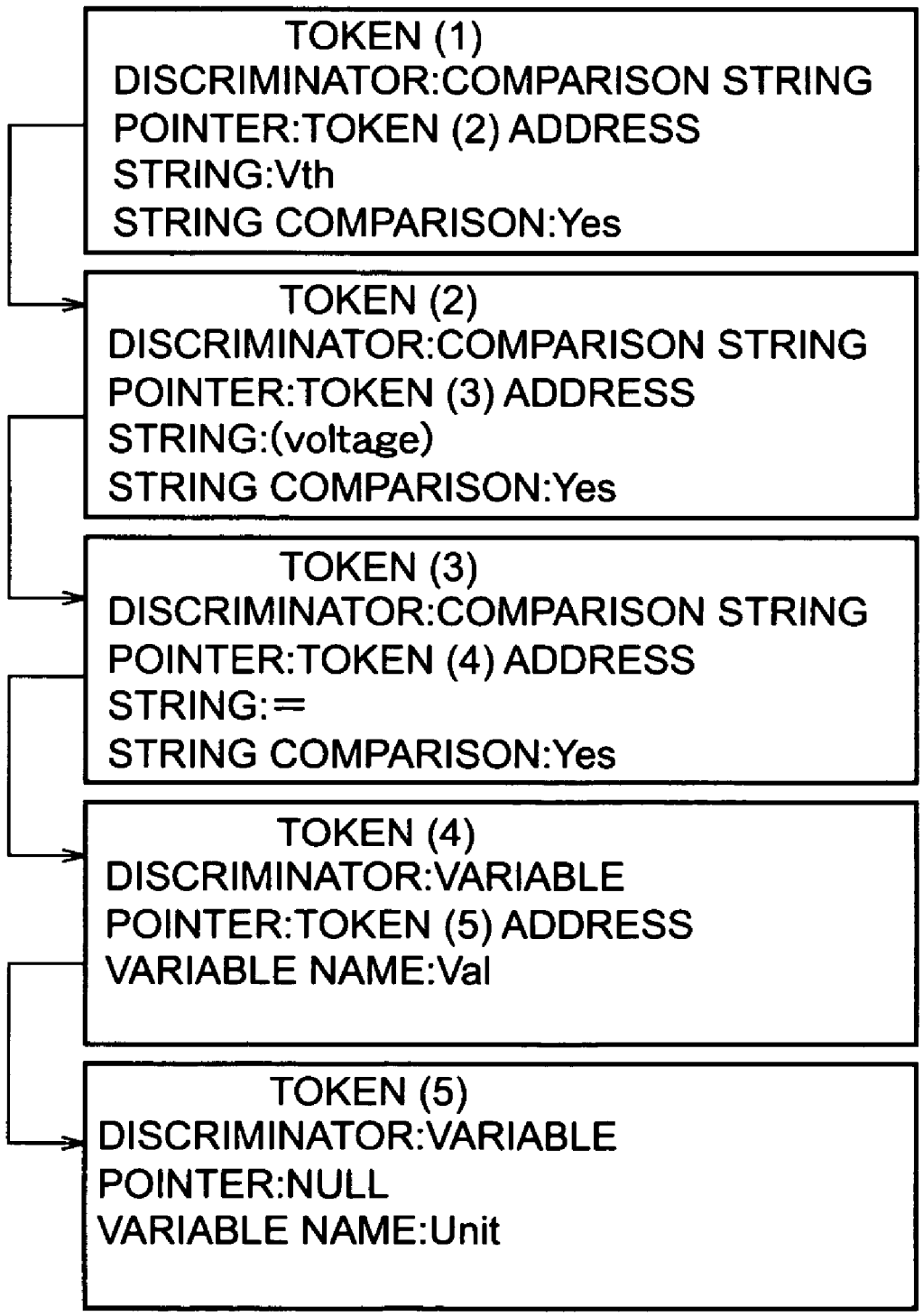
FIG. 52 is a diagram showing an example of a format data file used in the description of the fourth example of the embodiment of the present invention.

The token creation module 104 creates a second token string configured to extract the characteristic value of the reference characteristic from the first token string based on the applicable format. As shown in FIG. 52, each of the tokens (1) to (5) in the second token string, which corresponds to the first to fifth tokens in the first token string, has a discriminator of a comparison string or a variable, a pointer of an address of the next token arranged after the current token in the second token string, a character string, a string comparison discriminator, and a variable name.

To be more specific, the token (1) includes "comparison string" as the discriminator, "token (2) address" as the pointer, "Vth" as the character string, and "Yes" as the string comparison discriminator. The token (2) includes "comparison string" as the discriminator, "token (3) address" as the pointer, "(voltage)" as the character string, and "Yes" as the string comparison discriminator. The token (3) includes "comparison string" as the discriminator, "token (4) address" as the pointer, "=" as the character string, and "Yes" as the string comparison discriminator. The token (4) includes "variable" as the discriminator, "token (5) address" as the pointer, and "Va1" as the variable name. The token (5) includes "variable" as the discriminator, "NULL" as the pointer, and "Unit" as the variable name.

Figures 53, 54:
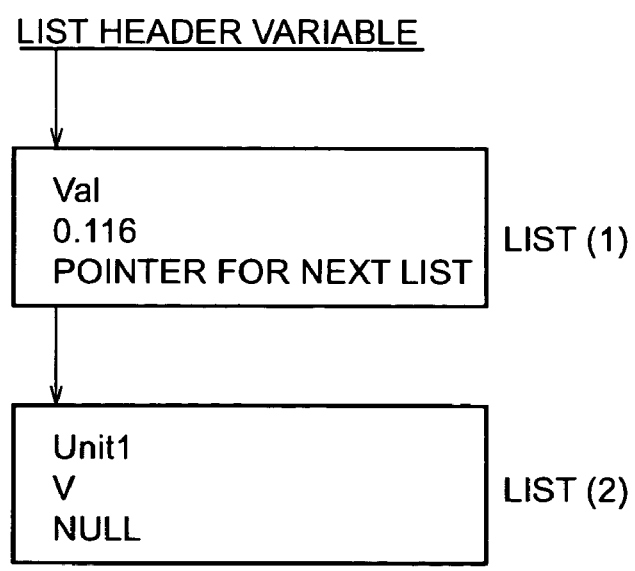
FIG. 53 is a diagram showing an example of a variable name and token value table used in the description of the fourth example of the embodiment of the present invention.
FIG. 54 is a diagram showing another example of a variable name and token value table used in the description of the fourth example of the embodiment of the present invention.

The token creation module 104 extracts the threshold voltage Vth from the first token string using the second token string. The token values corresponding to the variable names "Va1" and "Unit" designated as the variable in the extracted information are stored in the token data storage 131 as shown in FIGS. 53, 54.

Figures 55, 56:
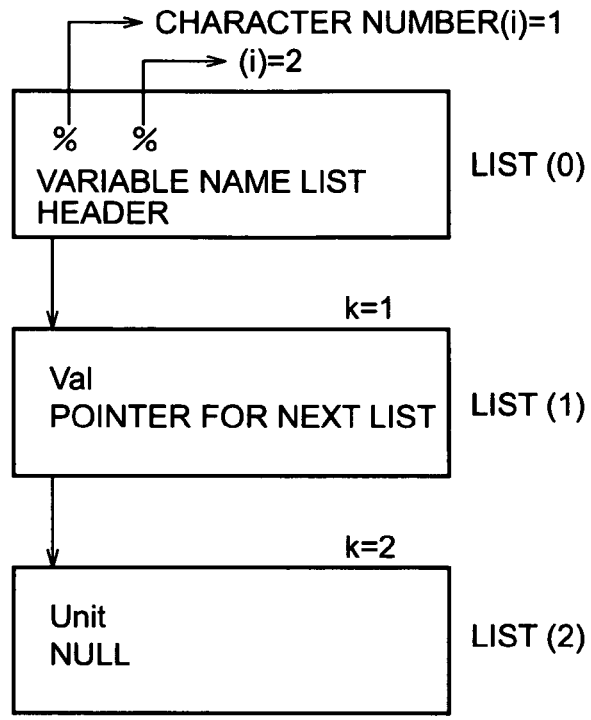
FIG. 55 is a diagram showing an example of an output format used in the description of the fourth example of the embodiment of the present invention.
FIG. 56 is a diagram showing an example of an output value of a simulation used in the description of a fifth example of the embodiment of the present invention.

The token output module 105 transmits the threshold voltage Vth stored in the token data storage 131 to the extraction characteristic storage 13, in accordance with the output format shown in FIG. 55. The list (0) has a character string % %, which includes character numbers (1) and (2), as the output format, and a header of the variable name list (1). Using the character string % %, it is possible to replace two variables. Additionally, it is possible to read out the list (1) by using the header of the variable name list (1). The list (1) has a variable name of "Val" corresponding to the character number (1), and a pointer to the list (2). The token value of "0.11675091" corresponding to the variable name Val is added to the output string in FIG. 53. It is possible to read out the list (2) by using the pointer to the list (2). The list (2) has a variable name "Unit" corresponding to the character number (2), and "NULL" indicating that it is the final list. The token value "V" corresponding to the variable name "Unit" is added to the output string in FIG. 53.

The string extraction unit 12 may extract the threshold voltage Vth of 0.11675091 V as the characteristic value of the target characteristic by transmitting the output string to the extraction characteristic storage 13. Thus, in the fourth example of the embodiment of the present invention, it is possible to provide the characteristic value of the target characteristic used in optimization of the manufacturing conditions to easily manufacture a high performance semiconductor device.

FIFTH EXAMPLE

In a fifth example of the embodiment of the present invention, description of the function of the string extraction unit 12 will be given in a case of extracting a capacity calculation result from the simulation output value stored in the output value storage 11 of the FIG. 1. As shown in FIG. 56, a capacitance versus voltage (C-V) characteristic of the simulated structure of the MOSFET calculated in the simulator 10 is stored in the output value storage 11 as a simulation output value.

The file read module 101 reads the entire file of the simulation output value stored in the output value storage 11.

The token divide module 103 divides the simulation output value into a plurality of tokens based on the applicable format stored in the format data file 35b. The applicable format includes information of space characters disposed in between the plurality of tokens. The token divide module 103 creates a first token string by arranging the plurality of divided tokens. The token creation module 104 creates a second token string configured to extract the characteristic value of the reference characteristic from the first token string based on the applicable format.

Figure 57:
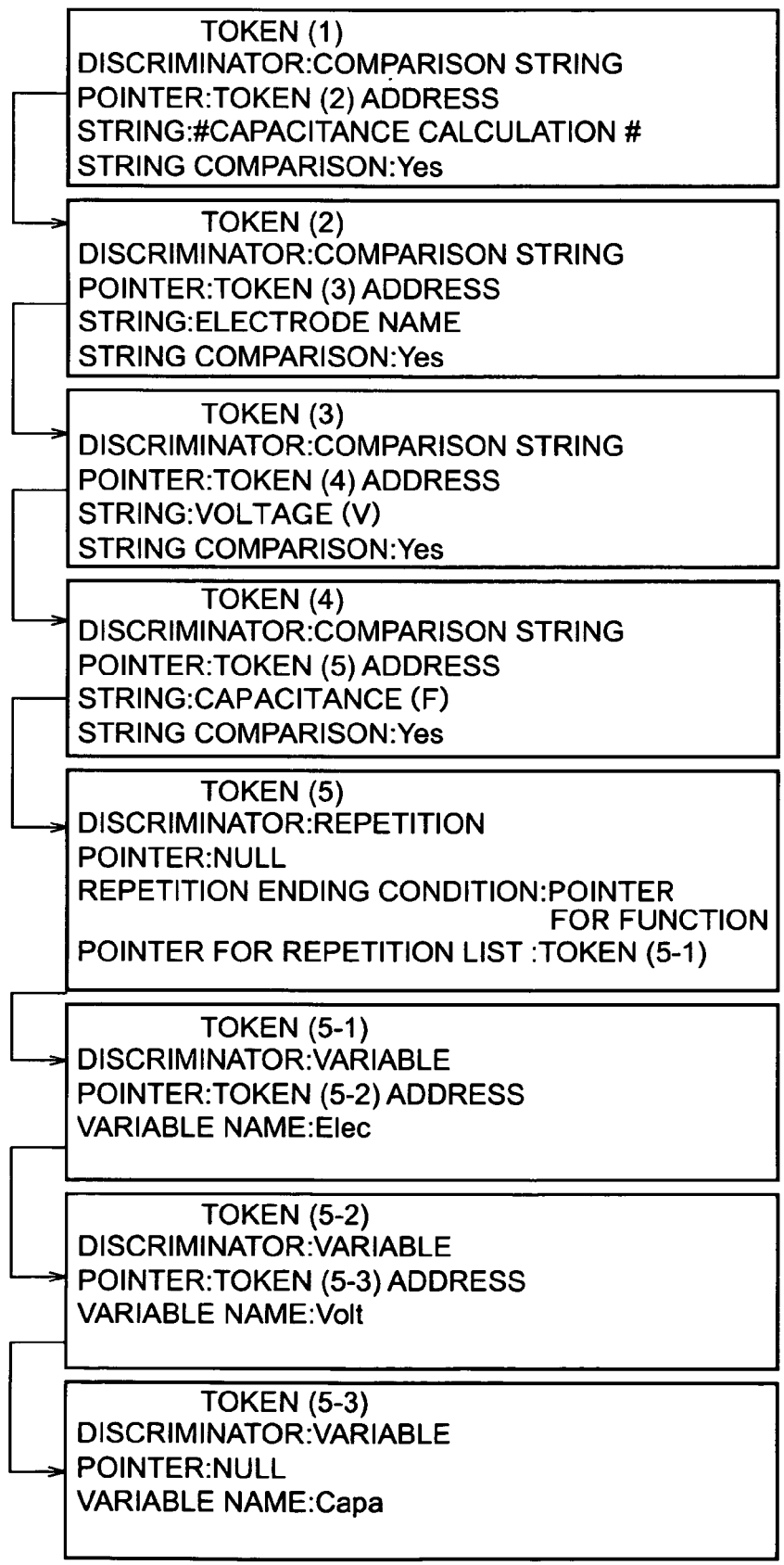
FIG. 57 is a diagram showing an example of a format data file used in the description of the fifth example of the embodiment of the present invention.

As shown in FIG. 57, the second token string includes not only the tokens (1) to (5), also a third token string. The third token string includes tokens (5-1) to (5-3). The hierarchies of the tokens (1) to (5) and the tokens (5-1) to (5-3) are different, and the tokens (5-1) to (5-3) are provided in the hierarchy below the tokens (1) to (5).

Each of the tokens (1) to (5) in the second token string includes a discriminator of a comparison string or a variable or a repetition, a pointer of an address of the next token arranged after the current token in the second token string, a character string, a string comparison discriminator, a variable name, a repetition ending condition, and a pointer for repetition list that designates the third token string that is a list having repetition.

More specifically, the token (1) includes "comparison string" as the discriminator, "token (2) address" as the pointer, "#CAPACITANCE CALCULATION#" as the character string, and "Yes" as the string comparison discriminator. The token (2) includes "comparison string" as the discriminator, "token (3) address" as the pointer, "ELECTRODE NAME" as the character string, and "Yes" as the string comparison discriminator. The token (3) includes "comparison string" as the discriminator, "token (4) address" as the pointer, "VOLTAGE(V)" as the character string, and "Yes" as the string comparison discriminator. The token (4) includes "comparison string" as the discriminator, "token (5) address" as the pointer, "CAPACITANCE(F)" as the character string, and "Yes" as the string comparison discriminator. The token (5) includes "REPETITION" as the discriminator, "NULL" as the pointer, and "POINTER FOR FUNCTION" as the repetition ending condition, "TOKEN (5-1)" as the pointer for repetition list.

Each of the tokens (5-1) to (5-3) in the third token string includes a discriminator of a comparison string or a variable or a repetition, a pointer of an address of the next token arranged after the current token in the third token string, a character string, a string comparison discriminator, a variable name, a repetition ending condition, and a pointer for repetition list that designates the fourth token string (not shown) that is a list having repetition.

More specifically, the token (5-1) includes "variable" as the discriminator, "token (5-2) address" as the pointer, and "Elec" as the variable name. The token (5-2) includes "variable" as the discriminator, "token (5-3) address" as the pointer, and "Volt" as the variable name. The token (5-3) includes "variable" as the discriminator, "NULL" as the pointer, and "Capa" as the variable name.

Figure 58:
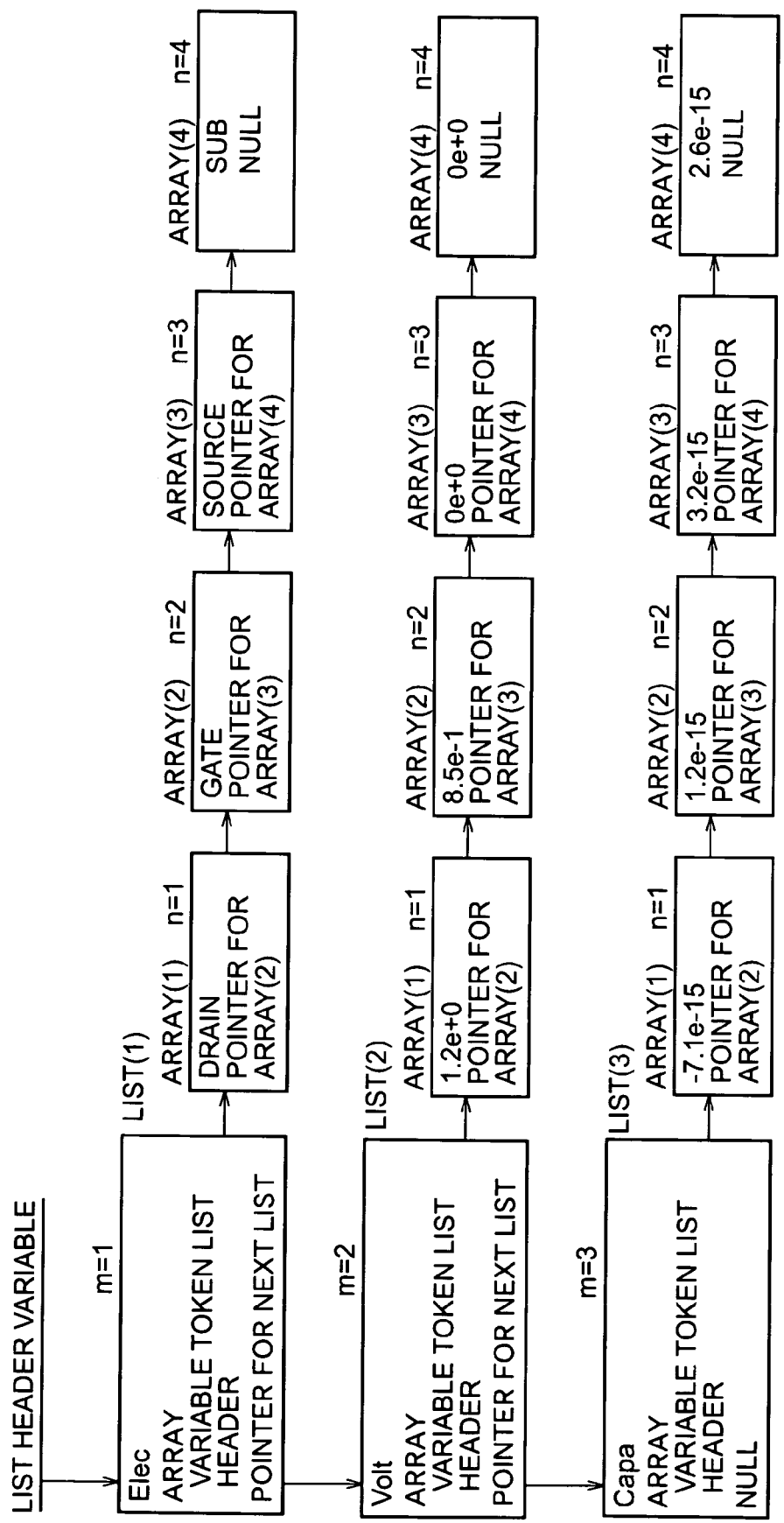
FIG. 58 is a diagram showing an example of a variable name and token value table used in the description of the fifth example of the embodiment of the present invention.

The token creation module 104 extracts a token string corresponding with the second token string from the first token string created by dividing the simulation output value to the tokens. The variable names "Elec", "Volt", and "Capa" designated as the variables by the extracted information, and the token values corresponding to the variable names and arrays that are the repetition numbers, are stored in the token data storage 131, as shown in FIG. 58.

Figure 59:
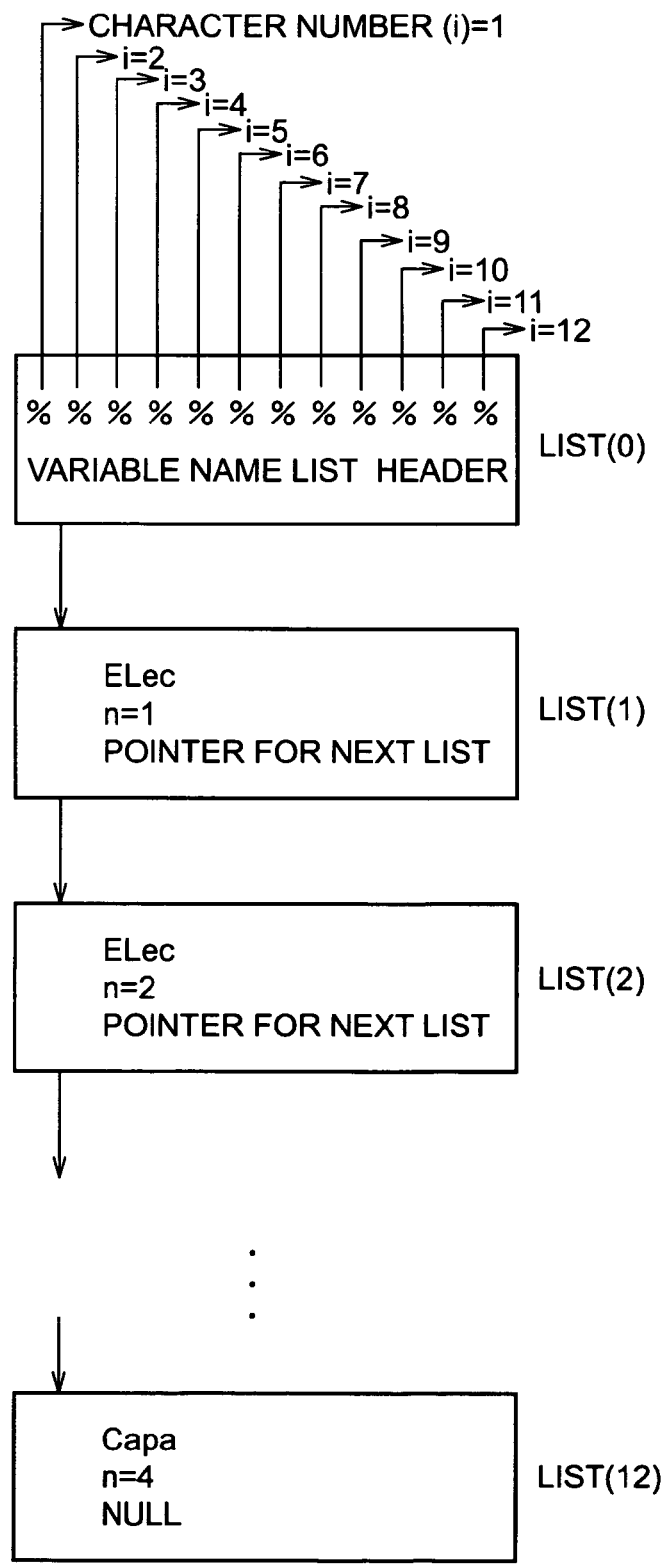
FIG. 59 is a diagram showing an example of an output format used in the description of the fifth example of the embodiment of the present invention.

The token output module 105 transmits the voltage value and the capacity value for each electrode name stored in the token data storage 131 to the extraction characteristic storage 13, in accordance with the output format shown in FIG. 59. The list (0) has a character string composed by 12 characters of % designated with character number (i) (i=1 to 12), as the output format, and a header of the variable name list (1). According to the character string %%%%%%%%%%%%, it is possible to replace twelve variables with the token values. The list (1) can be read out by using the header of the list (1).

The list (1) has a variable name "Elec" corresponding to the character number (1), a repetition number n=1, and a pointer to the list (2). The token value "DRAIN" corresponding to the variable name "Elec" and the repetition number n=1 is added to the output string shown in FIG. 58. The list (2) can be read out by using the header of the list (2).

The list (2) has a variable name "Elec" corresponding to the character number (2), a repetition number n=2, and a pointer to the list (2). The token value "GATE" corresponding to the variable name "Elec" and the repetition number n=2 is added to the output string shown in FIG. 58. Hereinafter, the processing in the same manner is carried out from the list (3) to a list (11) corresponding to the array (3) of the list (1) to the array (3) of the list (3) shown in FIG. 58.

The list (12) has a variable name "Capa" corresponding to the character number (12), a repetition number n=4, and "NULL" indicating that it is the last list of the sequence. The token value "2.6e−15" corresponding to the variable name "Capa" and the repetition number n=4 is added to the output string shown in FIG. 58.

The string extraction unit 12 may extract the electrode names, the voltage values of each electrode, and the capacitance values of each electrode, such as "DRAIN", "GATE", "SOURCE", "SUB", "1.2e+0", "8.5e−1", "0.0e+0", "0.0e+0", "−7.1e−15" "1.2e−15", "3.2e−15.", "2.6e−15", as characteristic values of the target characteristics by transmitting the output string. Thus, in the fifth example of the embodiment of the present invention, it is possible to provide the characteristic value of the target characteristic used in optimization of the manufacturing conditions to easily manufacture a high performance semiconductor device.

SIXTH EXAMPLE

In a sixth example of the embodiment of the present invention, description will be given to a case of extracting a calculation result of a drain current versus gate current (Id-Vg) characteristic from the simulation output value stored in the output value storage 11 shown in FIG. 1. It is possible to calculate the drive current Ion, the off leak current Ioff, and the threshold voltage Vth of the MOSFET based on the Id-Vg characteristic. Put more plainly, it is possible to selecte the drive current Ion, the off leak current Ioff, and the threshold voltage Vth of the MOSFET for the reference characteristic.

As shown in FIG. 60, a Id-Vg characteristic of the simulated structure of the MOSFET calculated in the simulator 10 is stored in the output value storage 11 as a simulation output value.

The file read module 101 reads out the entire file of the simulation output value from the output value storage 11.

The token divide module 103 divides the simulation output value into a plurality of tokens based on the applicable format stored in the format data file 35b. The applicable format includes information of space characters disposed in between the plurality of tokens. The token divide module 103 creates a first token string by arranging the plurality of divided tokens. The token creation module 104 creates a second token string configured to extract the drain current Id and the gate voltage Vg from the first token string based on the applicable format.

Figure 61:
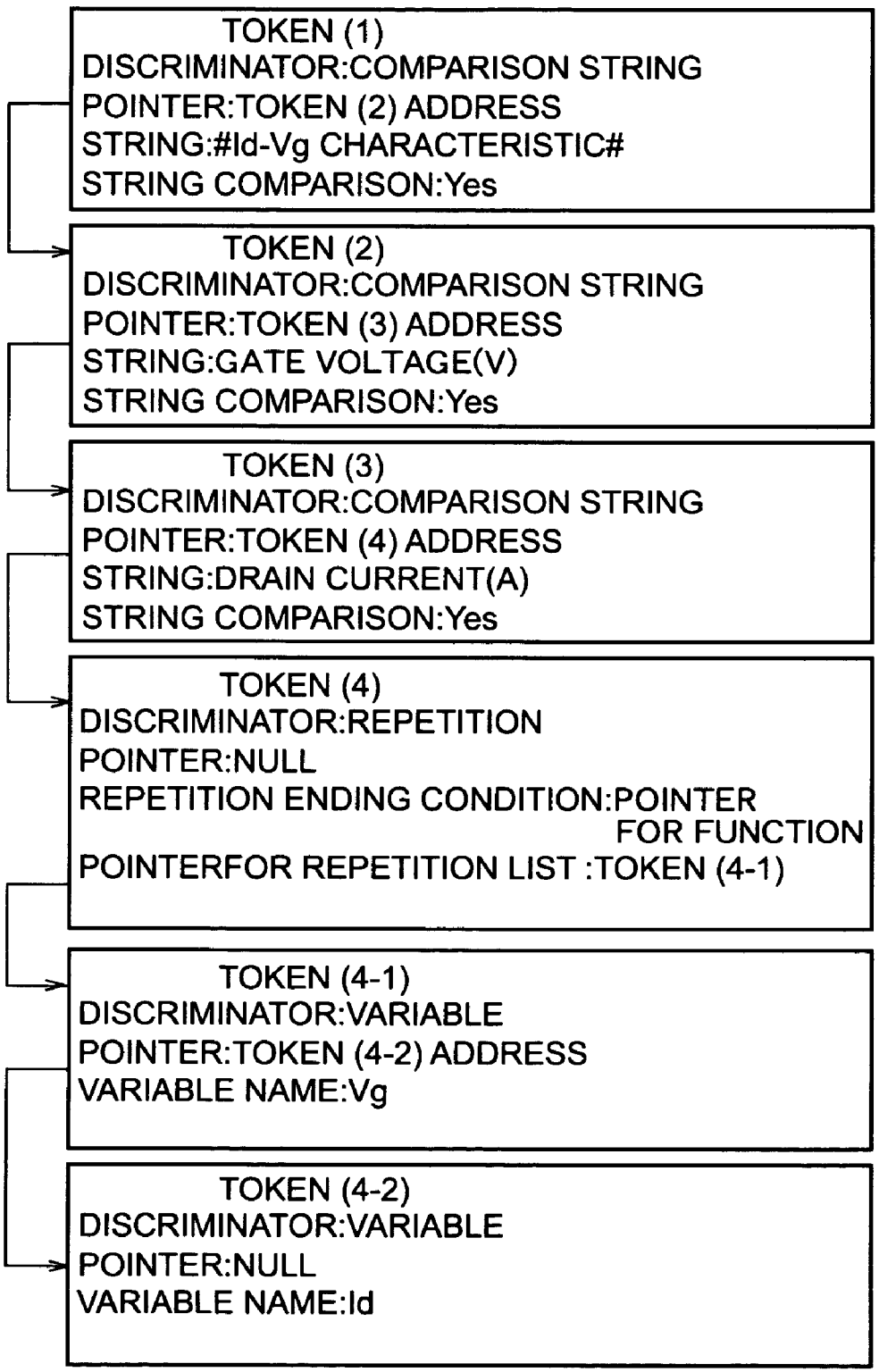
FIG. 61 is a diagram showing an example of a format data file used in the description of the sixth example of the embodiment of the present invention.

As shown in FIG. 61, the second token string includes not only the tokens (1) to (4), but also the third token string. The third token string includes tokens (4-1) and (4-2). The hierarchies of the tokens (1) to (4) and the tokens (4-1) and (4-2) are different, and the tokens (4-1) and (4-2) are provided in the hierarchy below the tokens (1) to (4).

The token (1) of the second token string includes "comparison string" as the discriminator, "token (2) address" as the pointer, "#Id-Vg CHARACTERISTIC#" as the character string, and "Yes" as the string comparison discriminator. The token (2) includes "comparison string" as the discriminator, "token (3) address" as the pointer, "Gate Voltage(V)" as the character string, and "Yes" as the string comparison discriminator. The token (3) includes "comparison string" as the discriminator, "token (4) address" as the pointer, "Drain Current(A)" as the character string, and "Yes" as the string comparison discriminator. The token (4) includes "repetition" as the discriminator, "NULL" as the pointer, "POINTER FOR FUNCTION" as the repetition ending condition, and "TOKEN (4-1)" as the pointer for repetition list.

The token (4-1) of the third token string includes "variable" as the discriminator, "token (5-2) address" as the pointer, and "Vg" as the variable name. The token (4-2) includes "variable" as the discriminator, "NULL" as the pointer, and "Id" as the variable name.

Figure 62:
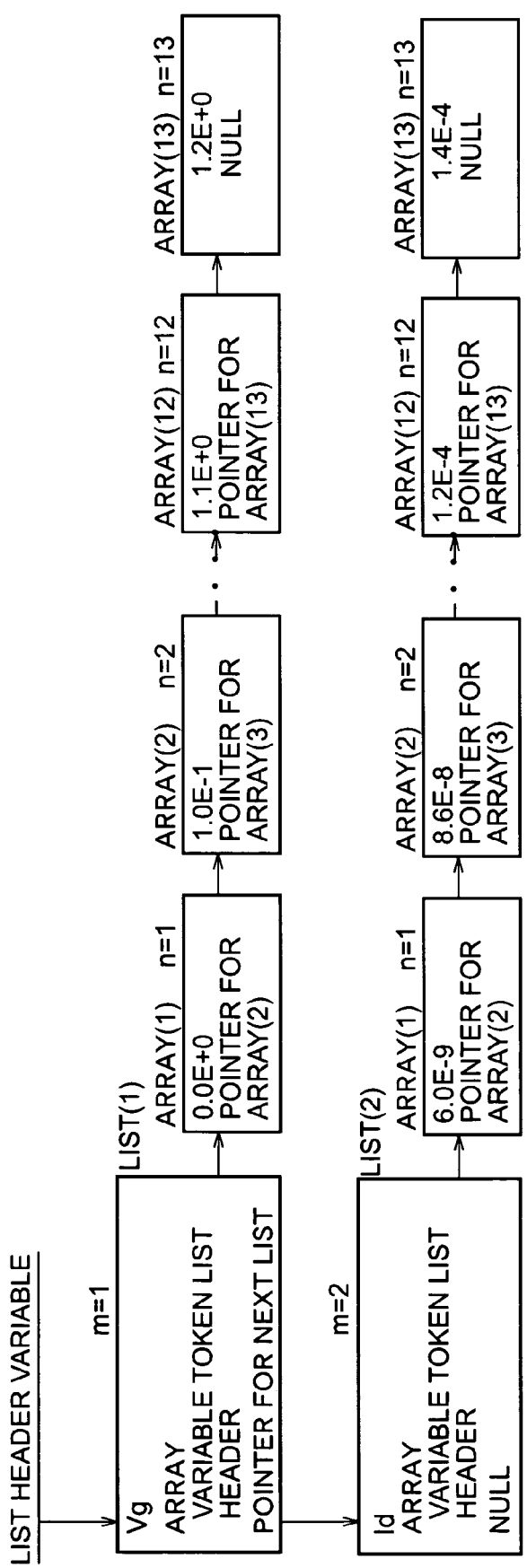
FIG. 62 is a diagram showing an example of a variable name and token value table used in the description of the sixth example of the embodiment of the present invention.

The token creation module 104 extracts a token string corresponding with the second token string from the first token string created by dividing the simulation output value to the tokens. The variable names "Vg" and "Id" designated as the variables by the extracted information, and the token values corresponding to the variable names and arrays that are the repetition numbers, are stored in the token data storage 131, as shown in FIG. 62.

Figure 63:
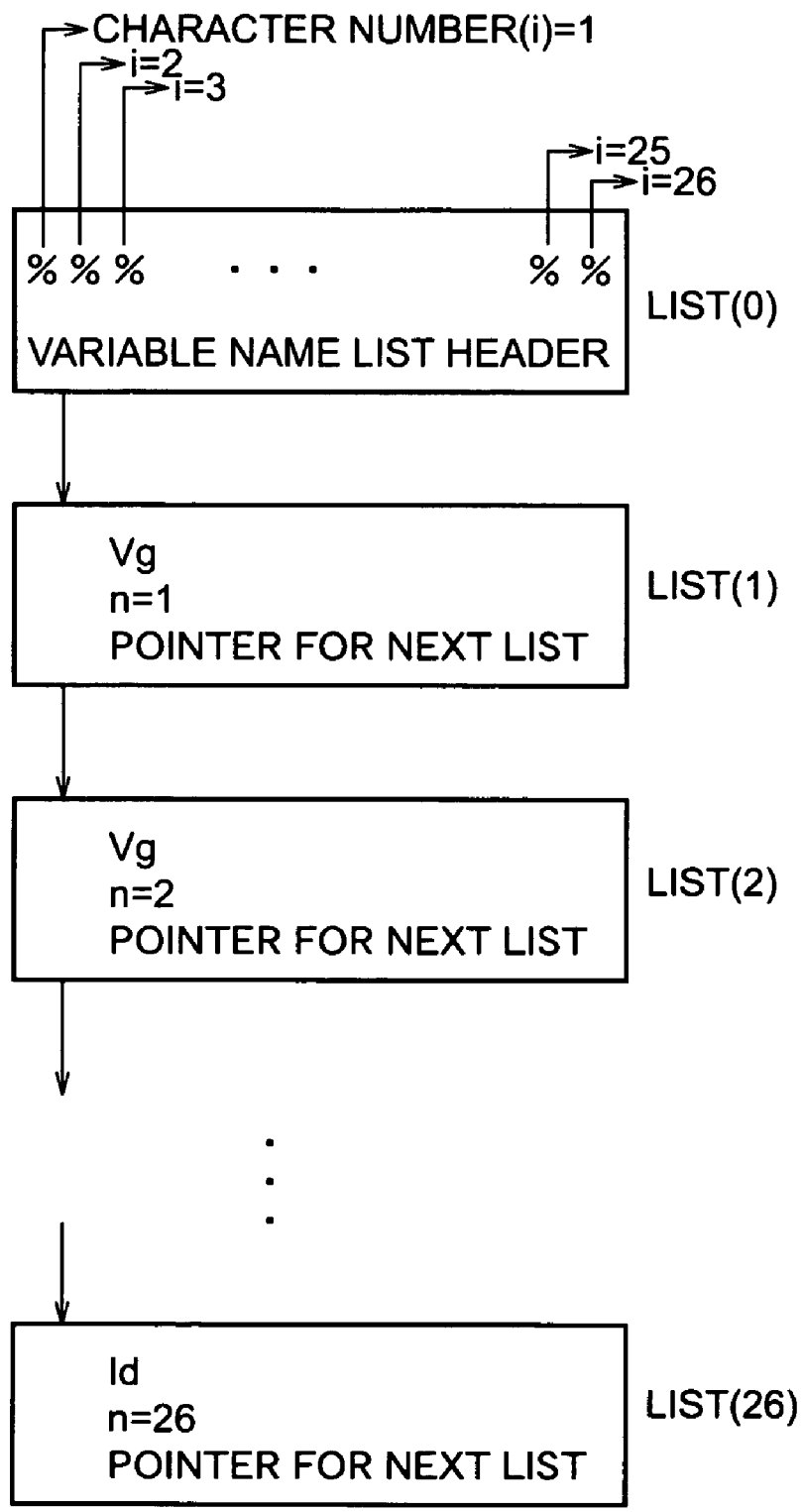
FIG. 63 is a diagram showing an example of an output format used in the description of the sixth example of the embodiment of the present invention.

The token output module 105 transmits the gate voltage value Vg and the drain current value Id stored in the token data storage 131 to the extraction characteristic storage 13, in accordance with the output format shown in FIG. 63. The list (0) has a character string composed of 26 characters of % designated with character number (i) (i=1 to 26) as the output format, and a header of the variable name list (1). According to the character string %%%%%%%%%%%%%%, it is possible to replace 26 variables with the token values. It is possible to read out the list (1) by using the header of the list (1).

The list (1) has a variable name "Vg" corresponding to the character number (1), a repetition number n=1, and a pointer to the list (2). The token value "0.1E+0" corresponding to the variable name "Vg" and the repetition number n=1 is added to the output string in FIG. 62. It is possible to read out the list (2) by using the header of the list (2).

The list (2) has a variable name "Vg" corresponding to the character number (2), a repetition number n=2, and a pointer to the list (3). The token value "1.0E−1" corresponding to the variable name "Vg" and the repetition number n=2 is added to the output string in FIG. 62. Hereinafter, the processing in the same manner is carried out from the list (3) to the list (25).

The last list (26) has a variable name "Id" corresponding to the character number (26), a repetition number n=13, and NULL indicating that it is the last list of the sequence. The token value "1.4E−4" corresponding to the variable name "Id" and the repetition number n=13 is added to the output string in FIG. 62.

The string extraction unit 12 may extract the data "0.0E+0", "1.0E−1", . . . , "1.2E+0", "6.0E−9", . . . , "8.6E−8", . . . , "1.4E−4E−4" corresponding to the simulation output value shown in FIG. 60 by transmitting the output string. Thus, in the sixth example of the embodiment of the present invention, it is possible to provide the characteristic value of the target characteristic used in optimization of the manufacturing conditions to easily manufacture a high performance semiconductor device.

OTHER EMBODIMENTS

In the embodiment of the present invention, a manufacturing process of a semiconductor device is described as an example. However, it should be easily understood from the foregoing descriptions that the present invention can also be applied to manufacturing processes of industrial products, such as liquid crystal devices, magnetic recording mediums, optical recording mediums, thin film magnetic heads, superconductor devices, and automobiles.

The present invention has been described as mentioned above. However the descriptions and drawings that constitute a portion of this disclosure should not be perceived as limiting this invention. Various alternative embodiments and operational techniques will become clear to persons skilled in the art from this disclosure.

What is claimed is:

1. A computer implemented method for optimizing a structure of an industrial product, comprising:
    selecting a plurality of control factors from among a plurality of manufacturing parameters affecting a target characteristic of the industrial product, which is scheduled to be manufactured by a sequence of manufacturing processes, the control factors being related to a plurality of manufacturing conditions;
    setting a plurality of levels to the respective control factors;
    selecting a reference characteristic having a trade-off relation with the target characteristic from among a plurality of characteristics of the structure;
    setting a reference value to the reference characteristic;
    selecting a prior adjustment factor affecting the reference characteristic from among the manufacturing parameters, the prior adjustment factor being different from the control factors;
    creating conditions for a plurality of experiments assigning a plurality of combinations of the levels to the respective control factors so that, with respect to each level of a specific control factor among the control factors, all levels of other control factors are evenly combined;
    determining an adjustment value of the prior adjustment factor so that each of characteristic values of the reference characteristic obtained by the experiments conforms substantially to the reference value;
    determining experimental characteristic values of the target characteristic corresponding to each of the experiments using the adjustment value; and
    determining an optimal value of the target characteristic and an optimal combination of the levels based on the experimental characteristic values of the experiments, the optimal combination providing the optimal value.

2. The method of claim 1, wherein selecting the reference characteristic, includes:
    setting a tolerance of a characteristic value to each of a plurality of characteristics of the structure, each of the characteristics having a trade-off relation with the target characteristic; and
    selecting the reference characteristic from among the characteristics that do not satisfy the tolerance.

3. The method of claim 1, wherein selecting the reference characteristic, includes:
    setting a tolerance of variance of a characteristic value to each of a plurality of characteristics of the structure, each of the characteristics having a trade-off relation with the target characteristic; and
    selecting the reference characteristic from among the characteristics that do not satisfy the tolerance.

4. The method of claim 1, wherein selecting the prior adjustment factor, includes:
    calculating a sensitivity of each of the manufacturing parameters to the reference characteristic; and
    selecting the prior adjustment factor from among the manufacturing parameters having a high sensitivity.

5. The method of claim 1, wherein the prior adjustment factor is a different manufacturing parameter from the control factors.

6. The method of claim 1, wherein determining the adjustment value, includes:
    providing a plurality of search levels to the prior adjustment factors;
    calculating a search characteristic value of the reference characteristic for each combination of the search levels and the experiments with respect to each of the search levels; and
    searching the adjustment value using the search levels and the search characteristic value with respect to each of the experiments.

7. The method of claim 1, wherein determining the adjustment value, includes:
    setting a tolerance of a variation from the reference value of the reference characteristic; and
    searching the adjustment value so as to provide the variation to be less than the tolerance.

8. The method of claim 1, wherein the adjustment value is determined by one of a quasi-Newton method, a bisection method, an iteration method, an interpolation method, and an extrapolation method.

9. The method of claim 1, wherein processing for extracting each of the characteristic values of the reference characteristic, the processing including:
dividing output data including a characteristic value of the reference characteristic obtained by each of the experiments, into tokens based on an output format of the output data, each of the tokens corresponding to a comparison string including a name of the reference characteristic and a variable including the characteristic value of the reference characteristic;
creating a first token string by arranging the tokens;
creating a second token string configured to extract the characteristic value of the reference characteristic from the first token string based on the output format; and
extracting the characteristic value of the reference characteristic from the first token string using the second token string.

10. The method of claim 1, wherein processing for extracting each of the characteristic values of the reference characteristic, the processing including:
dividing output data of a characteristic configured to create a characteristic value of the reference characteristic obtained by each of the experiments, into tokens based on an output format of the output data, each of the tokens corresponding to a comparison string including a name of the reference characteristic and each of a plurality of variables in which a plurality of characteristic values of the characteristic are repeated;
creating a first token string by arranging the tokens;
creating a second token string configured to create the characteristic value of the reference characteristic from the first token string based on the output format, the second token string having a third token string configured to extract the repeated characteristic values of the characteristic; and
creating the characteristic value of the reference characteristic from the first token string using the second token string.

11. The method of claim 6, wherein the search characteristic value is calculated for each of a plurality of noise level values set to a noise factor by selecting the noise factor that causes a variation to the reference characteristic from among the manufacturing parameters.

12. The method of claim 6, wherein the search characteristic value is calculated for a reference noise condition selected from a plurality of noise conditions compounding to a plurality of noise level values set to each of a plurality of noise factors by selecting the noise factors that cause a variation to the reference characteristic from among the manufacturing parameters.

13. A computerized processing system for optimizing a structure of an industrial product, comprising:
a computer including a memory storing:
an array editor configured to select a plurality of control factors from among a plurality of manufacturing parameters affecting a target characteristic of the industrial product, which is scheduled to be manufactured by a sequence of manufacturing processes, and to set a plurality of levels to the respective control factors, the control factors being related to a plurality of manufacturing conditions;
an any creation unit configured to create conditions for a plurality of experiments assigning a plurality of combinations of the levels to the respective control factors so that, with respect to each level of a specific control factor among the control factors, all levels of other control factors are evenly combined;
an input data editor configured to select a reference characteristic having a trade-off relation with the target characteristic from among a plurality of characteristics of the structure, to set a reference value to the reference characteristic, and to select a prior adjustment factor affecting the reference characteristic from among the manufacturing parameters;
an adjustment unit configured to determine an adjustment value of the prior adjustment factor so that each of characteristic values of the reference characteristic obtained by the experiments conforms substantially to the reference value; and
an orthogonal array experiment control unit configured to determine experimental characteristic values of the target characteristic corresponding to each of the experiments using the adjustment value.

14. The system of claim 13, further comprising:
a post-process unit configured to determine an optimal value of the target characteristic and an optimal combination of the levels based on the experimental characteristic values of the experiment, the optimal combination providing the optimal value.

15. The system of claim 13, wherein the prior adjustment factor is a different manufacturing parameter from the control factors.

16. The system of claim 13, further comprising:
a search control unit configured to provide a plurality of search levels to the prior adjustment factors;
a simulator configured to calculate a arch characteristic value of the reference characteristic for each combination of the search levels and the experiments with respect to each of the search levels; and
a string extraction unit configured to extract a character string of the search characteristic value from output data of the simulator.

17. The system of claim 16, wherein the string extraction unit comprises:
a string data creation module configured to create string data including an extraction position for the character sting and an output format with respect to the output data; and
an extraction module configured to extract the character string from the output data based on the string data.

18. The system of claim 17, wherein the extraction module comprises:
a string extent extraction module configured to extract an extraction extent of the character string from the output data using the extraction position;
a token divide module configured to create a first token string by arranging tokens divided from the output data based on the output format, each of the tokens corresponding to a comparison string including a name of the reference characteristic and a variable including the search characteristic value; and
a token creation module configured to create a second token string for extracting the search characteristic value from the first token string based on the output format, and to extract the characteristic value from the first token string using the second token string.

19. A method for manufacturing an industrial product, comprising:
selecting a plurality of control factors from among a plurality of manufacturing parameters affecting a target characteristic of the industrial product, which is scheduled to be manufactured by a sequence of manufacturing processes, the control factors being related to a plurality of manufacturing conditions;

setting a plurality of levels to the respective control factors;

selecting a reference characteristic having a trade-off relation with the target characteristic from among a plurality of characteristics of the structure;

setting a reference value to the reference characteristic;

selecting a prior adjustment factor affecting the reference characteristic from among the manufacturing parameters;

creating conditions for a plurality of experiments assigning a plurality of combinations of the levels to the respective control factors so that, with respect to each level of a specific control factor among the control factors, all levels of other control factors are evenly combined;

executing the experiments with the created conditions;

determining an adjustment value of the prior adjustment factor so that each of characteristic values of the reference characteristic obtained by the experiments conforms substantially to the reference value;

determining experimental characteristic values of the target characteristic corresponding to each of the experiments using the adjustment value;

determining an optimal value of the target characteristic and an optimal combination of the levels based on the experimental characteristic values of the experiments, the optimal combination providing the optimal value, and executing the sequence of the manufacturing processes with the manufacturing conditions prescribed by the determined optimal combination so as to manufacture the industrial product.

* * * * *